DATA FILTERING SYSTEM

Filed April 24, 1957

20 Sheets-Sheet 1

INVENTOR.
Ernest W. Bivans
BY
Edgar H. Kent
ATTORNEY

May 29, 1962 E. W. BIVANS 3,037,195

DATA FILTERING SYSTEM

Filed April 24, 1957 20 Sheets-Sheet 2

DATA FILTERING SYSTEM

Filed April 24, 1957 20 Sheets-Sheet 3

INVENTOR.
Ernest W. Bivans
BY Edgar H. Kent
ATTORNEY

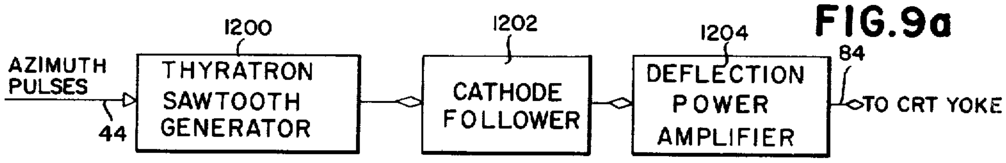
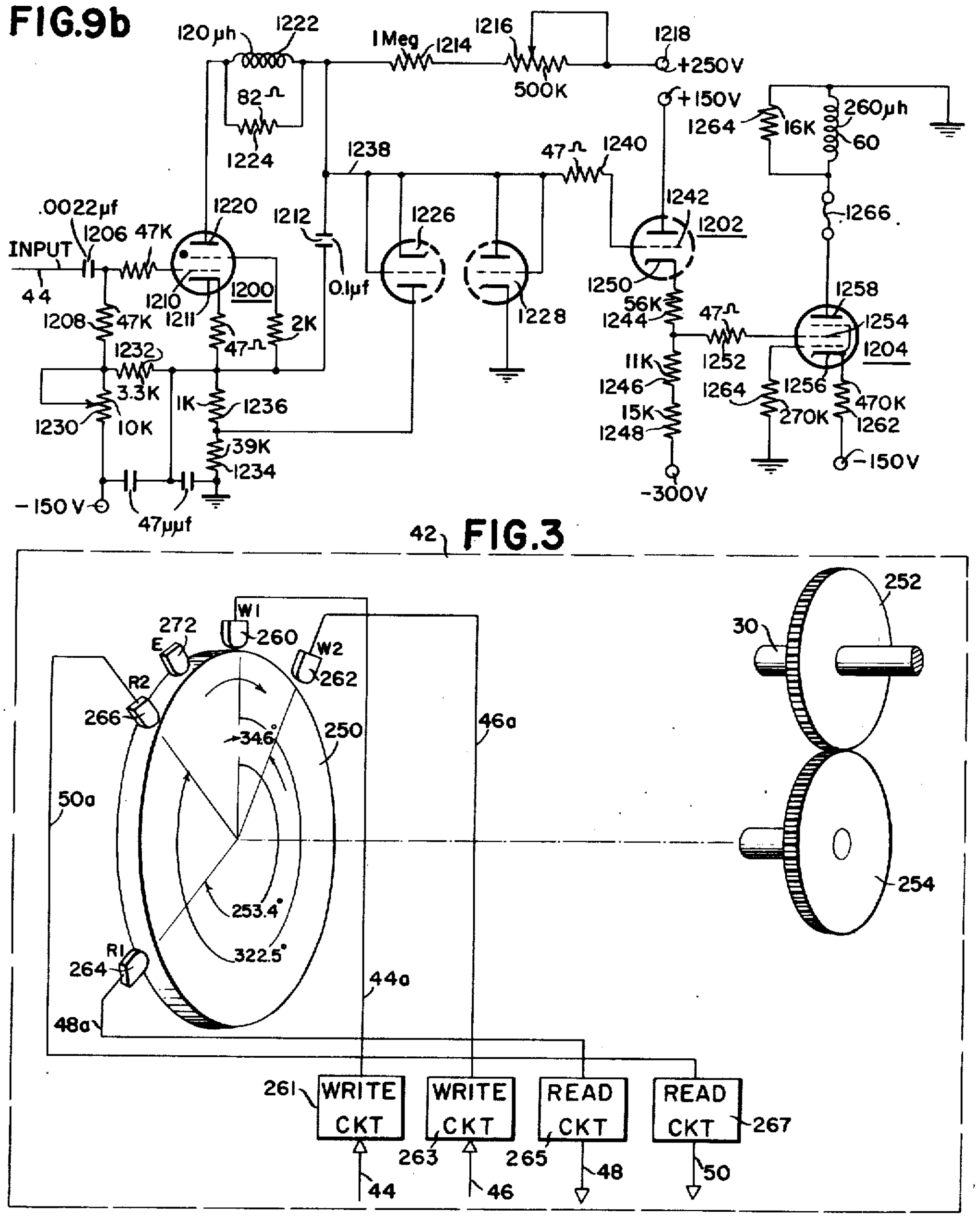
FIG.9a
FIG.9b, FIG.3

May 29, 1962 E. W. BIVANS 3,037,195

DATA FILTERING SYSTEM

Filed April 24, 1957 20 Sheets-Sheet 5

May 29, 1962 E. W. BIVANS 3,037,195

DATA FILTERING SYSTEM

Filed April 24, 1957 20 Sheets-Sheet 6

INVENTOR.
Ernest W. Bivans

BY Edgar H. Kent

ATTORNEY

May 29, 1962 E. W. BIVANS 3,037,195

DATA FILTERING SYSTEM

Filed April 24, 1957 20 Sheets-Sheet 7

INVENTOR.

Ernest W. Bivans

BY

Edgar H. Kent

ATTORNEY

INVENTOR.
Ernest W. Bivans
BY Edgar H. Kent
ATTORNEY

INVENTOR.
Ernest W. Bivans
BY
Edgar H. Kent
ATTORNEY

INVENTOR.
Ernest W. Bivans
BY
Edgar H. Kent
ATTORNEY

May 29, 1962 E. W. BIVANS 3,037,195

DATA FILTERING SYSTEM

Filed April 24, 1957 20 Sheets-Sheet 12

INVENTOR.
Ernest W. Bivans
BY Edgar H. Kent
ATTORNEY

May 29, 1962 E. W. BIVANS 3,037,195

DATA FILTERING SYSTEM

Filed April 24, 1957 20 Sheets-Sheet 13

INVENTOR.
Ernest W. Bivans
BY
Edgar H. Kent
ATTORNEY

INVENTOR.
Ernest W. Bivans
BY
Edgar H. Kent
ATTORNEY

INVENTOR.
Ernest W. Bivans
BY
Edgar H. Kent
ATTORNEY

INVENTOR.
Ernest W. Bivans
BY
Edgar H. Kent
ATTORNEY

May 29, 1962 E. W. BIVANS 3,037,195

DATA FILTERING SYSTEM

Filed April 24, 1957 20 Sheets-Sheet 18

INVENTOR.

Ernest W. Bivans

BY

Edgar H. Kent

ATTORNEY

May 29, 1962 E. W. BIVANS 3,037,195

DATA FILTERING SYSTEM

Filed April 24, 1957 20 Sheets-Sheet 19

INVENTOR.
Ernest W. Bivans

BY Edgar H. Kent

ATTORNEY

INVENTOR.
Ernest W. Bivans
BY Edgar H. Kent 3,037,195

DATA FILTERING SYSTEM

Ernest W. Bivans, West Newton, Mass., assignor to Research Corporation, New York, N.Y., a corporation of New York Filed Apr. 24, 1957, Ser. No. 654,963
7 Claims. (Cl. 340—173)

The present invention relates to a data filter system and more particularly to a system adapted to selectively filter incoming data prior to processing of such data by an associated data processing machine.

In the art of processing data representative of the location of objects, it is sometimes desirable to filter the information such that certain object location data is eliminated prior to processing by a data processing machine. In accordance with the principles of this invention the data processing is preceded by filtering so that undesired data is eliminated prior to processing.

A primary object of the present invention is to provide an improved data filtering system for selectively filtering incoming data prior to processing such data by an associated data processing machine.

Another object of the present invention is to provide data discriminating apparatus for selectively filtering object positioning data and processing the selected data through an associated data processing apparatus.

A further object of the present invention is to provide data processing apparatus adapted to manually filter object location data and apply the filtered data through a buffer storage system to a data processing machine.

Another and still further object of the present invention is to provide data filtering and processing apparatus wherein object location data is filtered by preventing light produced on a cathode ray tube display from energizing a photocell unless the light represents the data selected.

Another object of the present invention is to provide an improved apparatus for filtering undesired object identification data by manually filtering undesired data and passing only selected object identification data to an associated data processing apparatus.

A further object of the present invention is to provide an apparatus for selectively filtering data signals representing the position of each of a plurality of objects, maintaining coordinate data of the location of each of such objects and initiating the transfer of coordinate data identifying the location of selected objects to a data processing machine in response to the data signal representing a selected object.

Other objects of the invention will be pointed out in the following description and claims and illustrated in the accompanying drawings, which disclose, by way of example, the principle of the invention and the best mode, which has been contemplated, of applying that principle.

In the drawings:

FIGS. 1*a* and 1*b* when arranged end to end illustrate in simplified block form a data filter system constructed in accordance with the principles of the present invention.

FIG. 3 illustrates in simplified schematic form the Substitute Azimuth Generator identified as block 42 in FIG. 1*a*.

Figure 1A:
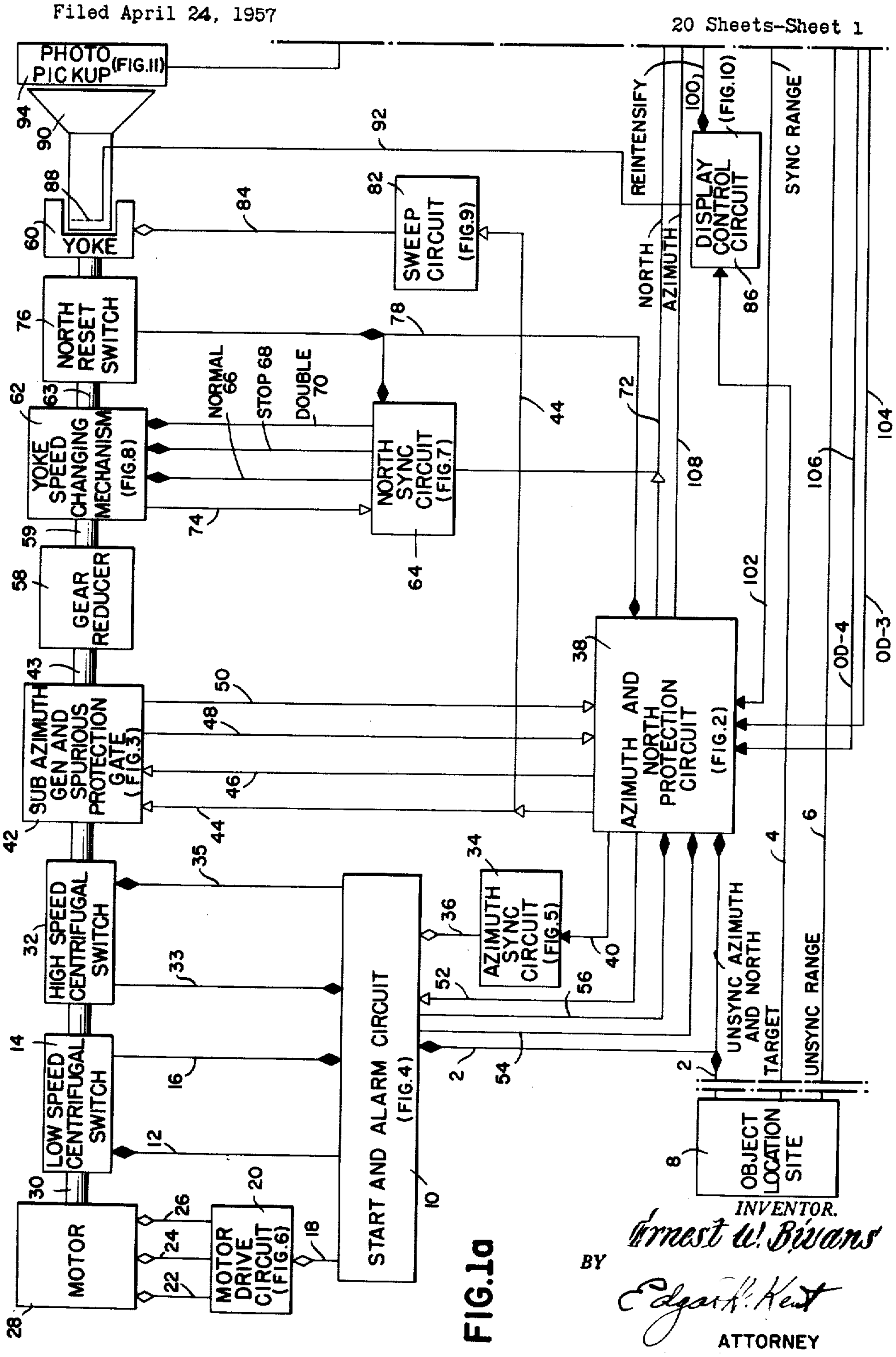
Figure 4A:
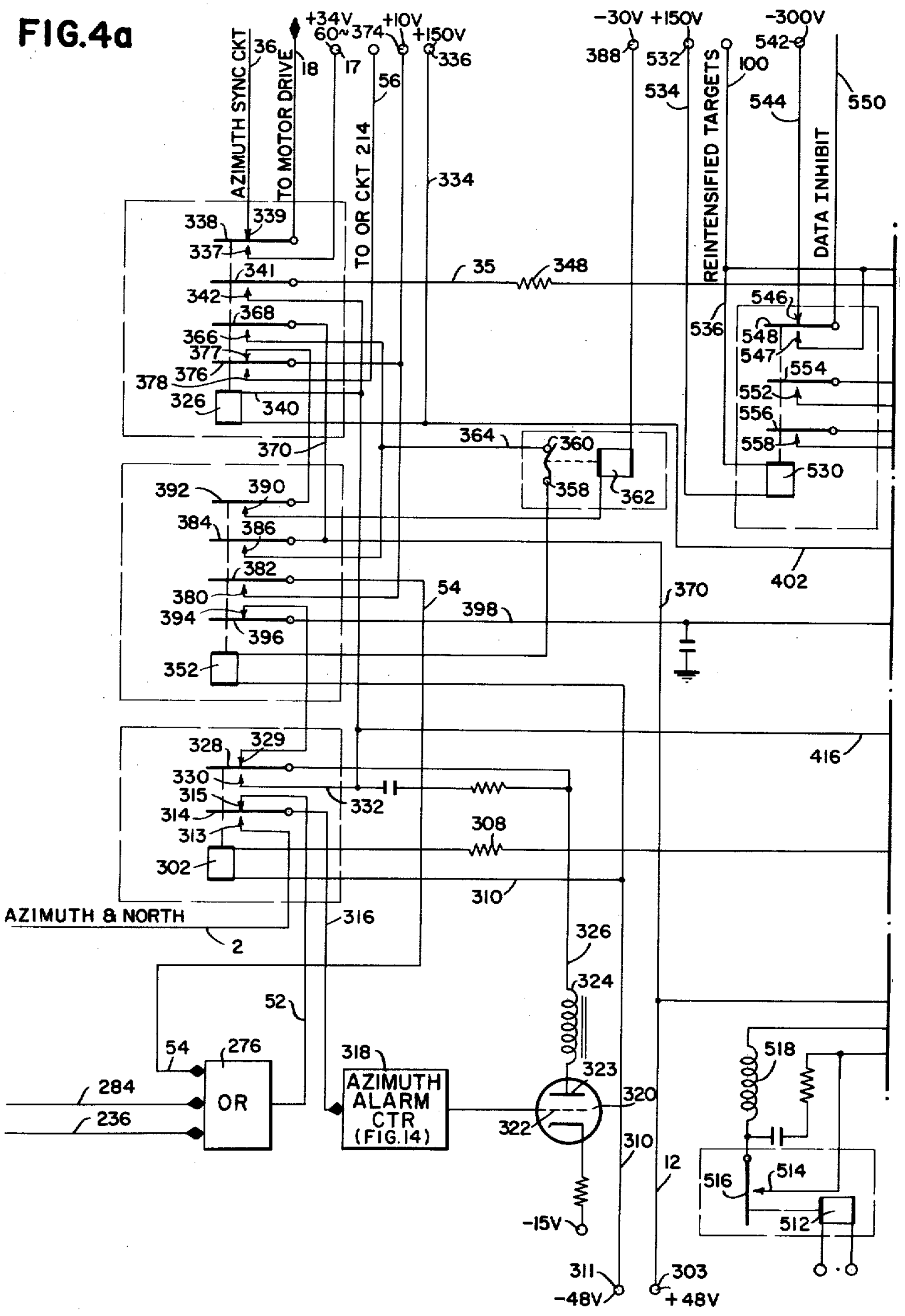
Figure 4B:
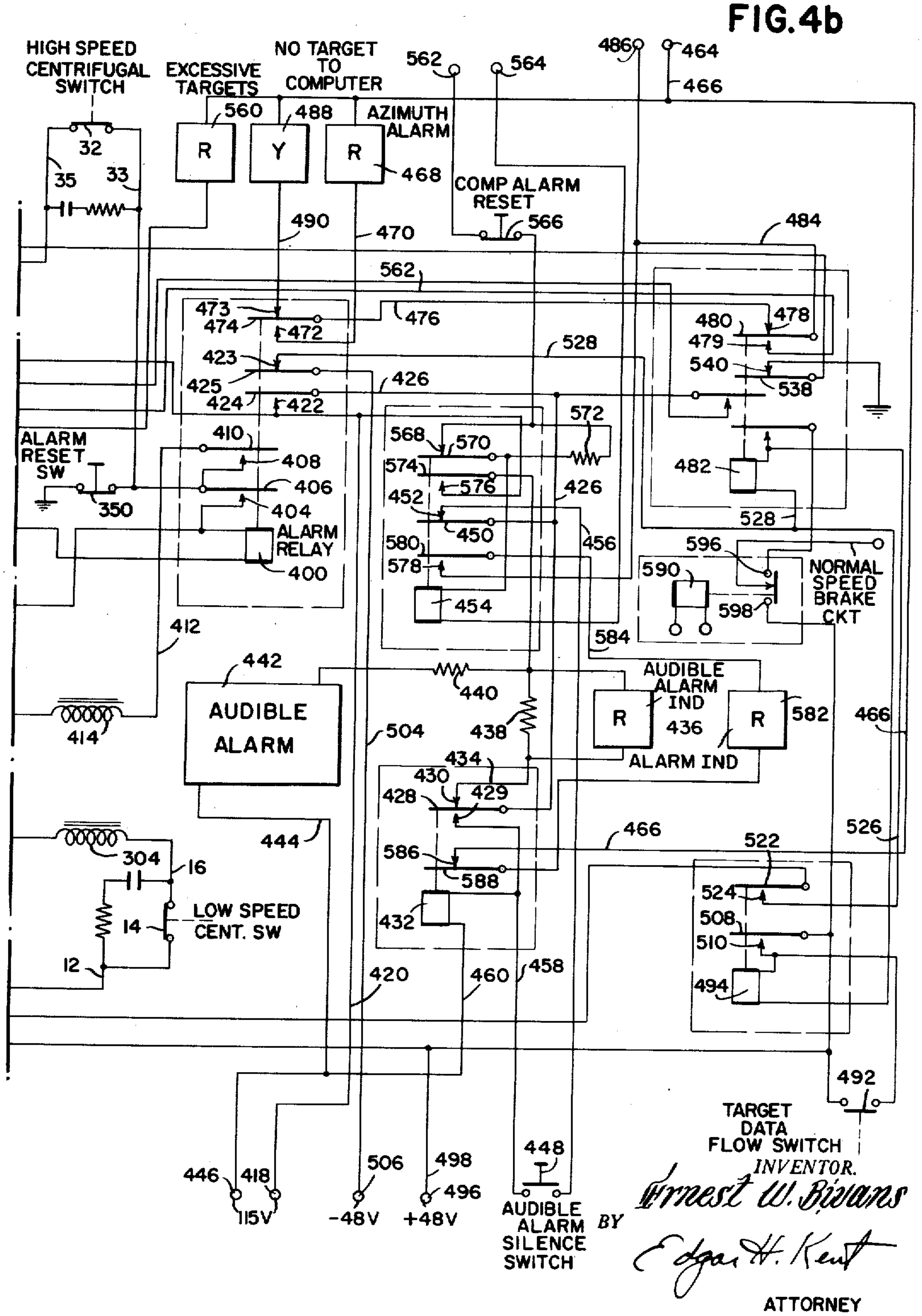

FIGS. 4*a* and 4*b* when arranged side by side illustrate in schematic form the Start and Alarm Circuit identified as block 10 in FIG. 1*a*.

Figure 5A:
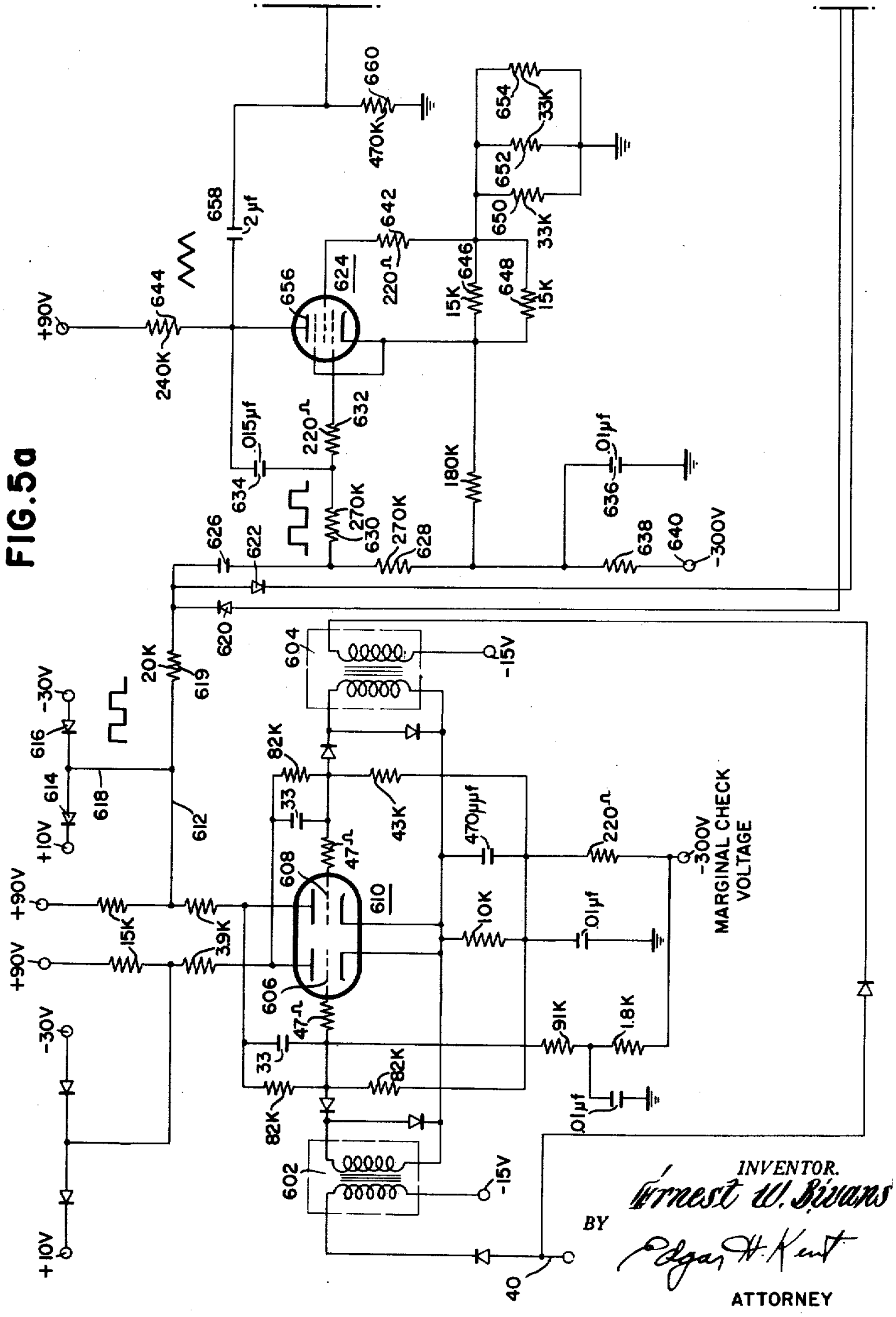
Figure 5B:
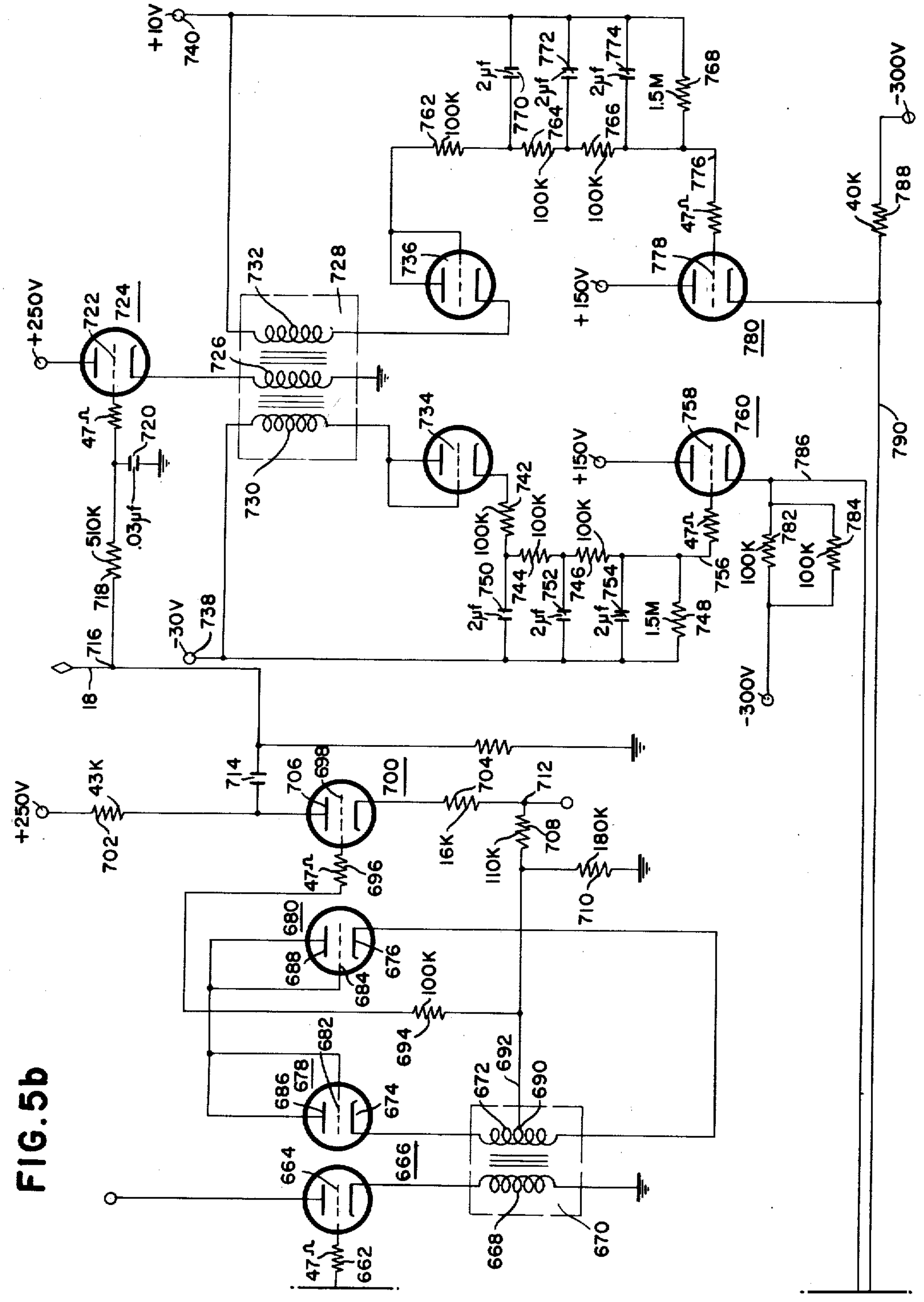

FIGS. 5*a* and 5*b* when arranged end to end illustrate in schematic form the Azimuth Synchronizing Circuit identified as block 34 in FIG. 1*a*.

Figure 6:
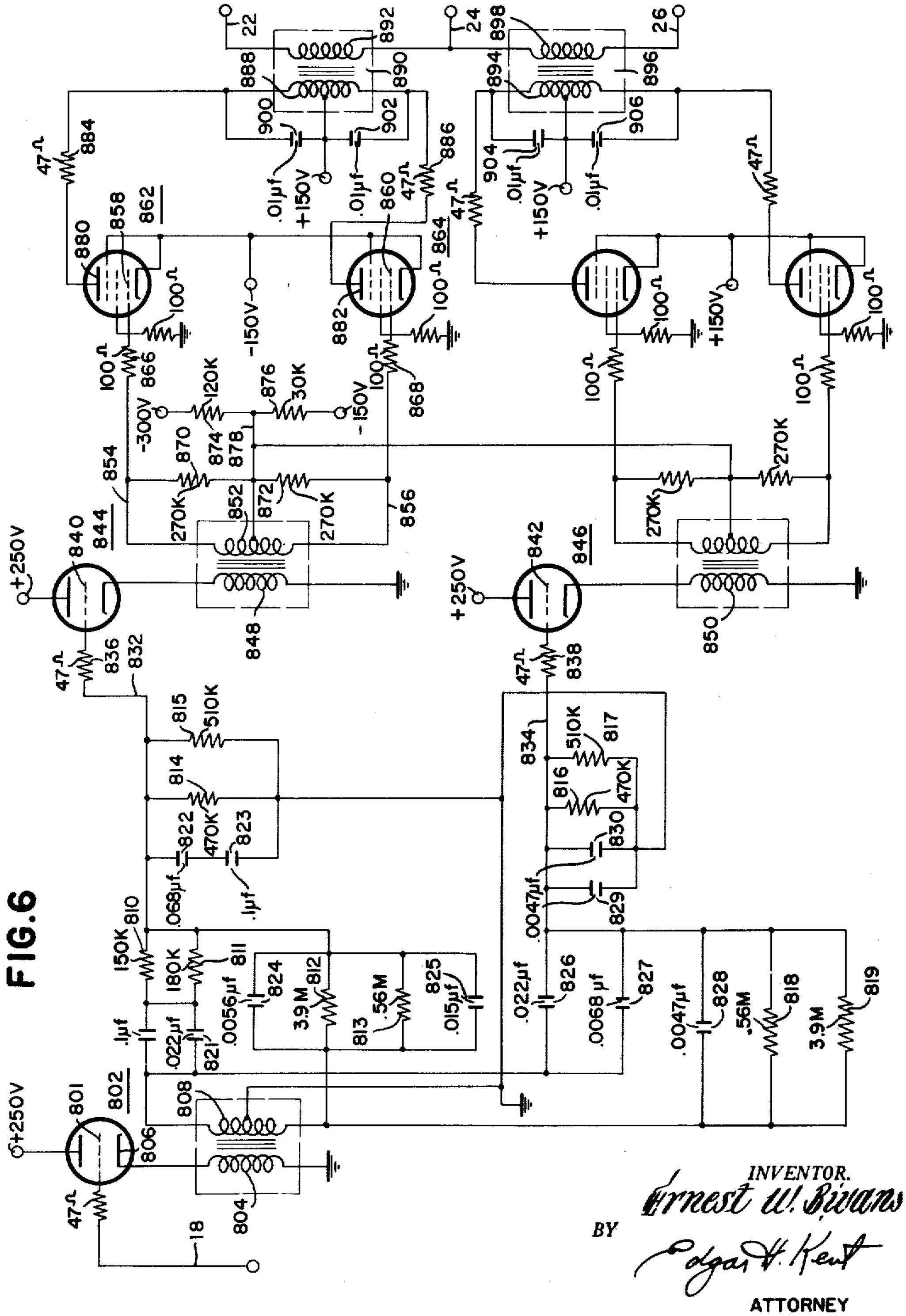

FIG. 6 illustrates in schematic form the Motor Drive Circuit identified as block 20 in FIG. 1*a*.

Figure 7A:
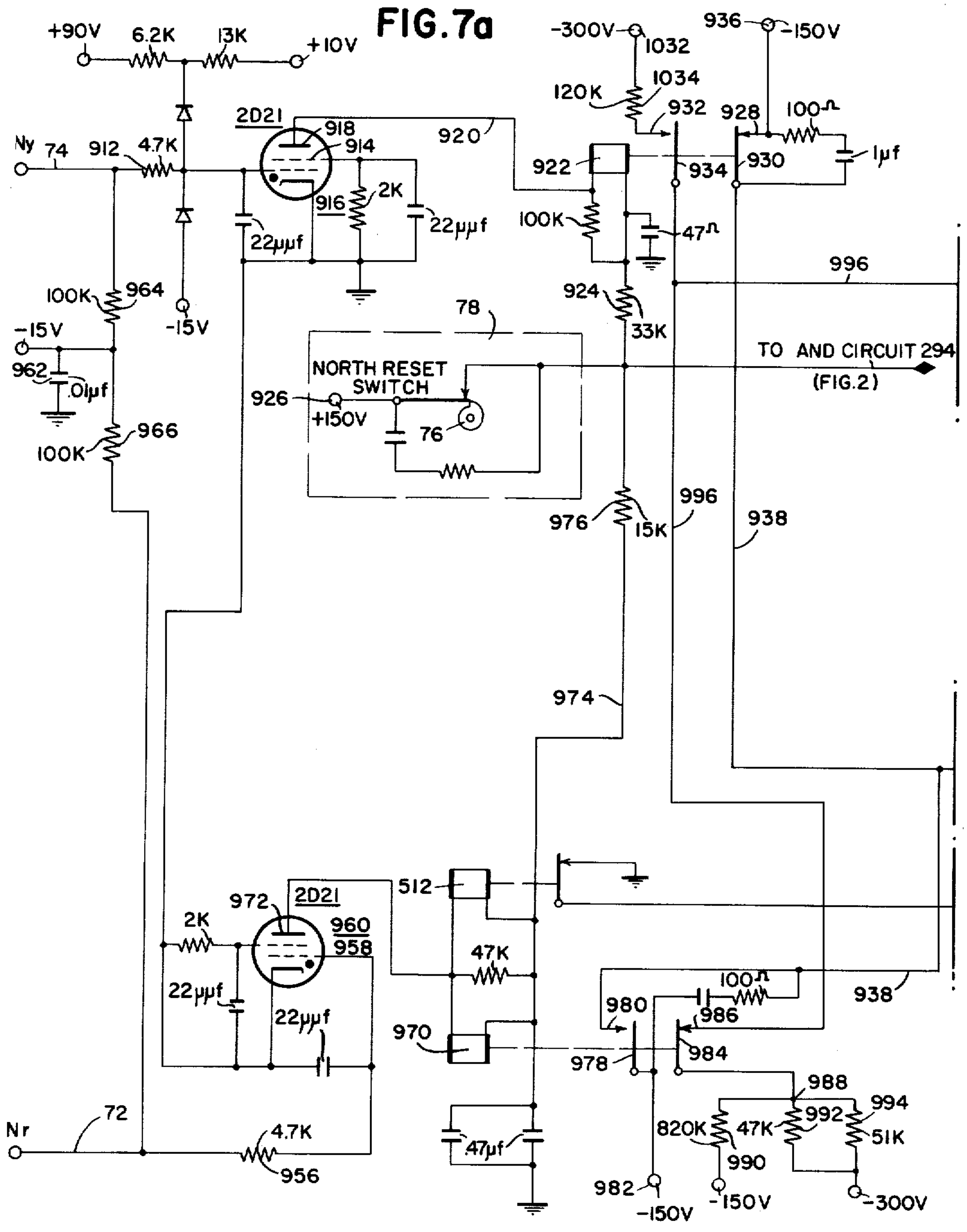
Figure 7B:
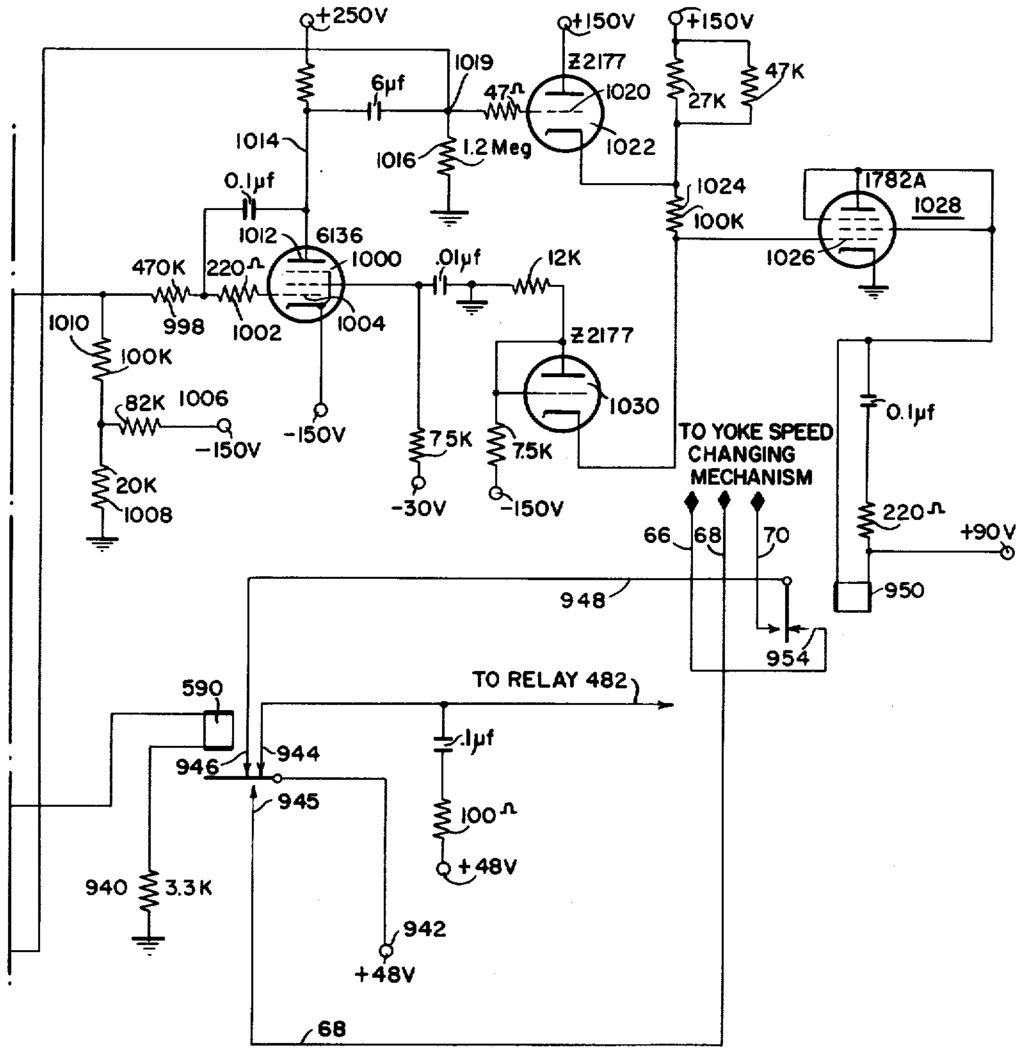

FIGS. 7*a* and 7*b* when arranged side by side illustrate in schematic form the North Synchronizing Circuit identified as block 64 in FIG. 1*a*.

Figure 8A:
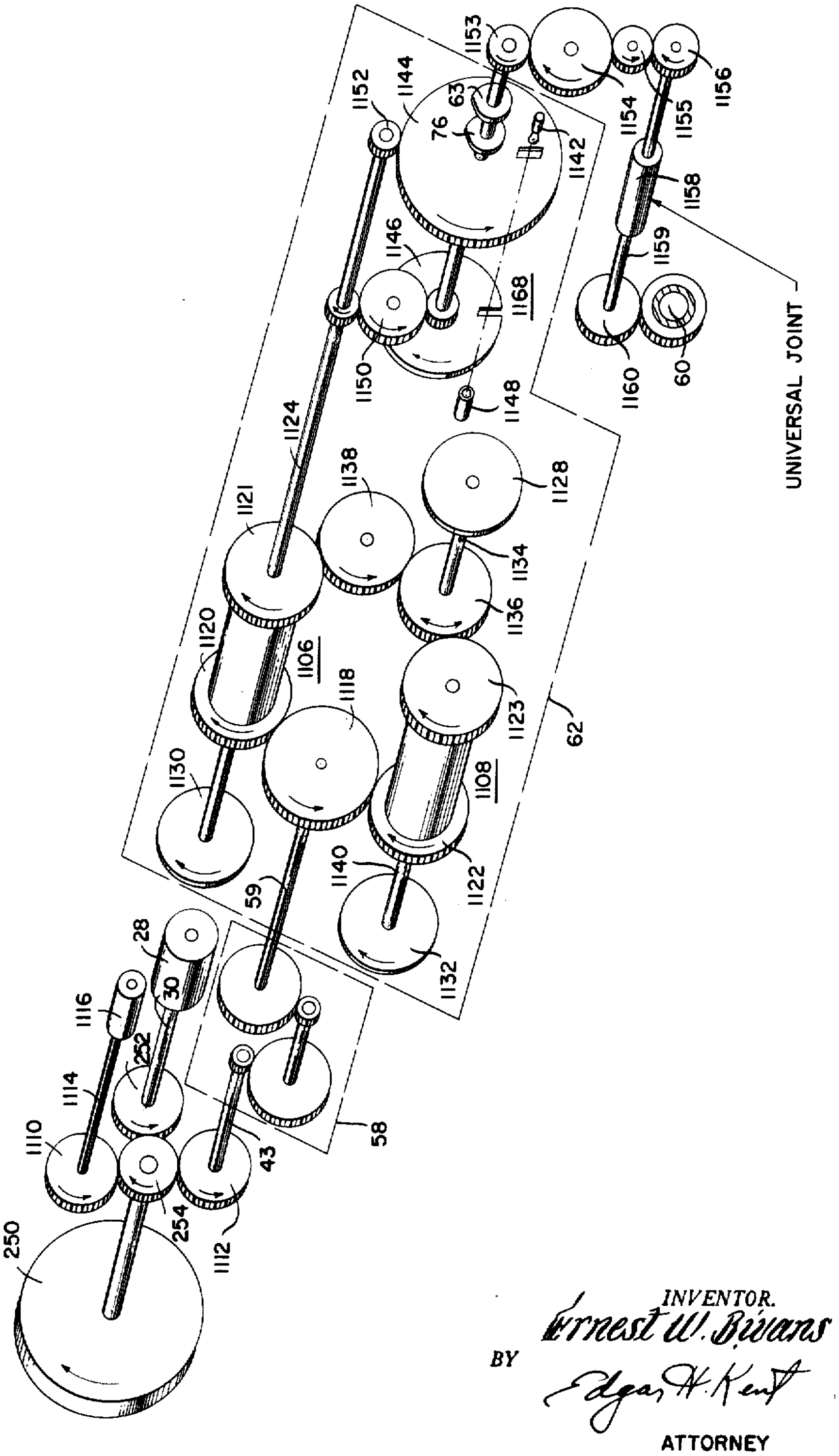

FIG. 8*a* illustrates in simplified block form the Yoke Speed Changing Mechanism identified as block 62 in FIG. 1*a*.

Figure 8B:
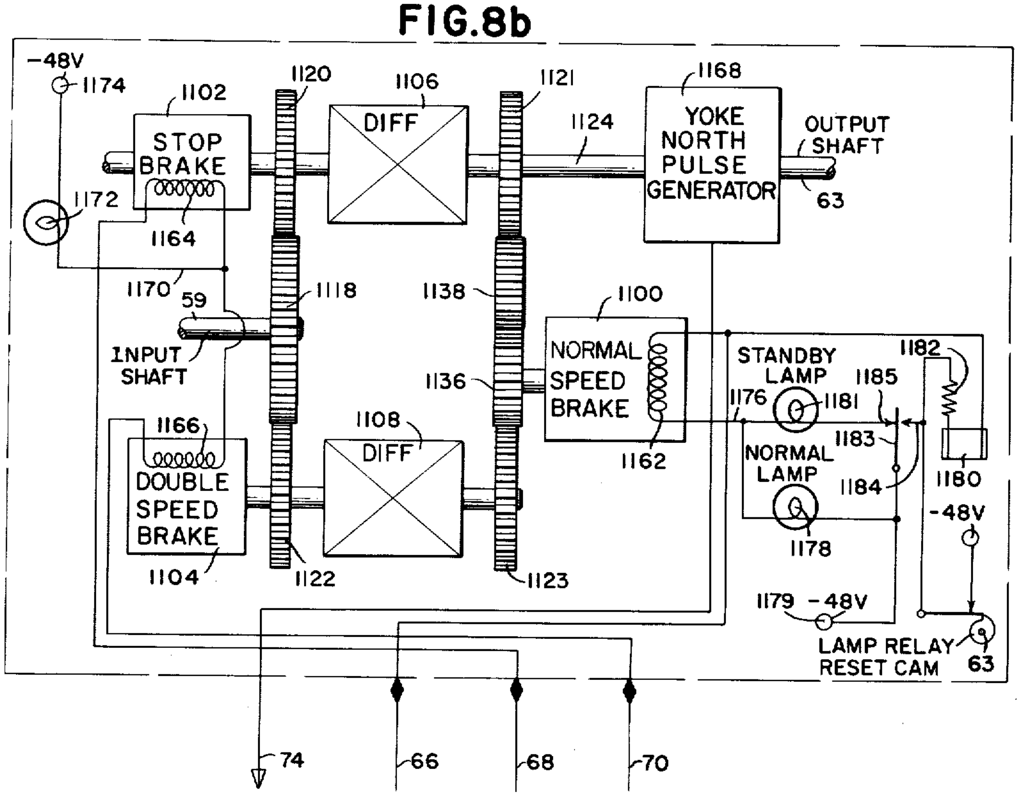

FIG. 8*b* illustrates in schematic form the Yoke Speed Changing Mechanism identified as block 62 in FIG. 1*a*.

Figure 8C:
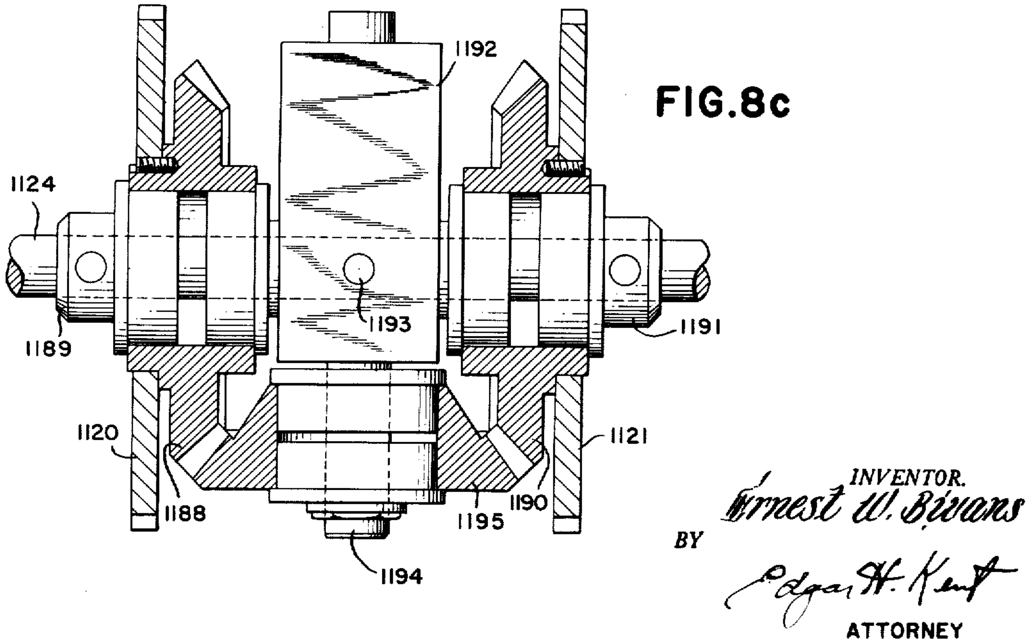

FIG. 8*c* illustrates in schematic form a differential 1108 in FIG. 8*b*.

FIGS. 9*a* and 9*b* illustrate in block and schematic form the Sweep Circuit identified as block 82 in FIG. 1*a*.

FIG. 10 illustrates in schematic form the Display Control Circuit identified as block 86 in FIG. 1*a*.

Figure 11:
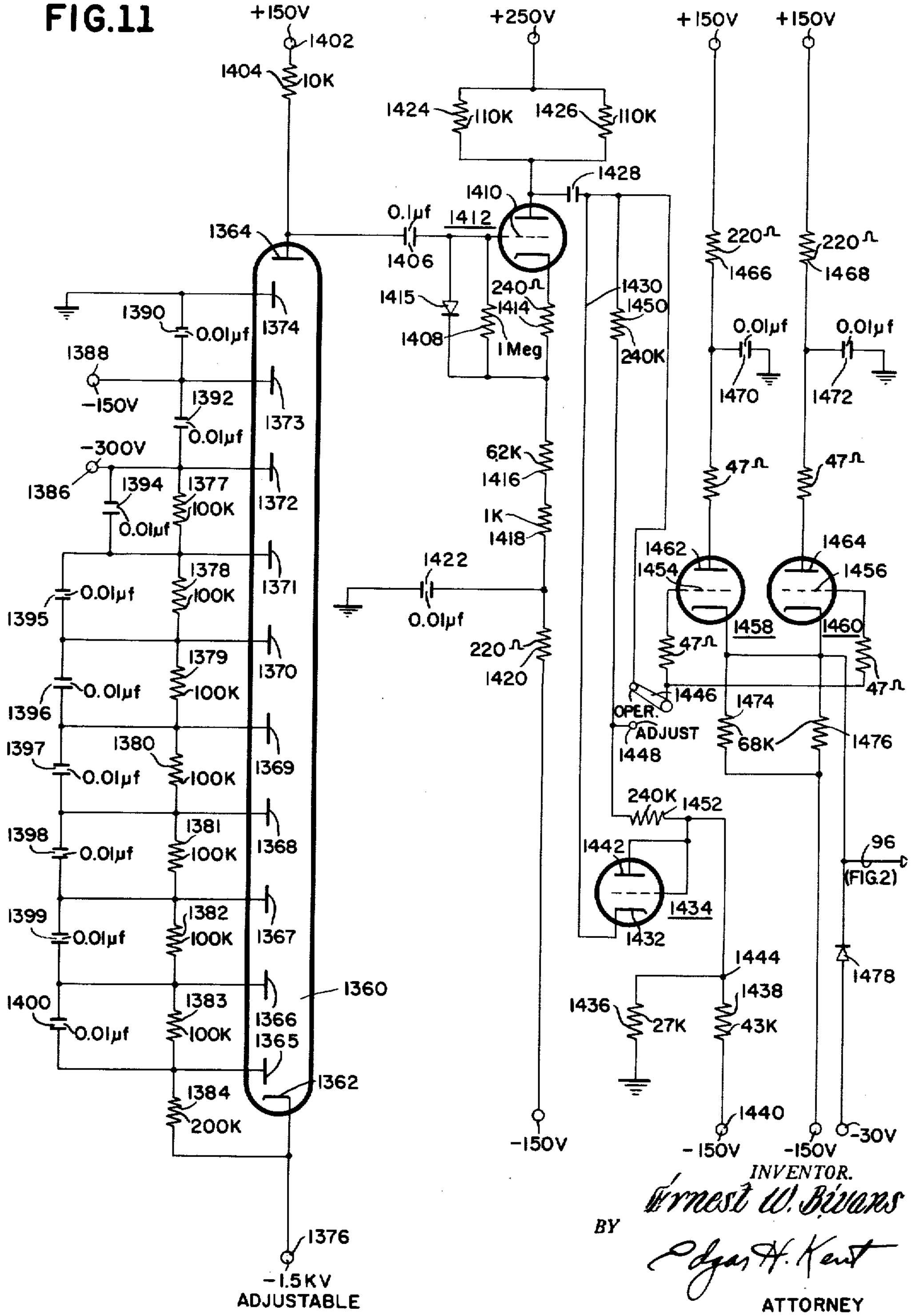

FIG. 11 illustrates in schematic form the Photo-pickup Circuit identified as block 94 in FIG. 1*a*.

Figure 1B:
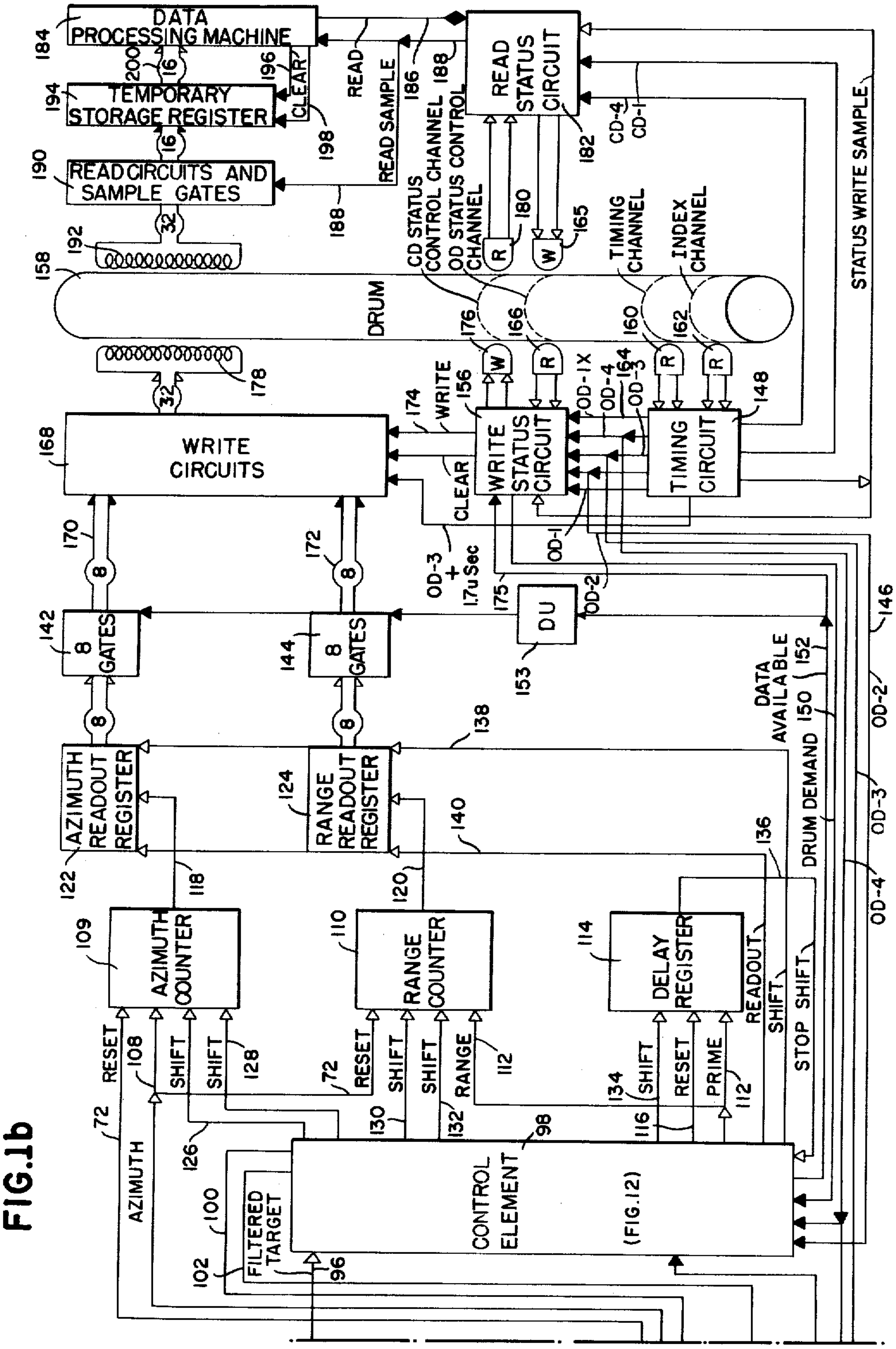
Figure 12:
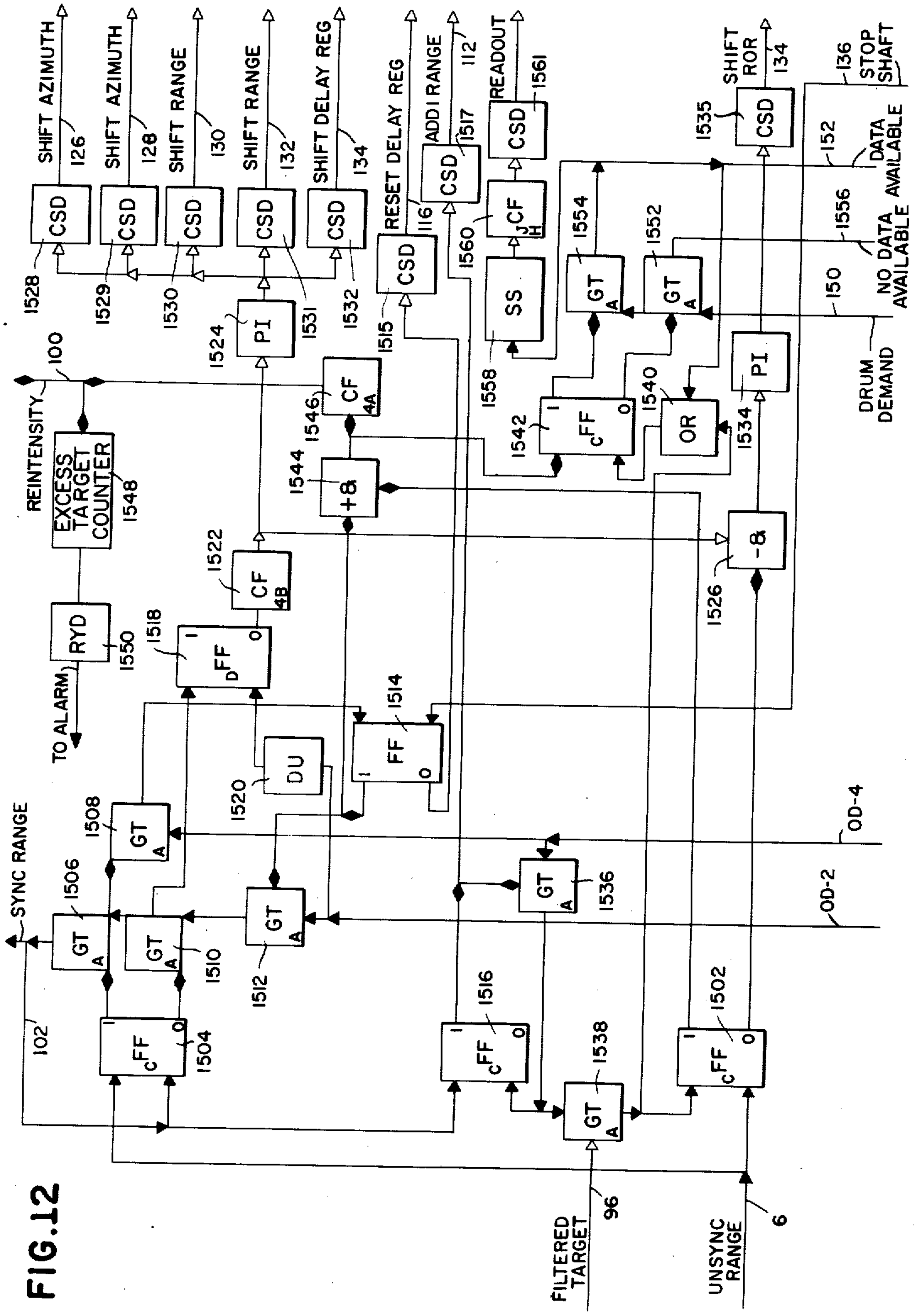

FIG. 12 illustrates in logical block form the Control Element identified as block 98 in FIG. 1*b*.

Figure 13:
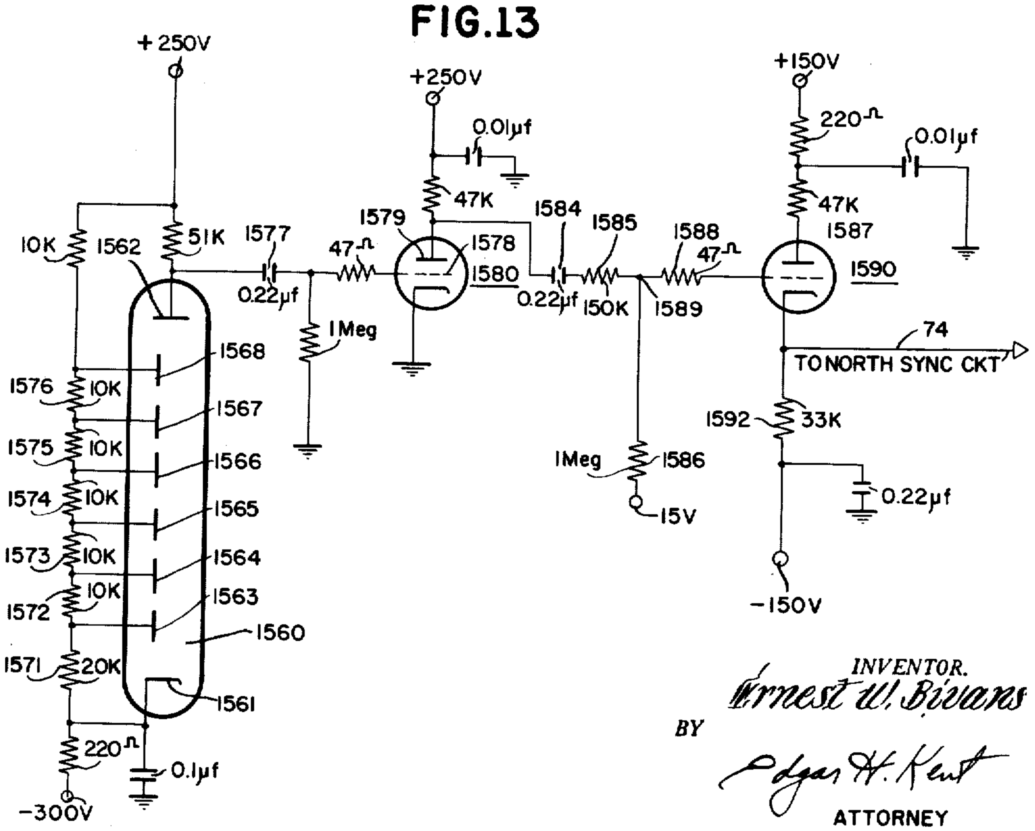

FIG. 13 illustrates in schematic form the Yoke North Pulse Generator identified as block 1119 in FIG. 8*a*.

Figure 14:
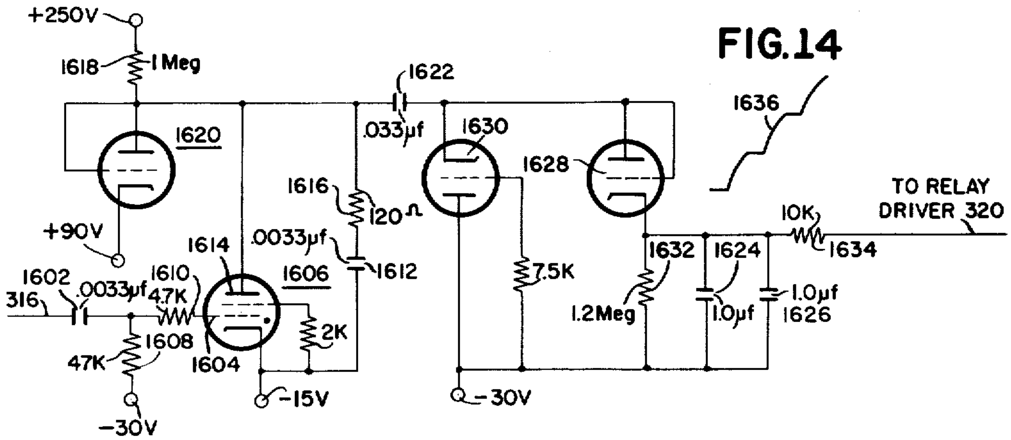

FIG. 14 illustrates in schematic form the Azimuth Alarm Counter identified as block 318 in FIG. 4*a*.

Figure 15:
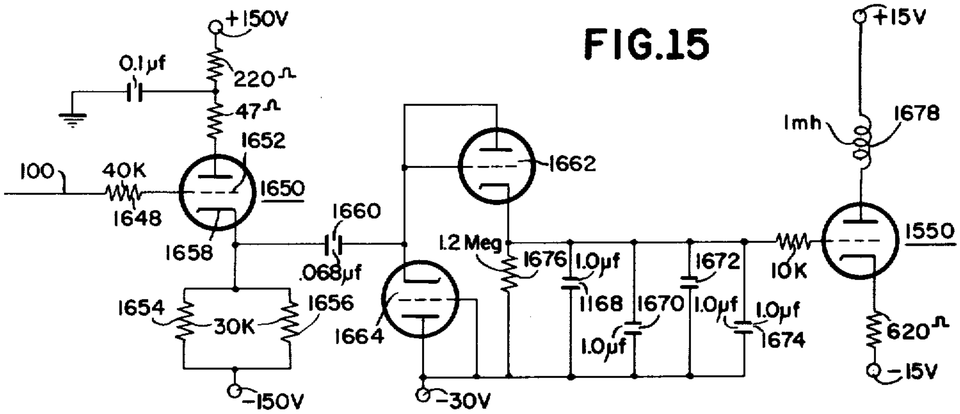

FIG. 15 illustrates in schematic form the Excess Target Counter and associated Relay Driver identified as blocks 1548 and 1550 in FIG. 12.

Figure 16:
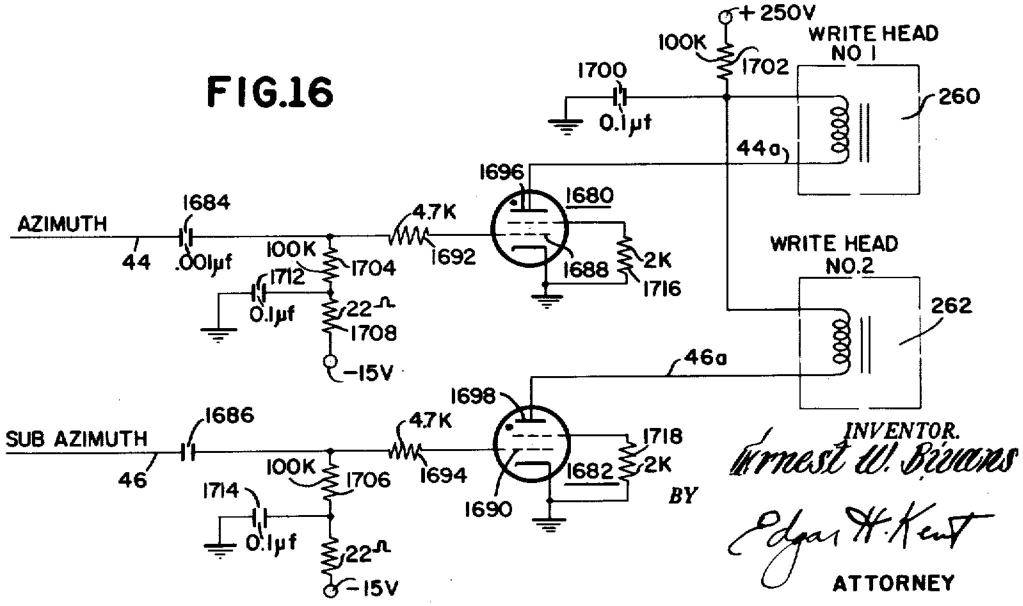

FIG. 16 illustrates in schematic form the Drum Write Circuits of the type identified as blocks 261 and 263 in FIG. 3.

Figure 17:
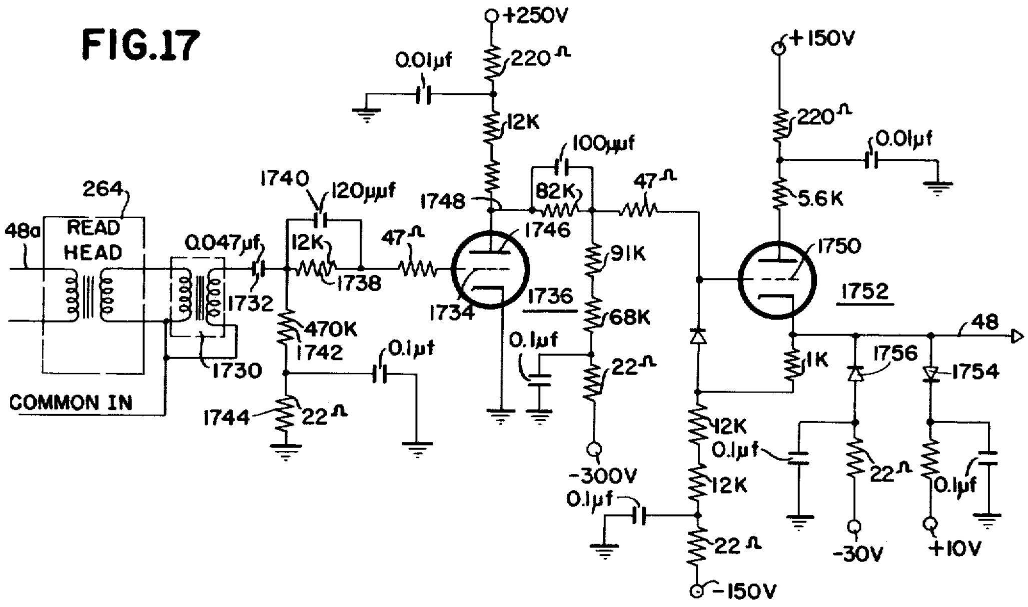

FIG. 17 illustrates in schematic form a Drum Read Circuit of the type identified as block 265 in FIG. 3.

Figure 2:
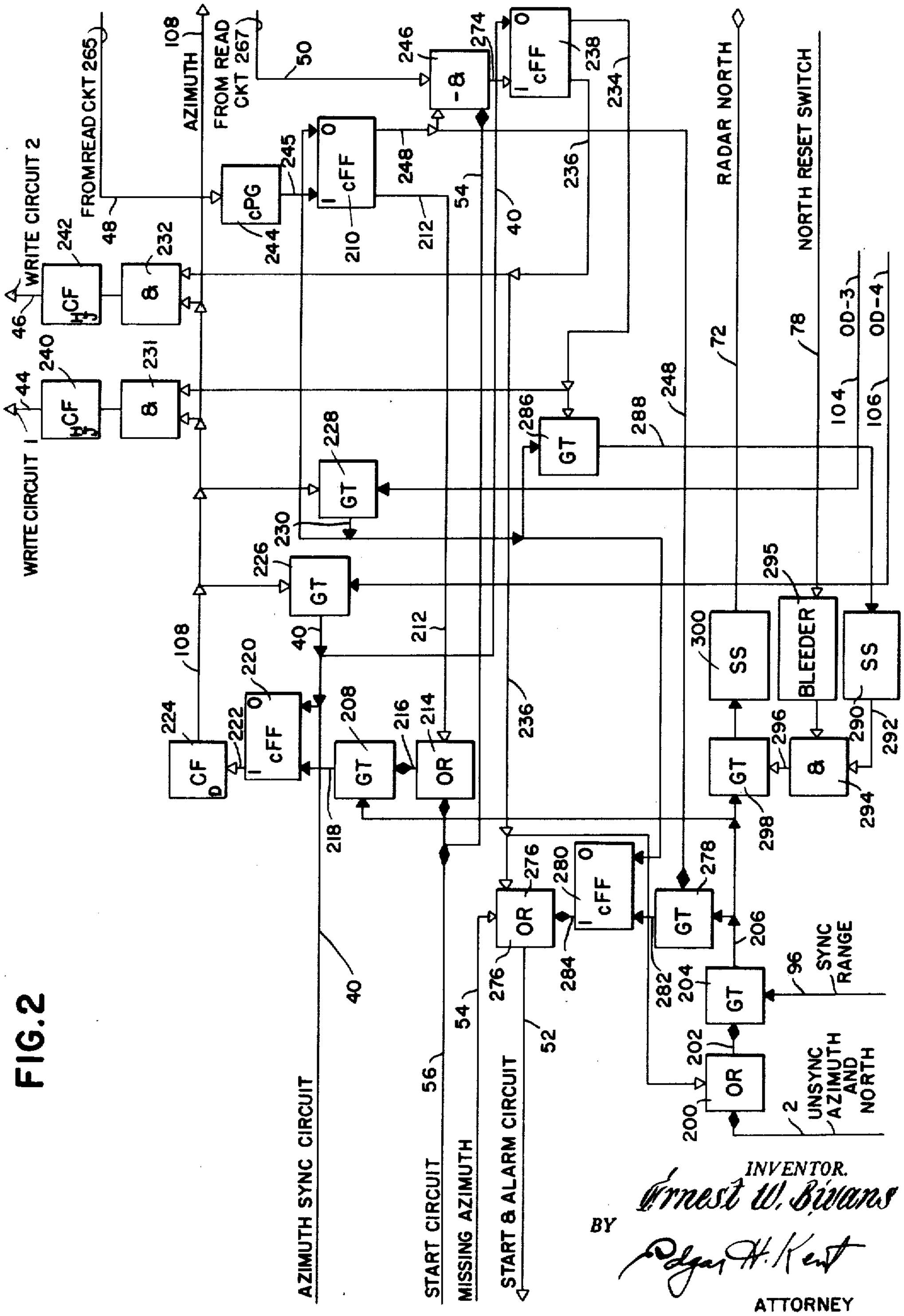
FIG. 2 illustrates in block schematic or logical form the Azimuth and North Protection Circuit identified as block 38 in FIG. 1*a*.
Figure 18:
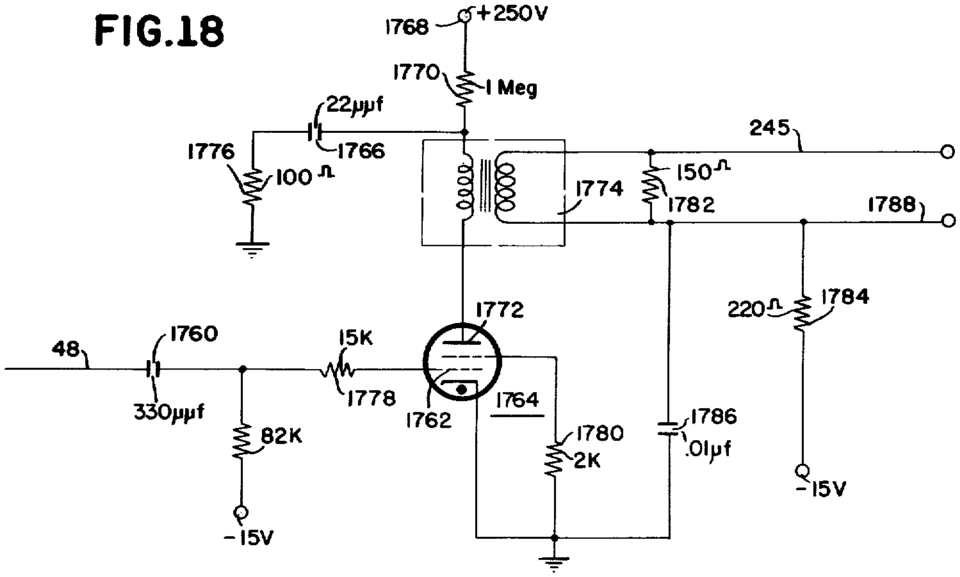

FIG. 18 is a wiring diagram of the Model C Pulse Generator identified as block 244 in FIG. 2.

Figure 19:
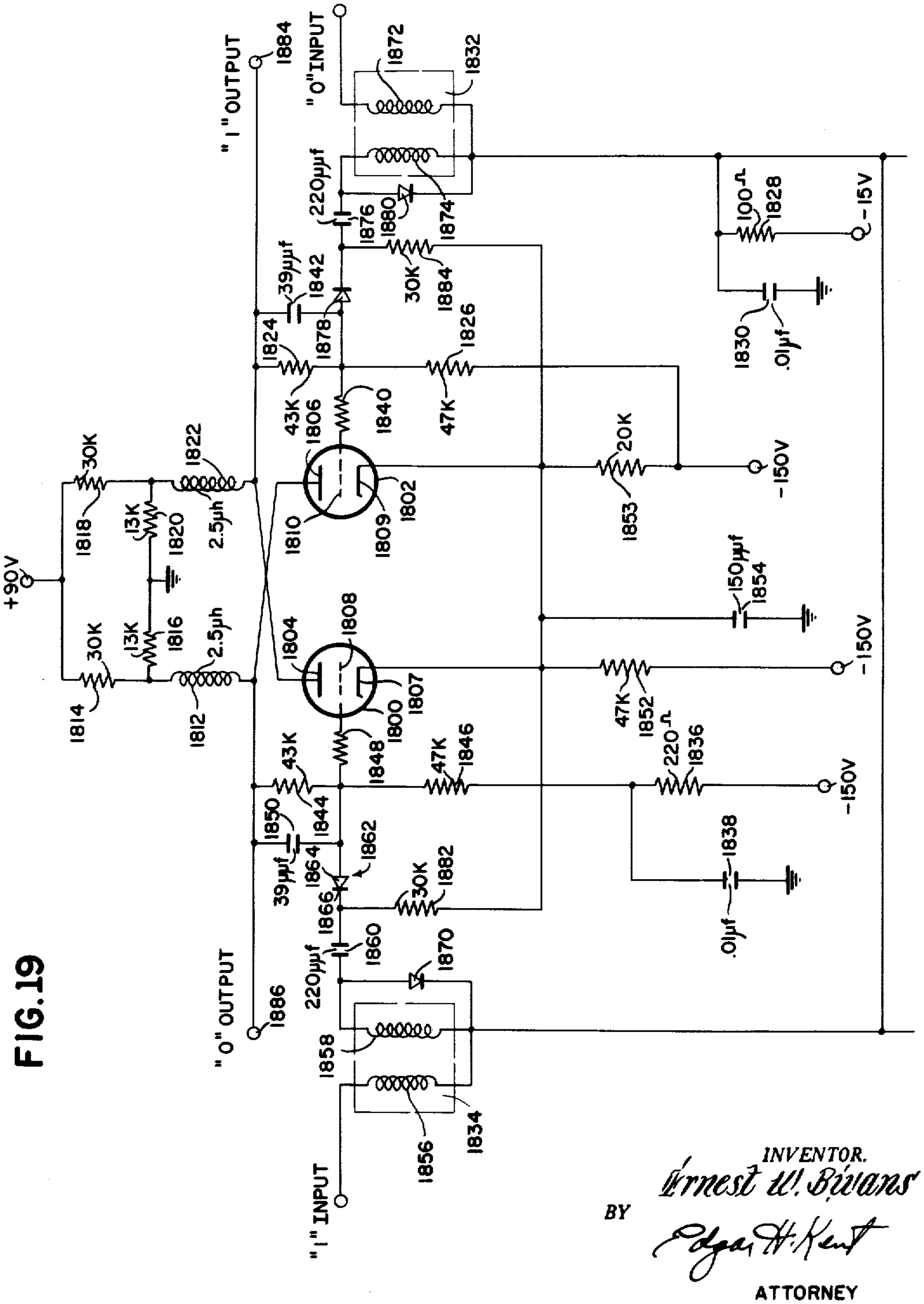

FIG. 19 is a wiring diagram of the Model D flip-flop identified as block 1518 in FIG. 12.

Figure 20:
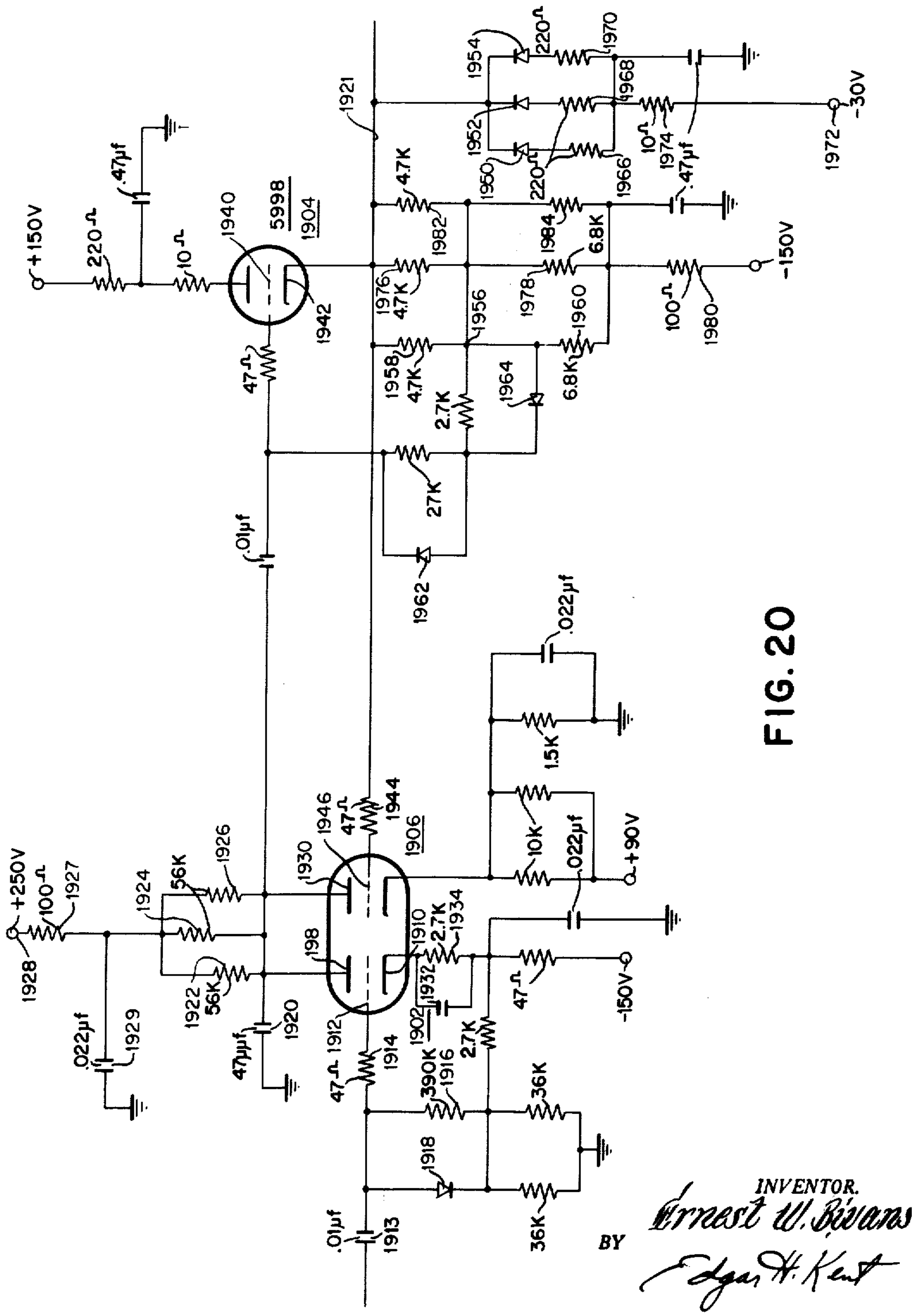

FIG. 20 is a schematic diagram of the power inverter identified as blocks 1524 and 1534 in FIG. 12.

CONVENTIONS EMPLOYED

Throughout the following description and in the accompanying drawings there are certain conventions employed which are familiar to certain of those skilled in the art. Additional information concerning these conventions is as follows:

In the block diagram figures of the drawings a conventional solid arrowhead is employed to indicate (1) a circuit connection, (2) energization with standard positive pulses and (3) the direction of pulse travel which also indicates the direction of control. A similarly shaped hollow arrowhead is employed throughout the drawings to indicate a non-standard pulse having a duration considerably longer than the pulses indicated by a solid arrowhead, and although generally rectangular in form, in some cases are somewhat sawtooth in form, for example, signals produced by magnetic cores. A solid diamond-shaped arrowhead indicates (1) a circuit connection and (2) energization with a D.C. level. An open diamond-shaped arrowhead indicates analog signals, sinusoidal signals or triangular signals. Cables which are used to transfer data are indicated by two parallel lines widened in the form of a circle at some intermediate point, the numbers within the circle indicating the number of conductors. By this convention, cables employing the circle indicate that the conductors of that cable convey information by the presence or absence of a pulse in parallel transfer. D.C. levels are on the order of 10 volts when positive and 30 volts when negative except where otherwise indicated, whereas pulses indicated by conventional solid arrowheads and referred to as standard pulses are positive .1 microsecond half sine 20 to 40 volts. The input and output lines of the block symbols are connected to the most convenient side of the block including the same side in some cases. An input line to a corner of a block symbol and an output line from the adjacent corner of that symbol indicates that the pulse or D.C. level is applied to the input of the circuit represented by the block and the input conductor is electrically connected to the output conductor of the adjacent corner. Bold face character symbols appearing within a block symbol identify the common name of the circuit represented, that is, FF identifies a flip-flop, GT a gate circuit, OR a logical OR circuit, and so forth. The character subscripts preceding bold face characters identify the model of the circuit represented by the bold face character, that is, $_C$FF identifies a model C flip-flop $_A$GT identifies a model A gate circuit and so forth.

In the description, azimuth and range signals are described as unsynchronized or synchronized. In the present embodiment, all incoming azimuth and range signals are unsynchronized with respect to the associated data processing machine, and thereafter referred to as synchronized azimuth and range signals respectively. The timing signals with which the incoming signals are synchronized are designated respectively as OD–1, OD–2, OD–3 and OD–4. These are standard .1 microsecond pulses occurring at intervals of 2.5 microseconds which are continuously recycled, that is, an OD–4 pulse is followed in 2.5 microseconds by an OD–1 pulse. The time at which these signals occur is designated as OD–1, OD–2, OD–3 and OD–4 time respectively. OD timing pulses may be generated by any conventional means, as for example, the Timing Pulse Generator described in copending application Serial Number 494,982 (IBM Docket 4490) filed by Robert R. Everett et al. on March 17, 1955.

Flip-flops employed throughout the present apparatus have two inputs and one or two outputs. A positive signal applied to either input is said to "Set" the flip-flop in the binary "1" or binary "0" state, resulting in a positive signal of 10 volts amplitude on the corresponding output and a negative signal of 30 volts amplitude on the other output. The binary "1" and "0" inputs are labeled accordingly. A positive signal applied simultaneously to both inputs is referred to as complementing the flip-flop, i.e., reversing its conduction state. For ease of illustration, the inputs and outputs may be shown on top or bottom, the inputs generally being identified by closed arrowheads.

In the description the general arrangement of the apparatus of a preferred embodiment of this invention will first be described with respect both to the manner in which the various circuit components and apparatus are interconnected and in respect to the general over-all operation which is performed by these components and apparatus. The description of the general arrangement will be followed by separate and detailed descriptions of the various components and apparatus, which so require it, and each section of the description will have a heading which indicates the apparatus about to be described. The following is an index or table of contents of the description:

*Table of Contents*

| | Column Number |
|---|---|
| General Description of Data Filter Circuit | 4 |
| Azimuth and North Protection Circuit | 11 |
| Start and Alarm Circuit | 16 |
| Azimuth Synchronizing Circuit | 22 |
| Motor Drive Circuit | 25 |
| North Synchronizing Circuit | 27 |
| Yoke Speed Changing Mechanism | 32 |
| Sweep Circuit | 36 |
| Display Control Circuit 86 | 38 |
| Photopickup Circuit 94 | 39 |
| Control Element 98 | 41 |
| Yoke North Pulse Generator | 45 |
| Azimuth Alarm Counter 318 | 45 |
| Excess Target Alarm Counter | 47 |
| Azimuth Protection Drum Write Circuits | 48 |
| Azimuth Protection Drum Read Circuits | 48 |
| Model C Pulse Generator | 49 |
| Model D Flip-Flop | 50 |
| Power Inverter | 52 |
| Other Basic Circuits | 53 |

GENERAL DESCRIPTION OF DATA FILTER CIRCUIT

Referring now to the drawings and more particularly to FIG. 1 thereof, there is illustrated in block form a preferred embodiment of the present apparatus. Object location data consisting of unsynchronized azimuth and North signals, target signals and range signals on conductors 2, 4 and 6 respectively, are obtained from a remotely positioned object location site indicated as block 8. In one application, this object location site may comprise a polarized transmitting antenna rotating around its vertical axis wherein the object might comprise a target, the radial distance and the angular position of the target from the antenna comprising the range and azimuth of such target. However, since neither the object location site nor the mode of transmission of the above defined information to conductors 2, 4 and 6 constitutes a part of the present invention, a detailed description is considered unnecessary for an understanding thereof.

Unsynchronized azimuth information on conductor 2 comprises a serial of substantially rectangular flat topped signals varying between 200 and 400 microseconds in duration which occur 256 times per scan of the rotating antenna or approximately once for each 1.4 degrees of radar antenna rotation. North signals on conductor 2 comprise an azimuth signal closely followed by another similar signal which is interpreted as a North signal, which occurs only once per radar antenna scan at the radar North position. Unsynchronized range information on conductor 6 may comprise a series of standard .1 microsecond pulses which in the preferred embodiment recur at approximately 625 microsecond intervals. These .1 microsecond range signals occur approximately in the center of the time interval during which azimuth signals can appear. In the preferred embodiment, a total of 64 range signals occur between normally spaced azimuth signals. Target information on conductor 4 comprises similar 0.1 microsecond pulses which occur in synchronism with unsynchronized range signals which appear at a rate dependent upon the remote radar target return. The azimuth signal's repetition rate is determined by the speed of rotation of the remote radar antenna, which may vary for example between 2 and 11 r.p.m. While the present apparatus is designed to operate over the above described range, to simplify the description and timing of the preferred embodiment, the antenna will be assumed to rotate at a nominal speed of 6 r.p.m. At this assumed speed, the azimuth pulse rate is 25.6 cycles per second, while the corresponding azimuth pulse rates for 2 and 11 r.p.m. are approximately 8.4 and 47 cycles per second.

To initially start operation, a potential is applied from Start and Alarm Circuit 10 through conductor 12, low speed centrifugal switch 14 and conductor 16 to complete a circuit through which unsynchronized azimuth pulses on conductor 2 are applied to Start and Alarm Circuit 10. After a predetermined number of these pulses have been applied to the Start and Alarm circuit within a time interval consistent with the slowest specified speed of operation, a circuit is completed within the Start and Alarm Circuit 10 through which a 60 cycle source is applied through conductor 18 to motor drive circuit 20. Motor drive circuit 20, in response to this 60 cycle voltage, generates a two phase alternating potential which is applied through conductors 22, 24 and 26 to synchronous motor 28. Synchronous motor 28 is thereby initially energized with a 60 cycle source.

Motor 28, hereinafter referred to as the azimuth drive motor, is a conventional two pole hysteresis synchronous motor having a nominal impedance of approximately 360 ohms, and operating from the two phase input supplied by motor drive circuit 20 to provide a high and substantially uniform torque from zero to 100% slippage. A hysteresis synchronous motor is utilized in the preferred embodiment partially because of its superior starting torque characteristics and the fact that no auxiliary starting circuit is required. Motor 28 has an output shaft 30 to which a plurality of mechanisms such as low speed centrifugal switch 14 is connected.

As is well known in the art, the synchronous speed of a two pole synchronous motor driven by a 60 cycle source is 3600 r.p.m. When motor 28 accelerates to a speed of approximately 500 r.p.m., the contacts of low speed centrifugal switch 14 open, thereby de-energizing the previously described circuit from the Start and Alarm Circuit 10. However, a second circuit maintains the 60 cycle source applied to the motor drive circuit until the completion of the start cycle. As the motor reaches a speed slightly above its maximum normal operating speed, 256 times 11 or 2,816 r.p.m. at the prescribed upper antenna speed of 11 r.p.m., the contacts of high speed centrifugal switch 32 open, thereby causing triangular waveforms to be applied from Azimuth Synchronizing Circuit 34 through conductor 36, Start and Alarm Circuit 10, and conductor 18 to the motor drive circuit 20. Simultaneously the 60 cycle source previously applied to the motor drive circuit is removed, thereby terminating the start cycle.

Unsynchronized azimuth pulses, when applied to Azimuth and North Protection Circuit 38 through conductor 2, are synchronized and applied through conductor 40 to Azimuth Synchronizing Circuit 34. Azimuth Synchronizing Circuit 34 is utilized to drive motor 28 in synchronism with the remote radar antenna by using synchronized azimuth pulses to control the motor speed. As will be shown and described in greater detail hereinafter, Azimuth Synchronizing Circuit 34 includes a triangular generator adapted to generate one triangular waveform cycle for each azimuth pulse applied thereto. Since motor 28 makes one complete revolution for each azimuth pulse, and since there are 256 azimuth pulses generated per antenna revolution, the azimuth pulse repetition frequency is 1,536 pulses per minute at the assumed antenna rotation rate of 6 r.p.m. This establishes the normal operating speed of motor 28 at 1,536 r.p.m.

Azimuth pulses are utilized in the present apparatus to perform varied functions. In addition to providing an instantaneous indication of the azimuth coordinate of a target within a revolution of 1.4°, they are utilized through the Azimuth Synchronizing Circuit 34 to drive motor 28 in synchronism with the remote radar antenna. Additional functions performed by azimuth pulses will be described hereinafter. Due to these varied applications, missing or excess azimuth pulses may result in loss of synchronism and loss of azimuth and range counts. To prevent these undesirable conditions from arising, the present apparatus includes a Substitute Azimuth Generator and Spurious Protection Gate, shown as block 42, which is connected to the Azimuth and North Protection Circuit 38 through conductors 44, 46, 48 and 50. Substitute Azimuth Generator and Spurious Protection Gate 42 is utilized in the preferred embodiment to supply a predetermined time delay to enable each azimuth pulse to condition the circuit for the passage of the succeeding azimuth pulse. Thus the entry time for regular azimuth signals is limited to a comparatively short interval of the azimuth cycle. During the interim period, undesired spurious signals are inhibited from passing beyond the entry point to the system. In addition, Missing Azimuth Generator 42 functions to supply substitute azimuth pulses to perform practically all the functions of the regular azimuth pulse in the event that a regular azimuth pulse is not received within a predetermined time interval. The Azimuth and North Protection Circuit 38 operates in conjunction with Substitute Azimuth Generator and Spurious Protection Gate 42 to perform the above described functions. In addition, the Azimuth and North Protection Circuit 38 is connected through conductor 52 to Start and Alarm Circuit 10 to provide an alarm after a predetermined number of missing azimuth pulses have been detected within a relatively short interval determined by the parameters of the Start and Alarm Circuit. Conductors 54 and 56 connected from the Start and Alarm Circuit 10 to the Azimuth and North Protection Circuit 38 supply necessary potentials to permit operation of Azimuth and North Protection Circuit 38 and Substitute Azimuth Generator and Spurious Protection Gate 42. Gear reducing mechanism 58 connected to shaft 30 is a 32:1 gear reduction which enables the yoke 60 to make one revolution for each 8 revolution of the remote radar antenna. Shaft 59 therefore runs at eight times yoke speed due to the 32:1 gear reduction. Yoke speed changing mechanism 62 provides the necessary correction to synchronize the North position of the yoke 60 with the North position of the remote radar antenna by either stopping or accelerating the yoke at double speed until synchronism is obtained. If the yoke and remote radar antenna are in synchronism, no change is produced by the yoke speed changing mechanism. The North Synchronizing Circuit 64 controls the yoke speed changing mechanism 62 through conductors 66, 68 and 70 depending on the relative occurrence between the radar North pulse on conductor 72 and the yoke North pulse on conductor 74. The time during which North Synchronizing Circuit 64 functions is controlled by the cam actuated North reset switch 76 which controls the Azimuth and North Protection Circuits through conductor 78 to limit operation of the North Synchronizing Circuit 64 for a period of approximately 10 degrees before and 5 degrees after a yoke North position. The switch limits operation of the North Synchronizing Circuit 64 to this 15 degrees period by controlling the anode potential applied through conductor 78 to the North Synchronizing Circuit.

The preferred embodiment herein described utilizes a rotating coil deflection system to obtain a polar presentation of the target area to be mapped. Since the range information occurs at a fixed rate, a fixed period linear sweep may be used, and since this range information is started from zero by each azimuth pulse, synchronized azimuth pulses may be used to trigger this sweep circuit. According, a synchronized azimuth pulse is applied from Azimuth and North Protection Circuit 38 through conductor 44 to sweep circuit 82, which generates a sawtooth waveform to drive deflection yoke 60 through conductor 84. Since sweep circuit 82 is triggered by a true azimuth pulse on conductor 44, it is evident that when an azimuth pulse is missing no sweep is made. Such a provision is necessary since the azimuth pulse is used to reset the range counter, as more fully described hereinafter, and failure to reset the range counter at normal azimuth time could produce a false range count and target display if a target was detected during a missing azimuth.

Before describing the various features associated with the display, a general description of the mapping technique employed in the subject apparatus will be given. Video mapping, as herein employed, is one way of preventing spurious signals or other undesired data, such as that resulting from cloud formations, mountains, etc. from being displayed. Conversely, the technique permits display of the reproduction of indications such as location of targets, routes of attack, reference numerals and the like. The present mapping approach utilizes the fact that most unwanted information appears on a P.P.I. in recognizable areas, and therefore allows for area-wise masking of unwanted information. Masking is accomplished by applying a filter which is opaque to blue light over areas where mapping is desired. In the preferred embodiment herein described, mapping is performed by applying a rapid drying colored liquid, which is opaque to blue light, over the desired target area; the flow of filtered target information can then be controlled manually by a trained operator. Thus if a pulse represents non-useful target data, the C.R.T. face is manually masked, preventing the utilization of the unwanted information. The P.P.I. type display is on a P–7 phosphorus screen, so that intensification resulting from targets produces a blue light flash and a long persistent yellow after-glow on the screen of the cathode ray tube. The long persistent yellow afterglow of a target aids the operator in the selection of targets. This is especially useful when a target enters the radar coverage area in a field of clutter caused by clouds, noise or other forms of interference. If the general area of this field is masked by the operator, blue-flash target indications cannot filter through. If the condition requiring the masking is eliminated or its position transferred in space, such as might result, for example, from moving cloud formations, this condition becomes apparent to the operator, who can then remove that portion of the masking fluid, thus allowing any targets in that area to be detected on the next radar scan. In this way the operator is able to monitor changing conditions and to remove or add masking material to correspond to such conditions.

Target signals on conductor 4, comprising 0.1 microsecond pulses occurring in synchronism with range pulses, are connected to target display control 86. In response to each target signal, the target display control circuit generates an unblanking signal which is applied to control grid 88 of cathode ray tube 90 via conductor 92 to unblank the beam for a predetermined interval. In the preferred embodiment, an interval of approximately 43 microseconds is employed. If the target thereby displayed is not masked, the resulting blue flash on the screen is detected by the photo pickup 94 and applied through conductor 96 as a filtered target signal to control element 98. Control element 98 thereupon causes a reintensity signal of approximately 180 microseconds duration to be applied through conductor 100, target display control 86, and conductor 92 to control grid 88 of C.R.T. 90. Thus the present apparatus utilizes a double intensification system so that masked targets will appear at one intensity level and unmasked or filtered targets at a higher intensity level on the face of a cathode ray tube.

Unsynchronized range signals on conductor 6 are applied to control element 98 where they are synchronized with OD–2 timing pulses and applied through conductor 102 as synchronized range pulses to Azimuth and North Protection Circuit 38. OD–3 and OD–4 timing pulses are applied through conductors 104 and 106 to Azimuth and North Protection Circuit 38. Radar North pulses are applied from Azimuth and North Protection Circuit 38 through conductor 72 to reset azimuth counter 109. Azimuth pulses are applied from Azimuth and North Protection Circuit 38 through conductor 108 to step the azimuth counter 106 and to reset range counter 110. Unsynchronized range pulses on conductor 6 are synchronized by control element 98 and applied through conductor 112 to step the range counter 110 and to "prime" the delay register 114. Delay register 114 is a shift register and a pulse on the conductor 112 labeled Prime sets the first stage to the one state, all stages having previously been set to the zero state by a pulse on the conductor 116 labeled Reset.

The primary function of azimuth and range counter circuits 109 and 110, respectively, is the translation of azimuth and range signals into a binary representation of the polar coordinates of targets. The azimuth counter 109 serves to indicate the angular position of the remote radar antenna at any given instant. In the preferred embodiment, the radar scan of 360° is divided into 256 equally spaced azimuth segments, each segment representing approximately 1.4° of angular rotation. The azimuth counter 109 is reset in response to a North pulse on conductor 104, and as the remote radar antenna rotates approximately 1.4 degrees, an azimuth pulse is supplied to the azimuth counter 106. For each succeeding angular rotation of 1.4 degrees, a pulse is supplied to the azimuth counter 109. Thus the count held by the azimuth counter at any particular instant is a function of the angular position of the remote radar antenna. For each angular position that an azimuth pulse is generated by the remote radar, the range counter must count from zero through the maximum range of the remote radar. Accordingly, range pulses generated at the remote radar site are a function of time, which in turn is proportional to the distance of a target from the radar site. As previously noted, in the preferred embodiment range signals are 0.1 microsecond in duration which occur 625 microseconds apart. These 0.1 microsecond range pulses are converted by the control element 98 to pulses of sufficient duration to operate the range counter and delay register. The azimuth counter 109, range counter 110 and delay register 114 may be any suitable type, but preferably they are of the type shown and described in copending U.S. application Serial Number 502,634 by Hawley K. Rising et al., filed on April 20, 1955. In the preferred embodiment, the azimuth counter 109 and range counter 110 contain the count at any instant in complement form, which is read from these counters on respective conductors 118 and 120 to associated azimuth read out register 122 and range read out register 124. These read out registers are preferably of the type described in the above copending application 502,634. The logic employed in the counters 106 and 110 is such that each time these counters are stepped, each counter must be shifted as many times as it has stages. Shift pulses on lines 126 and 128 serve to shift azimuth counter 106, while shift pulses on lines 130 and 132 serve to shift range counter 110. The two shift lines to each counter is a design consideration described in detail hereinafter. Shift pulses on line 134 serve to shift delay register 114. The number of shift pulses applied to these counters is controlled by delay register 114, which contains the same number of stages as counters 109 and 110. Delay register 114 maintains accurate control of the number of shift pulses supplied to the counters 106 and 110 by means of the prime operation, which sets the first stage to one prior to the application of shift pulses on conductors 126, 128, 130, 132 and 134. Thus when the one state has been shifted from the last stage of the delay register 114, a pulse is applied on conductor 136, labeled Stop Shift, to control element 98, which prevents further shifting operations.

Whenever a filtered target pulse appears on line 96, the control element 98 supplies shift pulses on conductor 138 to read out registers 122 and 124. In response to the shift pulses on conductor 138, the target data signals on conductors 118 and 120 serve to insert in the respective read out registers information contained in associated counters 109 and 110, respectively. Once the shifting operation is completed and the information in the azimuth and range counters 109 and 110 transferred to respective read out registers 122 and 124, control element 98 supplies a read out pulse on conductor 140 to cause the information in the read out registers 122 and 124 to be read out in parallel in complement form to respective gate circuits 142 and 144. It is pointed out that since the information is shifted serially from the counters 106 and 110 to the read out registers 122 and 124 in complement form, and since the parallel readout from the registers 122 and 124 is also in complement form, the true number is supplied to the gate circuits 142 and 144. The true number supplied to gate circuit 142 indicates an azimuth, while the true number supplied to gate circuit 144 indicates range, thereby defining the position of a target.

Control pulses OD–2 and OD–4 are applied to the control element 98 by the conductors 146 and 106 respectively. OD pulses from timing circuit 148 occur at a high rate of speed with respect to the other input pulses to the control element 98, thereby serving to synchronize the target, range and azimuth signals applied to control element 98 with the timing of the drum system described hereinafter. A pulse on conductor 150 labeled Drum Demand is applied to control element 98 whenever the drum system is ready to receive information. In response to the drum demand pulse the control element 98 will generate a Data Available pulse on conductor 152 if the read out registers contain information ready to be supplied. This Data Available pulse on line 152 is applied through a delay unit 153 to sample the gates 142 and 144. The data available pulse is also applied to the Write Status Circuit 156 for status control purposes more fully explained hereinafter.

From the above description it is seen that the function of actually furnishing target location data to the data processing machine is performed in the counter section. Polar target information from an associated radar is accepted by the counter section which maintains a cumulative count of azimuth and range data associated with each 360° radar scan. When a filtered target is indicated by a pulse on conductor 96, an accumulated count designating the location of the target is automatically made available to the data processing machine as more fully described hereinafter.

A magnetic drum 158 is provided with a timing channel and an index channel, each of which delivers through read heads 160 and 162 respectively their recorded signals to the previously mentioned timing circuit 148. As described in more detail in copending application Serial No. 494,982 filed by Robert R. Everett et al. on March 17, 1955, the timing channel has recorded thereon a succession of binary one signals in a closed loop, whereas the index channel has recorded thereon a succession of binary zero signals with a single binary one recorded at some arbitrary point in that channel. Each binary one signal recorded in the timing channel causes the timing circuit 148 to generate equidistantly spaced OD pulses, that is, an OD–1 pulse is produced on one conductor followed by an OD–2 pulse on another conductor, followed by an OD–3 pulse on another conductor, which is followed by an OD–4 pulse on still another conductor. The time space between these pulses is 2½ microseconds. OD–1 pulses as well as OD–2, OD–3 and OD–4 pulses have a repetition rate of 10 microseconds. While the frequency rate of the timing circuit heretofore described is 100 kc., this frequency is reduced through suitable means to 50 kc., producing a corresponding repetition rate of 20 microseconds. The binary one signal recorded in the index channel, when delivered through read head 162 to the timing circuit 148, causes that timing circuit to generate a 1 microsecond pulse on conductor 164 labeled OD Index. The OD timing and index pulses are applied to the Write Status Circuit 156, and the OD–2 and the OD–4 pulses are also applied to the previously mentioned control element 98. The drum 158 is further provided with a CD Status Control channel and an OD Status Control channel. The signals recorded in the OD Status Control Channel by write head 165 are delivered by way of a read head 166 to the Write Status Circuit 156. As will become apparent from the ensuing description, a binary one signal is delivered from the OD Status Control Channel through the read head 166 to the Write Status Circuit 156 provided that the next drum register into which data is to be written already contains useful information, whereas a binary zero signal is delivered from the OD Status Control Channel to Write Status Circuit 156 provided the next drum register into which information is to be written is empty. The Write Status Circuit 156 in response to a binary zero signal from the OD Status Control Channel causes a pulse to be delivered through conductor 150, labeled Drum Demand, to Control Element 98. In response to this signal, the control element 98 causes the contents of the read out registers 122 and 124, if full, to be delivered to gates 142 and 144. When those signals are delivered, a pulse is generated by the control element 98 and delivered to the conductor 152 labeled Data Available. This data available pulse through a suitable delay unit 153 causes the gate circuits 142 and 144 to be sampled, and the data contained in the gate circuits 142 and 144 to be applied to a write circuit 168 by way of the conductors of cables 170 and 172. This data available pulse produced on conductor 152 is also applied to the Write Status Circuit 156. In response to this data available pulse, Write Status Circuit 156 causes a pulse to be delivered through a conductor 174 labeled Write to write circuit 168, and a Write a One signal to be delivered to a write head 176, thereby causing a binary one signal to be recorded in the CD Status Control Channel. The write signal on conductor 174, which occurs at OD–3 time, followed by a pulse on conductor 175 labeled OD–3+1.7 causes the signals stored in the write circuit 168 to be delivered to a set of write heads 178, thereby causing the data which was read from the read out registers 122 and 124 to be recorded in the registers of drum 158. As more fully described in copending application Serial Number 494,982, in the event that the Write Status Circuit 156 receives a binary zero signal from the OD Status Control Channel indicating that the next drum register available to be written into is empty, and no signal is received from the conductor labeled Data Available, the Write Status Circuit 156 causes a Write a Zero signal to be delivered to the write head 176, thereby causing a binary zero to be recorded in the CD Status Control Channel, indicating that the register corresponding thereto is empty. In the event that a binary one signal is received from the OD Status Control Channel, the Write Status Circuit 156 causes a Write a One signal to be delivered to the write head 176, and this recorded binary one signal in the CD Status Control Channel indicates that the register corresponding thereto is full. Signals recorded in the CD Status Control Channel are read by read head 180 and applied to a Read Status Circuit 182. The Read Status Circuit 182 further receives a control signal from a data processing machine 184 by way of a conductor 186 labeled Read. When the data processing machine 184 desires to receive data from the drum 158, it causes a positive potential to be delivered by way of the conductor 186 to the Read Status Circuit 182. Assuming that the data processing machine 184 does not desire to receive data from the drum 158, it produces a negative potential on the conductor 186, thereby causing the Read Status Circuit 182 to operate in the following manner:

(1) If a binary zero signal is received from the CD Status Control Channel through the read head 180, Read Status Circuit 182 causes a binary zero to be recorded in the OD Status Control Channel; (2) in the event a binary one signal is received from the CD Status Control Channel through the read head 180, the Read Status Circuit 182 causes a binary one to be recorded in the OD Status Control Channel. The above operation could be summarized by saying that when the Read Status Circuit 182 is not instructed to read, it merely causes the status signals in the CD Status Control Channel to be recorded on the OD Status Control Channel. Assuming that the data processing machine 184 desires to receive data from the drum 158, it produces a positive potential on the conductor 186 labeled Read, in response to which the Read Status Circuit 182 operates in the following manner:

(1) If a binary one signal is received from the CD Status Control Channel through the read head 180, the Read Status Circuit 182 produces a positive .1 microsecond pulse on the conductor 188 labeled Read Sample. This pulse on conductor 188 causes a set of read circuits and sample gates 190 to deliver the signals read from drum 158 by a set of read heads 192 to be delivered to a temporary storage register 194. The data processing machine 184 prior to instructing the Read Status Circuit 182 to read causes a .1 microsecond pulse to be delivered to a conductor 196 labeled Clear, thereby setting each stage of temporary storage register 194 to the binary zero state. When in the binary zero state, the temporary storage register 194 is ready to receive data. When the Read Status Circuit 182 produces a pulse on the conductor 188 thereby causing the signals read from the drum register to be placed in the temporary storage register 194 as above described, this pulse is also applied to the data processing machine 184, thereby informing the data processing machine 184 that the temporary storage register 194 contains data. Data processing machine 184 thereupon delivers a pulse to a conductor 198, which when received by the temporary storage register 194 causes the data stored therein to be delivered by way of the conductors of a cable 200 to the data processing machine 184.

(2) If a binary zero signal is received by the Read Status Circuit 182 from the CD Status Control Channel, then the Read Status Circuit 182 merely causes a Write a Zero signal to be recorded in the OD Status Control Channel, indicating that the register is still empty.

AZIMUTH AND NORTH PROTECTION CIRCUIT

Referring to FIG. 2, there is illustrated in logical form the Azimuth and North Protection Circuit identified as block 38 in FIG. 1. Incoming unsynchronized azimuth pulses on conductor 2 are applied through OR circuit 200 and conductor 202 to condition gate circuit 204. The pulses on conductor 102 which sample gate circuit 204 are synchronized range pulses from control element 98 which occur at a particular OD–2 time. When a synchronized range signal on conductor 96 samples gate 204 when an azimuth signal is present on conductor 202, gate 204 generates a .1 microsecond pulse which is applied through conductor 206 to sample gate circuit 208. The output signal from gate circuit 204 may therefore be considered as a synchronized azimuth signal. Since the operation of gate circuit 204 is practically instantaneous, gate circuit 208, sampled by the output of gate circuit 204, is sampled at approximately OD–2 time. During normal operation as defined hereinafter, i.e., after completion of the start cycle, gate circuit 208 is conditioned at approximately azimuth time by the binary one output from flip-flop 210, which is applied through conductor 212, OR circuit 214 and conductor 216. Therefore when gate 208 is sampled by the synchronized azimuth signal on conductor 206, a positive pulse is generated and applied through conductor 218 to set flip-flop 220 in the one state, which thereupon generates a positive D.C. signal which is applied through conductor 222 and cathode follower 224 to conductor 108 labeled Azimuth. The signal on conductor 108 is applied to condition gate circuits 226 and 228. At OD–3 time, gate 228 is sampled by an OD–3 timing pulse on conductor 104, thereby generating a pulse which is applied through conductors 230 to reset flip-flop 210 to the binary zero state, thereby removing the conditioning potential on conductor 216 applied from the binary one output of flip-flop 210 to gate circuit 208 through the above described circuit. At OD–4 time, an OD–4 timing pulse is applied through conductor 106 to sample gate circuit 226, resulting in a positive signal being generated on conductor 40 which is applied to reset flip-flop 220 in addition to being applied to Azimuth Synchronizing Circuit 34 (FIG. 1*a*). Since flip-flop 220 was set at approximately OD–2 time and reset at OD–4 time, the output signal on conductor 222 is approximately 5 microseconds in duration, i.e., the interval between OD–2 and OD–4 time. Flip-flop 220 thereupon remains reset until the next azimuth pulse is received.

12

From the preceding description, it is apparent that an azimuth pulse, after passing gate circuit 208, will cause the conditioning potential on conductor 216 to be removed from gate circuit 208 after approximately 2.5 $\mu$ secs. by the OD–3 pulse and thereby effectively inhibit any succeeding pulses on conductor 206 until the conditioning potential is restored on conductor 216 for the next azimuth signal. Thus, even though a spurious signal on conductor 2 conditions gate 204 to generate a pulse on conductor 206, when a synchronized range pulse is received on conductor 96, it will be inhibited from passing through the Azimuth and North Protection Circuit by gate circuit 208.

The output of cathode follower 224 is also applied through conductor 108 to AND circuits 231 and 232. During normal operation, a positive signal is applied from Substitute Azimuth Generator and Spurious Protection Gate 42 (FIG. 1*a*) via conductor 48 to pulse generator 244, which in response thereto generates a pulse to set flip-flop 210 to the binary one condition, thereby providing the conditioning potential on conductor 216. The time at which this occurs is more fully described hereinafter. In the event that an azimuth pulse is missing, no signal is applied to conductor 48 but a negative signal is applied through conductor 50 to negative AND circuit 246. Under the missing azimuth condition, a negative potential is also applied to the input 248 and a zero potential applied to input 154 of negative AND circuit 246, so that flip-flop 238 is set to the binary one state by the output from negative AND circuit 246. While the remaining flip-flops utilize a positive pulse which is inverted at the input of the circuit, flip-flop 238 utilizes an RC input whereby a negative signal is applied directly from negative AND circuit 246 to the binary one input conductor 274. Under this condition, AND circuit 232 is conditioned by the binary one output of flip-flop 238 on conductor 236. Since AND circuits 231 and 232 are conditioned through opposite outputs 234 and 236 respectively of flip-flop 238, it is apparent that one of these AND circuits will be conditioned to pass pulses at any given interval, depending on whether or not an azimuth pulse is received. During normal operation, i.e., no missing azimuth pulses, AND circuit 231 is conditioned by a positive D.C. potential on conductor 234 from flip-flop 102, so that the signal applied through conductor 108 passes through AND circuit 231, cathode follower 240, thence through conductor 44 to Substitute Azimuth Generator identified as block 42 in FIG. 1*a* and to the Sweep Circuit identified as block 82 in FIG. 1*a*. If AND circuit 232 is conditioned, the signal on conductor 108 passes through AND circuit 232, cathode follower 242 and conductor 46 to Substitute Azimuth Generator 42. As will be described more fully hereinafter, Substitute Azimuth Generator 42 causes a positive pulse to be applied to conductors 48 and 50 if an azimuth pulse is received, or a negative pulse to be applied to conductor 50 if an azimuth pulse is missing. These potentials, in turn, determine whether the pulse on conductor 108 goes through conductor 44 or 46 to Substitute Azimuth Generator 42.

During normal operation, a signal is applied from conductor 108 through AND circuit 231 and cathode follower 240 and conductor 44 to Substitute Azimuth Generator and Spurious Protection Gate 42. After about 90% of an azimuth period, i.e., the interval between azimuth pulses, a signal on conductor 48 causes flip-flop 210 to provide the conditioning potential to gate circuit 208 to permit the succeeding azimuth pulses to be gated through. In this manner regular azimuth pulses on conductor 2 are enabled to pass to conductor 108 to provide the previously described functions.

As previously described, the functions provided by the azimuth pulses are such that in the event that no azimuth pulse is received during the normal azimuth time, a substitute azimuth pulse must be generated by the present apparatus. For a complete understanding of the method of generating a substitute azimuth pulse reference will be made to FIG. 3 which illustrates in detail the Substitute Azimuth Generator and Spurious Protection Gate identified as block 42 in FIG. 1*a*.

Essentially the Substitute Azimuth Generator is a single track cylindrical drum 250 having the ability to store data in magnetic form. This drum is rotated by the azimuth motor 28 through shaft 30 and a 1.0 to 0.8 gearing mechanism 252, 254, and therefore rotates at 80% of the motor speed. Since one revolution of the motor corresponds to one azimuth cycle, one 360 degree azimuth cycle corresponds to 288 degrees of drum rotation. Input conductors 44 and 46 from the Azimuth and North Protection Circuit are connected through write circuits 256 and 258 to write heads 260 and 262 respectively. The drum also includes read heads 264 and 266 which are connected through read circuits 265 and 267 to conductors 48 and 50 respectively. An erase head 272 is positioned between read head 266 and write head 260. Generally speaking, during normal operation, the azimuth pulse on conductor 108 is applied through conductor 44 and write circuit 256 to write head 260, thereby causing the signal to be recorded on the drum 250. As the drum rotates, this signal is read by read heads 264 and 266 and applied through read circuits 265 and 267 to conductors 48 and 50 respectively. As previously described with reference to FIG. 2, the read signal on conductor 48 causes gate circuit 208 to be conditioned to pass the succeeding azimuth pulse on conductor 206. When the succeeding azimuth pulse is gated through gate 208 and applied to conductor 108, gate circuit 228 is conditioned and sampled at OD–3 time. The resulting pulse on conductor 230 causes flip-flop 210 to be reset to the binary zero state and thereby apply a positive potential through conductor 248 to negative AND circuit 246. Thus when the recorded azimuth signal is read by read head 266 and applied through read circuit 270 as a negative signal on conductor 50, it is inhibited by the negative AND circuit due to the positive potential on input conductor 248 of negative AND circuit 246. Negative AND circuit 246 is a logical circuit requiring all inputs to be negative to obtain a negative output. Since no output is obtained during normal operation the above described sequence with respect to drum 250 is repeated for each azimuth cycle. As is evident from the preceding description, substitute azimuth generator and spurious protection gate 42 performs a dual function. The function whereby each azimuth pulse is delayed for the required time to condition gate circuit 208 to pass the succeeding azimuth pulse is the spurious protection gate which functions as above described. The manner in which substitute azimuth pulses are provided when a regular azimuth pulse is missing will now be described in detail with reference to FIGS. 2 and 3.

Assuming that no azimuth signal is received on conductor 2 at the expected time, a previously recorded signal is read through conductor 48 to set flip-flop 210 in the binary one state and condition gate 208 through conductor 216. However, due to the absence of the incoming azimuth signal no signal is generated by gate 208 and applied to conductor 108. Due to the absence of the signal on conductor 108, gate 228 is not conditioned and flip-flop 210 is therefore not set in the binary one state at OD–3 time by the output from gate 228. When the previously recorded signal passes under read head 266, a negative signal is generated by read circuit 267 and applied through conductor 50 to negative AND circuit 246. Input conductor 248 of negative AND circuit 246 has a negative potential thereon since flip-flop 210 is set in the binary one state, while input conductor 54 of negative AND circuit 246 has a zero potential from Start and Alarm Circuit 10 (FIG. 1*a*) thereon during normal operation. It should be noted that input conductor 54 has a positive potential thereon during the start cycle to prevent read out of any data recorded during the start cycle by negative AND circuit 246. Since none of the inputs of negative AND circuit 246 are positive, the resultant negative potential output from AND circuit 246 is applied through conductor 274 to set flip-flop 248 in the binary one state. When flip-flop 238 is set in the binary one state, the resulting positive potential on conductor 236 conditions AND circuit 232, and in addition is applied to OR circuits 200 and 276. The resulting output from OR circuit 200 is applied through conductor 202 to condition gate circuit 204. When gate circuit 204 is sampled by the succeeding synchronized range pulse on conductor 96, the resulting output on conductor 206 is gated through gate circuit 208, which has remained conditioned, to conductor 108. Since AND circuit 232 has been conditioned by the potential on conductor 236 as above described, the signal conductor 108 is applied through AND circuit 232 and its associated cathode follower 242 through conductor 46 and write circuit 258 to write head 262. Since the synchronized range pulse used to sample gate 204 occurs at OD–2 time, the duration of the output pulse from flip-flop 220 is limited to 5 microseconds by the OD–4 pulse in the manner previously described.

Thus when the expected azimuth pulse is not received, a substitute azimuth pulse is generated and recorded on drum 250 by write head 262. Write head 262 is physically positioned 43.2 electrical degrees closer to read head 264 than is write head 260. Thus, even though the substitute azimuth pulse is recorded 403.2 electrical degrees after the last received azimuth pulse, or 43.2 electrical degrees late, it will be read by read head 264 at the same time as though it had been written by write head 260 at 360 electrical degrees. Therefore, the time at which the signal is recorded by write head 262 corresponds to the time at which the signal would have passed under write head 262 had it been recorded by write head 260 during normal operation. In other words, the signal is recorded by write head 262 on the same spot on the drum where it would normally have been recorded by write head 260. Thus when the missing azimuth pulse is detected, a substitute azimuth pulse is automatically provided to be recorded by write head 262 and the sequence of operation thereafter with respect to the Substitute Azimuth Generator and the Azimuth and North Protection Circuit is identical to that which would have occurred had the azimuth pulse been recorded by write head 260 in the conventional manner.

Due to the relatively slow speed of operation of magnetic drum 250 as compared to magnetic storage drums, special drum read and write circuits were required which are described hereinafter. The drum employed in the preferred embodiment is a D.C. biased single track drum 8 inches in diameter and ⅜ of an inch wide. The read and write heads consist of wire wound around permeable cores and are spaced approximately 0.001 to 0.002 inch from the drum surface. Erase head 272 is a conventional permanent magnet type of drum eraser.

While it is desirable to generate substitute azimuth pulses for pulses which might be missing at irregular intervals, the substitute azimuth pulse circuit described above would continuously supply substitute pulses even though no azimuth pulses were being received at the Mapper input. To preclude operation under this condition, the output conductor 236 of flip-flop 238 is also applied to OR circuit 276, the output of which OR circuit is connected to Start and Alarm Circuit 10 (FIG. 1). This circuit provides for an alarm should a number of azimuth signals be missing within a predetermined interval. Details of the alarm system are more fully shown and described with reference to the Start and Alarm Circuit shown in FIG. 4.

The preferred embodiment of Azimuth and North Protection Circuit herein described also includes means for actuating an Alarm Circuit if the yoke 60 (FIG. 1) is rotating at a subharmonic speed of the radar antenna. During the starting operation, the motor reaches a speed above its normal maximum operating speed before the 60 cycle source is removed. Thereafter the motor speed decreases until it becomes synchronized with the radar antenna. However, it is possible for the motor speed to fall below the speed of the radar antenna and synchronize in at some subharmonic speed thereof. For example, assuming the radar antenna is rotating at 6 r.p.m., it would be possible for the yoke to rotate at 3 r.p.m. Under this condition, every other azimuth pulse from the radar would perform the normal azimuth functions heretofore described and every second pulse would be rejected.

To recognize this condition if it should occur, the circuit comprising the gate 278, flip-flop 280 and OR circuit 276 is provided to actuate the Start and Alarm Circuit. This circuit operates in the following manner:

Gate 208 is conditioned by a binary one output from flip-flop 210 applied through OR circuit 214 when flip-flop 210 is set in the binary one state for a relatively brief interval during the expected azimuth time. Shortly after the azimuth pulse has arrived however, flip-flop 210 is reset to the binary zero state by the output from gate circuit 228 which is sampled by an OD–3 pulse on conductor 104. When flip-flop 210 is reset to the binary zero state, the resultant positive potential on conductor 248 conditions gate circuit 278. Since gates 208 and 278 are conditioned by opposite outputs of flip-flop 210, it is apparent that gate 278 is conditioned for almost the entire azimuth cycle except for the relatively small interval during which gate 208 is conditioned. Thus if a subharmonic or spurious azimuth pulse is received on input conductor 2, it will condition gate 204 which, when sampled by the next synchronized range pulse on conductor 96, will generate a pulse on conductor 206 to sample gate 278. Since gate 278 is conditioned, a positive pulse is applied through conductor 282 to set flip-flop 280 in the binary one state. The resulting positive output on conductor 284 is applied through OR circuit 276 to conductor 52. As will be described in greater detail hereinafter, a succession of these pulses on conductor 52 within a predetermined interval serves to actuate an alarm circuit.

From the above description it is apparent that subharmonic pulses or excessive spurious or substitute azimuth signals result in the alarm circuit being actuated by positive signals being applied to separate inputs of OR circuit 276. The remaining input conductor 54 to the OR circuit is utilized to prevent an alarm condition during the starting cycle by inhibiting OR circuit 276 from pulsing. This is done by applying a positive potential to conductor 54 during the start cycle.

To provide an accurate P.P.I. type display on the cathode ray tube 90, it is necessary to synchronize the P.P.I. yoke North with the radar North signal on each scan of the radar antenna. To obtain this synchronization, it is necessary to compare the radar North signal with the yoke North signal generated by the P.P.I. and then make the necessary correction required to synchronize the two positions. In order to compare the two signals, it is first necessary to separate radar North signals from the incoming azimuth signals. As previously described, a radar North signal is indicated by two closely spaced azimuth signals on input conductor 2, the two signals being separated by one range count, or approximately 625 microseconds. The second of the two pulses must be separated to perform its assigned functions.

During normal operation, i.e., no missing azimuth pulses, flip-flop 238 remains reset to the binary zero state, so that gate circuit 286 is conditioned by the positive D.C. level applied through its output conductor 234. From the previous description it will be apparent that gate circuit 286 is not conditioned when a substitute pulse is being supplied in lieu of a regular azimuth pulse, since flip-flop 238 is set to the binary one state. At OD–3 time, the pulse generated by gate 228 is applied through conductor 230 to sample gate 286. Since gate 286 is conditioned, the resulting generated pulse is applied through conductor 288 to multivibrator 290. Multivibrator 290 may be any conventional single-shot multivibrator adapted to generate a substantially rectangular wave in response to a 0.1 microsecond pulse applied thereto, and is preferably of the type shown in copending application Serial Number 474,346, "Monostable Multivibrator," filed by William L. Jackman on December 10, 1954. Multivibrator 290 generates a long pulse which is applied through conductor 292 to AND circuit 294. The second input to AND circuit 294 is a D.C. signal applied through North reset cam switch 76 (FIG. 1*a*) via conductor 78 and a bleeder 295. North reset switch 76 is only closed for a time interval beginning approximately 6 azimuth positions, representing approximately 10 degrees of azimuth sweep, before the yoke North signal and remains closed for approximately 5 degrees after the yoke North pulse occurs. Assuming positive potentials on conductors 78 and 292 of AND circuit 294, the resultant positive output is applied through conductor 296 to condition gate circuit 298. The timing of the above circuit is such that gate 298 is conditioned at the time the second azimuth pulse indicating North, which is approximately 625 $\mu$secs. after the regular azimuth pulses, is received on conductor 202. After gate 298 has been sampled by a pulse on conductor 206, the positive potential output from the multivibrator 290 terminates before the next range pulse arrives, and thereby inhibits gate 298 from passing any additional pulses on conductor 77 which would produce a false North indication. The above described circuitry constitutes the North Protection Circuit. From this description it will be readily appreciated that the time relationship between the above recited sequence of events is such that gate 298 is conditioned only at the time that the second closely spaced azimuth pulse occurs. When gate 298 is sampled in the above described manner, the resulting 0.1 microsecond signal is applied to single-shot multivibrator 300. Multivibrator 300 essentially is the same type as multivibrator 290, and functions as a pulse stretcher to lengthen the .1 microsecond pulse generated by gate 298 to 5 microseconds to trigger the North Synchronizing Circuit, identified as block 64 in FIG. 1, through conductor 72. The output from single-shot multivibrator 300 is also applied through conductor 72 to reset the azimuth counter.

From the above description it is readily appreciated that the function of the North and Azimuth Protection Circuit is to guard against the loss of incoming azimuth pulses, to prevent spurious pulses from being used as true azimuth pulses and to separate the North from the incoming azimuth signals. As described hereinafter, the function of the North signal is to maintain synchronization between the P.P.I. yoke and radar antenna and to reset the azimuth counters.

START AND ALARM CIRCUIT

Referring now to FIG. 4, there is illustrated in schematic form the Start and Alarm Circuit identified as block 10 in FIG. 1. These circuits are shown in a single drawing and described as a single logical unit because of their interconnection and because certain of the components are common to both circuits. In the ensuing description, however, the start and alarm operations will be described separately as far as possible.

The Start circuit, as previously described, is used to start a two phase motor 28 (FIG. 1*a*) which drives the mapper CRT yoke by providing a circuit through which a 60 cycle source is supplied to the motor. In addition, it assists in the starting operation of the Azimuth and North Protection Circuit (FIG. 2) as well as the Azimuth Synchronizing Circuit (FIG. 5).

To initiate operation, relay 302 is energized through a circuit from positive 48 volt source 303 through conductor 12, low speed centrifugal switch 14, conductor 16, choke 304, resistor 308, relay 302 and conductor 310 to a negative 48 volts potential source 311. While the means employed to complete this circuit have not been shown, any suitable keying or switching arrangement may be utilized. When relay 302 is actuated in the above described manner, a circuit is completed between the input for unsynchronized azimuth and North pulses on conductor 2 through contacts 312 and 314 of relay 302 and conductor 316 to the azimuth alarm counter 318.

Azimuth alarm counter 318, as more fully described hereinafter, is an analog counter which builds up a potential in response to a succession of pulses applied thereto within a predetermined interval. After the potential charge developed by the accumulation of successive azimuth pulses within a time interval consistent with the slowest speed of operation reaches a predetermined threshold potential, the negative bias on control grid 322 of relay driver 320 is overcome thereby causing relay driver 320 to conduct. When relay driver 320 conducts, the potential on anode 323 falls to a relatively low value, thereby energizing relay 326 through a circuit from anode 322 through choke 324, conductor 325, contacts 328 and 330 of relay 302, conductor 332, relay 326, and conductor 334 to positive 150 volts potential terminal 336. When relay 326 is energized in the above described manner, a 30 volt, 60 cycle source, shown as terminal 17, is applied through contacts 337 and 338 of relay 326 and conductor 18 to the motor drive circuit identified as block 20 in FIG. 1*a*. Thus the motor drive circuit is initially energized by a 60 cycle driving source.

When the motor accelerates to a speed of approximately 400 r.p.m., the contacts of low speed centrifugal switch 14 are opened, thereby de-energizing relay 302. Relay 326, however, which is normally energized through contacts of relay 302, remains energized through a holding circuit from 150 volts source 336 through conductor 334, relay 326, conductor 340, contacts 342 and 341 of relay 326, conductor 35, resistor 348, high speed centrifugal switch 32, conductor 33 and alarm reset switch 350 to ground.

When relay 302 is de-energized, contacts 312 and 314 are opened and contacts 314 and 315 closed, thereby opening the circuit between the azimuth input conductor 2 and the azimuth alarm counter 318 and completing a circuit from the output of OR circuit 276 through contacts 314 and 315 of relay 302 and conductor 316 to azimuth alarm counter 318. OR Circuit 276, shown in FIG. 2 as part of the Azimuth and North Protection Circuit, supplies an output to conductor 52 in response to input signals indicative of certain alarm conditions. Thus, spurious or substitute azimuth signals, applied to input conductors 284 and 236 respectively, are enabled to control the analog counter 318. From the above description it is apparent that analog counter 318, together with its associated relay driver 320, performs a dual function with respect to the start and alarm conditions.

When relay 326 is energized, relay 352, shown directly below relay 326 in FIG. 4*a*, is energized through a circuit from negative 48 volts source 311 through conductor 310, relay 352, normally closed contacts 358 and 360 of thermal relay 362, conductor 364, contacts 366 and 368 of relay 338 and conductor 370 to positive 48 volts source shown as terminal 303. The function of thermal relay 362 is described hereinafter.

When relay 352 is thus energized, a circuit is completed from a positive 10 volts source 374 through contacts 376 and 378 of relay 326 and conductor 56 to OR circuit 214, as shown in FIG. 2. Also, this positive 10 volts potential is also initially applied to negative AND circuit 246 through contacts 380 and 382 of relay 352 during starting operation to inhibit the negative AND circuit from initiating the generation of a substitute azimuth signal. Negative AND circuit 246 is inhibited during start time, since the motor is initially under the control of the 60 cycle source rather than under the control of the azimuth pulses, and any signals recorded or read from the azimuth protection drum 250 would not occur in proper time relationship. This positive 10 volt potential at terminal 374 is also applied through contacts 380 and 382 of relay 352 and conductor 54 to OR circuit 276, causing a continuous D.C. level to be applied to azimuth alarm counter 318 during start time, thereby preventing actuation of the alarm circuit during the start cycle. It may be noted at this time that azimuth alarm counter 318 is pulse responsive, that is, it is not affected by a D.C. level applied to its input.

Since the motor is driven by the 60 cycle source during start time, its speed increases rapidly until it reaches a speed exceeding its maximum normal operating speed, at which time the contacts of high speed centrifugal switch 32 are opened. When centrifugal switch 32 is thus actuated, relay 326 is deenergized, contacts 337 and 338 are open and contacts 338 and 399 are closed, thereby removing the 60 cycle source 17 applied to the motor drive circuit through conductor 18 and substituting the sinusoidal output on conductor 36 from the Azimuth Synchronizing Circuit 34 (FIG. 1*a*) to the motor drive circuit through conductor 18. In addition, the 10 volt potential at terminal 374, previously applied through contacts 376 and 378 and conductor 56 to OR circuit 214, is removed, thereby placing OR circuit 214 under the control of conductor 212 from flip-flop 210 (FIG. 2).

Although contacts 376 and 377 are open when relay 326 is de-energized, relay 352 remains energized through a holding circuit from 48 volts source 303 through conductor 370, contacts 384 and 386 of relay 352, conductor 364, contacts 360 and 358 of thermal relay 362, relay 352 and conductor 310 to negative 48 volts source 311. Although relay 326 is de-energized, a positive 10 volt potential on conductor 374 is applied through contacts 380 and 382 of relay 352 and conductor 54 to OR circuit 276.

Thus when relay 352 is energized and relay 326 is de-energized, a circuit is completed from a source of negative 30 volts potential at terminal 388 through thermal relay 362, contacts 390 and 392 of relay 352, contacts 376 and 377 of relay 326 to positive 10 volts source 374, thereby energizing thermal relay 362. When thermal relay 362 is energized, it will open its contacts 358 and 360 for a predetermined time delay of sufficient duration to provide sufficient time for motor 28 to synchronize with respect to the output from azimuth synchronizing circuit 34 through the previously described circuit. When contacts 358 and 360 of thermal relay 362 open, relay 362 is de-energized, thereby removing the positive 10 volts applied from source 374 through conductor 54 to OR circuit 276. Under this condition, azimuth alarm counter 318 is under the control of input conductors 236 and 284 of OR circuit 276. Simultaneously, the 10 volt potential on conductor 56 is removed from OR circuit 214 and negative AND circuit 226 thereby placing the negative AND circuit under the control of the two remaining inputs (FIG. 2). It should be noted that the potential applied through conductor 56 to OR circuit 214 must be maintained until the first true azimuth pulse samples gate circuit 208 to initiate recording of the first true azimuth pulse on azimuth protection drum 250 (FIG. 3). After relay 352 has been de-energized, the contacts 358 and 360 of thermal relay 362 return to their normal closed position.

The above described sequence comprises the Start operation which commences with the energization of relay 302 and continues until the motor is running in synchronism with the synchronized azimuth pulses, indicating the P.P.I. yoke is rotating in synchronism with the remote radar antenna. When the yoke and radar North positions are synchronized in a manner to be described with reference to the North Synchronizing Circuit 64 (FIG. 1*a*), the apparatus is ready to commence normal operation. This operation will be described after a description of the remaining alarm circuitry associated with the present figure.

To preclude the possibility of having the mapper operate asynchronously with respect to the radar antenna, an alarm circuit has been incorporated in the present apparatus which primarily indicates asynchronous operation. As previously described, when motor 28 accelerate to approximately 400 r.p.m., relay 302 is de-energized through the opening of the contacts of low speed centrifugal switch 14, thereby completing a circuit from the output of OR circuit 276 to the input of azimuth alarm counter 318. Also, relay 400 is energized through a circuit from anode 323 of relay driver 320 through choke 324, conductor 326, contacts 328 and 329 of relay 302, through contacts 394 and 396 of relay 352, conductor 398, relay 400 and conductor 102 to positive potential source 336.

Referring back to FIG. 2, input conductor 236 of OR circuit 276 is connected to the binary one output of flip-flop 238, which is set in the binary one state whenever substitutions are made for missed azimuth pulses, thereby indicating the absence of normal azimuth signals. Gate 278, which is conditioned for most of the azimuth cycle as previously described, passes all pulses on line 282 which are accepted by gate 204. The output of gate 278 is connected via conductor 282 to the one input of flip-flop 280. The output of flip-flop 280 comprising input conductor 284 of OR circuit 276 consists of pulses of variable duration which result from any of the following conditions: (1) mapper asynchronism, that is, shaft 30 (FIG. 1) is not synchronous with incoming azimuth signals; (2) subharmonic operation, i.e., shaft 30 is rotating in subharmonic relationship to incoming azimuth signals, or (3) spurious azimuth signals arriving at random between regular pulses.

From the above description, it is apparent that alarm signals indicative of various alarm conditions may be applied at inputs 236 and 284 of OR circuit 276. Analog counter 318 responds to this alarm information so that if the alarm condition persists for more than a predetermined number of azimuth signals, relay driver 320 responds to the output from analog counter 318 to energize alarm relay 400 through the above described circuit.

When relay 400 is energized as above described, it is maintained in that condition through a holding circuit including contacts 404 and 406 of relay 400, and alarm reset button 350 connected to ground. When alarm relay 400 is energized, relay 326 is energized through a circuit from ground through alarm reset switch 350, contacts 408 and 410 of relay 400, conductor 412, choke 414, conductor 416, relay 326, conductor 334 to +150 volts at terminal 336. When relay 326 is energized due to an alarm condition, a 60 cycle source 17 is applied through contacts 337 and 338 of relay 226, through conductor 18 to the motor drive circuit 20 (FIG. 1*a*). Since high speed centrifugal switch 32 is not included in the energizing circuit of relay 326 during an alarm condition, its operation has no effect and motor 28 accelerates rapidly to approximately 3600 r.p.m. and continues to operate at that speed until alarm reset switch 350 is opened, thereby de-energizing relays 400 and 326. Thus under all alarm conditions, synchronous motor 28 is driven by a 60 cycle current.

Alarm relay 400, when energized, also completes a circuit from 15 volt terminal 418 through conductor 420, contacts 422 and 424 of relay 400, conductor 426, contacts 428 and 430 of relay 432, conductor 434, audible alarm lamp 436 and associated resistor 438, resistor 440, audible alarm 442, conductor 444 to the other 115 volt terminal 446. Audible alarm 442, when energized, provides an audible alarm which can be silenced by momentarily closing alarm silencing push button switch 448. When switch 448 is closed, relay 432 is energized through the following circuit: 115 volt terminal 418, conductor 420, contacts 422 and 424 of relay 400, conductor 426, contacts 450 and 452 of relay 454, conductor 456, audible alarm switch 448, conductor 458, relay 432, conductor 460 to the other 115 volt terminal 446. When energized, relay 432 is maintained in that condition through a holding circuit including its contacts 428 and 429. When relay 432 is energized in the above described manner, contacts 428 and 430 open the circuit to audible alarm 442. In any event, audible alarm 442 will be silenced and relay 432 dropped out when relay 400 is de-energized.

During an azimuth alarm condition, azimuth alarm lamp 462 is energized through a 6.3 volt source on terminal 464, conductor 466, lamp 468, conductor 470, contacts 472 and 474 of relay 400, conductor 476, contacts 478 and 480 of relay 482 through conductor 484 to 6.3 volt terminal 486. After the alarm condition has been remedied, alarm reset switch 350 is depressed, thereby de-energizing alarm relay 400. When relay 400 is de-energized, azimuth alarm indicator lamp 468 is de-energized through contacts 472 and 474 of relay 400.

An indicating circuit included in the present apparatus is known as the "No Target to Computer" indicator circuit, wherein the computer is data processing machine 184 (FIG. 1*b*). Assuming that the motor is running in synchronism with the incoming azimuth signals, the No Target to Computer indicator 488 is energized through a circuit from 6.3 volt terminal 464 through conductor 466, indicator 488, conductor 490, contacts 473 and 474 of relay 400, through conductor 476, contacts 478 and 480 of relay 482 through conductor 484 to the other 6.3 volt terminal 486. In order to send targets to the computer, target data switch 492 is momentarily closed, thereby completing a circuit to relay 494 from +48 volt terminal 496 through conductor 498, target data switch 492, conductor 500, relay 494 conductor 502, contacts 423 and 424 of relay 400, conductor 504 to negative 48 volt terminal 506. When energized, relay 494 is maintained energized through its contacts 508 and 510 which short circuit data flow switch 492.

Assuming relay 510 has been energized by a North radar pulse in a manner to be described hereinafter with reference to the North Synchronizing Circuit (FIG. 7), relay 482 is energized through a circuit from +48 volt terminal 496 through conductor 498, contacts 514 and 516 of relay 512, choke 518, conductor 520, contacts 522 and 524 of relay 494, conductor 526, relay 482, conductor 528, contacts 423 and 425 of relay 400 and conductor 504 to negative 48 volt terminal 506. Since relay 482 is now energized, "No Target to Computer" indicator 488 is extinguished through contacts 478 and 480 of relay 482, thereby indicating that information is being passed from the present apparatus to the data processing machine. The condition indicated by the "No Target to Computer" indicator is that targets are inhibited from passing to the computer. The exact manner in which these targets are inhibited will be described with reference to the Control Element shown as block 98 in FIG. 1*b* and described in detail with reference to FIG. 12. Before relay 482 is energized, relay 530 is energized from 150 volt terminal 532 through conductor 534, relay 530, conductor 536, contacts 538 and 540 of relay 482 to ground. During the time that relay 530 is energized, a circuit is completed from terminal 542, through conductor 544, contacts 546 and 548 of relay 530 to conductor 550 labeled Data Inhibit. This circuit effectively inhibits any information from being read out of the range and azimuth counter circuits (FIG. 1) during an alarm condition by disabling the "data available" flip-flop and thereby bypassing the drum demand pulse around the associated channel in a manner to be described hereinafter. When relay 482 is energized, relay 530 is deenergized through contacts 538 and 540 of relay 482.

From the preceding description it may be noted that the No Target to Computer Indicator 488 does not indicate faulty operation but merely indicates that the present apparatus is not supplying target information to the computer.

The third alarm condition shown in FIG. 4 of the preferred embodiment is known as the Excess Target condition. If improper mapping causes excessive targets to be impressed on the photo pick up 94 (FIG. 1*a*), reintensified target signals are applied from Control Element 98 through the display control circuit 86 to control grid 88 of CRT 90 as previously described. If an excessive number of these targets exists and if the alarm condition persists for more than a predetermined time, the excess target counter causes an associated relay driver to be triggered, thereby causing a positive potential to be applied from potential source 532 through conductor 534 to energize relay 530. The excess target counter and associated relay driver are shown as blocks 1548 and 1550 in FIG. 12. The energizing of relay 530 effectively inhibits Range and Azimuth target data from being read out by inhibiting the Data Available flip-flop in a manner noted heretofore. When relay 530 is energized, contacts 552 and 554 are closed, thereby completing a circuit to energize audible alarm 442. When relay 530 is energized, its contacts 556 and 558 close, thereby completing a circuit from 6.3 volt terminal 464 through conductor 466, excessive target indicator 560, contacts 556 and 558 of relay 530, conductor 562, contacts 479 and 480 of relay 482 through conductor 484 to 6.3 volt terminal 486. It is apparent from the above description that during an Excessive Target condition, the audible alarm as well as the alarm lamp will indicate that an alarm condition does exist. However, since audible alarm 442 is actuated under different alarm conditions, it is the Excess Target lamp 560 that distinguishes the particular alarm condition existing during alarm time.

It is also possible for the alarm circuit to be energized if the data processing machine 184 detects erroneous data applied thereto. Under such an alarm condition a potential will be applied across terminals 562 and 564, thereby energizing relay 454. The exact manner in which this potential is applied is beyond the scope of the present invention and does not constitute a part thereof. The circuit through which relay 454 is energized is from terminal 562, computer alarm reset switch 566, contacts 568 and 570 of relay 454 and relay 454 to terminal 564. The energizing of relay 454 causes its contacts 568 and 570 to open, thereby putting resistor 572 in series with relay 454. This is done because of the lower current needed to hold relay 454 compared to the current required for relay actuation. Contacts 574 and 576 of relay 454 close, thereby energizing audible alarm 442. When relay 454 is energized, contacts 578 and 580 close, thereby exciting the associated alarm indicator 582 through the following circuit: from the 6.3 volt terminal 486 and contacts 578 and 580 of relay 454, conductor 584, lamp 582, contacts 586 and 588 of relay 432 and conductor 466 to the other 6.3 volt supply terminal 464.

It should be noted that information going out to the data processing machine 184 should be limited to accurate and logical information. It has been found that during a stop condition of the yoke 60 (FIG. 1*a*) such as occurs during the North synchronizing operation to be described hereinafter, it is desirable to inhibit the output so that extraneous and erroneous information is not sent out. Under a stop condition, the stop relay 590 is deenergized, thereby opening its contacts 596 and 598. This will cause relay 482, which is energized through a circuit including contacts 596 and 598 of relay 590, to be de-energized, thereby inhibiting information being applied to the data processing machine output in the manner heretofore described until the yoke is in synchronism with the radar antenna.

AZIMUTH SYNCHRONIZING CIRCUIT

Referring now to FIGS. 5*a* and 5*b*, there is illustrated in schematic form the Azimuth Synchronizing Circuit identified as block 34 in FIG. 1*a*. Generally speaking, the function of the Azimuth Synchronizing Circuit is to provide an output of triangular wave-forms having a repetition rate frequency corresponding to the repetition rate of the synchronized azimuth pulses applied thereto through input conductor 40. This triangular output is later converted to a two phase substantially sinusoidal waveform by the motor drive circuit 20, which provides the motor drive in response to the synchronized azimuth pulses. Thus the Azimuth Synchronizing Circuit in combination with the motor drive circuit synchronizes the azimuth track on the face of the cathode ray tube with the rotation of the remotely positioned radar antenna.

Essentially the Azimuth Synchronizing Circuit comprises a flip-flop which produces a square wave output having a repetition rate half that of the azimuth pulses, which is then integrated to provide a triangular wave. This triangular wave is then applied through a frequency doubler circuit to restore the output signal of the azimuth synchronizing circuit to the repetition rate of the azimuth pulses. The resultant triangular waveform is then suitably amplified through a circuit including an automatic gain control which provides a substantially constant amplitude of the output signal throughout the frequency range over which the present apparatus is designed to operate.

Referring back to FIG. 1, the input data applied to the Azimuth Synchronizing Circuit 34 comprises synchronized azimuth pulses which are applied from Azimuth and North Protection Circuit 38 through conductor 40. Returning to FIG. 5, the input pulses on conductor 40 are applied through transformers 602 and 604 to control grids 606 and 608 of flip-flop circuit 610. This operation is known in the art as "complementing" the flip-flop, which essentially consists of reversing the state of the flip-flop with each input pulse applied thereto. Since flip-flop circuit 610 is binary connected, that is, requires two input pulses to generate one cycle of a square wave, the output of the flip-flop circuit consists of square waves having a repetition rate which is half that of the azimuth pulses. Flip-flop circuit 610 is the model "C" flip-flop shown in block form throughout the drawings of the present apparatus.

As previously described, the repetition rate of the azimuth pulses applied to the Azimuth Synchronizing Circuit will vary as a function of the rotational speed of the radar antenna. In the preferred embodiment herein described, the azimuth frequency may vary within an approximate range of 8½ to 42½ cycles per second, corresponding to radar antenna speeds of 2 and 10 r.p.m. respectively. Under the assumed antenna speed of 6 r.p.m., the azimuth frequency is 25.6 cycles per second.

A clipping circuit comprising diodes 614 and 616 and their associated clipping potentials of +10 and −30 volts respectively, is connected through conductor 618 to output conductor 612 to insure that the output step function from flip-flop 610 varies between levels of +10 and −30 volts respectively. A second clipping circuit consisting of diodes 620 and 622 cooperates with the automatic gain control stage of the Azimuth Synchronizing Circuit to vary the level of the signal being applied to Miller Integrator 624 as a function of the repetition rate of the azimuth signals. Diodes 620 and 622 vary the amplitude of the output step function from the +10 to −30 volt level to another value depending on the level of the clipping voltage applied from an automatic gain control circuit to be described in greater detail hereinafter. Basically, the clipping levels are selected so that the amplitude of the square wave input to the Miller Integrator stage varies substantially directly as the input frequency. This is necessary in order to obtain a substantially uniform output from the Miller Integrator stage 624, since the output signal level from a Miller Integrator varies inversely as the input frequency. Thus the net effect of clipping diodes 620 and 622 is to so vary the level of the input signal applied to the Miller Integrator as to obtain an output signal from the integrator stage which is substantially uniform throughout the heretofore defined 5:1 frequency range.

Resistor 619 serves as a load resistor for clipping diodes 620 and 622, which in turn control the output level of the square wave applied through conductor 612 to Miller Integrator 624. The output signal from flip-flop 610 is applied through an RC network comprising capacitor 626, resistors 628 and 630 and parasitic suppressor 632 to the control grid of Miller Integrator 624. Resistor 630 and capacitor 634 in the feedback circuit of the Miller Integrator control the time constant of the Miller Integrator circuit. Capacitor 636 and resistor 638 constitute a decoupling network for the negative 300 volt supply potential at terminal 640. Resistor 642 in the screen grid circuit is a parasitic suppressor, while resistor 644 in the anode circuit comprises the load resistor for the Miller Integrator. Resistor 628 forms part of a bleeder network which includes resistors 646, 648, 650, 652 and 654.

The step function applied to the control grid of the Miller Integrator is integrated and appears at anode 656 as a triangular waveform having substantially the same repetition rate as that of the input step function, or half the repetition rate of the synchronized azimuth pulse input. This triangular output is then RC coupled through capacitor 658, resistor 660, and parasitic suppressor 662 to control grid 664 of a driver stage 666. Driver stage 666 essentially is a cathode follower having a primary winding 668 of a step up transformer 670 in its cathode circuit. The output is developed across transformer secondary winding 672 and applied to cathodes 674 and 676 of tubes 678 and 680 respectively. Tubes 678 and 680 together with their associated circuits comprise a frequency doubler stage. The frequency doubler stage shown in the preferred embodiment essentially comprises a cathode follower driven full wave rectifier, since control grids 682 and 684 are connected to anodes 686 and 688 respectively. The cathode follower stage 666 provides the low impedance drive required by the transformer 670. As a result of the full wave rectifier action of the above described frequency doubler stage, the output voltage at center tap 690 of transformer winding 672 is a triangular waveform having a frequency twice that of the input frequency, thereby corresponding to the repetition rate of the input azimuth pulses. The output of the frequency doubler stage is then applied through conductor 692, resistor 694, parasitic suppressor 696 to control grid 698 of a level amplifier stage 700. Level amplifier stage 700 essentially comprises a triode amplifier having a plate load resistor 702 across which the output potential is developed. The circuit also employs cathode degeneration supplied by cathode resistor 704, which assists in providing a substantially stable output signal at anode 706. Resistors 708 and 710 connected between junction point 712 and ground comprises a bleeder network which is used to supply the desired bias for the input level of level amplifier stage 700. The output at anode 706 is coupled through capacitor 714 to terminal 716, from where it is applied through conductor 18 to motor drive circuit 20 (FIG. 1) and also through a waveform shaping network comprising resistor 718 and capacitor 720 to control grid 722 of a driver stage 724. Resistor 718 and capacitor 720 assist the automatic gain control circuit to compensate for gain variations in the system resulting from frequency variation, and thereby help provide a substantially uniform signal to control grid 722 of driver stage 724. Since the filtering effect of an RC network generally varies substantially inversely as the frequency of the signal applied thereto, this shaping network attenuates the high frequency components of the input waveform but allows the low frequency components to pass with negligible attenuation.

Driver stage 724 basically comprises a cathode follower having a winding 726 of transformer 728 in its cathode circuit. The potential developed across transformer windings 730 and 732 is applied to two substantially identical filter sections, each of these sections including a half wave rectifier and capacitive input filter. Diode connected tube 734 comprises a half wave rectifier associated with winding 730, while diode connected tube 736 comprises a half wave rectifier associated with winding 732 of transformer 728. Due to the method of transformer connection, when a signal is applied to driver stage 724, the resulting output across transformer winding 726 causes a positive potential to be developed by transformer winding 730 and diode 734 with respect to the −30 volt reference potential at terminal 738, and a negative potential to be developed by transformer winding 732 and diode 736 with reference to the +10 volt reference potential at terminal 740. When a signal is applied to control grid 722 of driver stage 724, the rectifier filter sections comprising diode 734, resistors 742, 744, 746 and 748, and capacitors 750, 752 and 754 produce a positive output with respect to the −30 volt reference potential which is applied through conductor 756 to control grid 758 of cathode follower 760. Similarly, the combined rectifier filter sections comprising transformer winding 732, diode 736, resistors 762, 764, 766 and 768, and capacitors 770, 772 and 774 produce a negative output with respect to the +10 volt reference potential which is applied through conductor 776 to control grid 778 of cathode follower stage 780.

From the above description it is apparent that the net effect produced by the signal applied to the driver stage is to drive the output of the rectifier circuits from +10 and −30 volt reference potentials toward the mean voltage level of −10 volts. Moreover, the larger the amplitude of the input signal, the greater the deviation toward the mean potential. As noted above, the D.C. output of the filter section referenced at −30 volts is applied to control grid 758 and cathode follower 760. The output potential developed across the parallel combination of resistors 782 and 784 is applied through conductor 786 to the anode of diode 620. Similarly, the D.C. output of the filter section referenced at +10 volts is applied to control grid 778 of cathode follower 780. The output potential developed across cathode resistor 788 is applied through conductor 790 to a cathode of diode 622. From the above description, it is evident that the clipping levels applied to diodes 620 and 622 are such that the amplitude of the step function input applied to Miller Integrator 624 varies substantially directly as the input frequency. Since as previously described the output of a Miller Integrator varies substantially inversely as the input frequency, the net effect of the automatic gain control circuit is to produce an output signal from the Miller Integrator which is substantially constant throughout the frequency range employed.

Summarizing the operation of the gain control circuit, as the output of the Miller Integrator tends to fall due to the decrease in frequency, the corresponding level of the signal applied to the driver stage 666 also falls. As the output from the driver stage 666 tends to decrease, a corresponding decrease is produced at the output of the two filter circuits comprising rectifier diodes 734 and 736 and their associated filter networks. As the output from the filter networks and their associated cathode follower circuits 760 and 780 decreases, lower positive and negative potentials are applied to diodes 620 and 622, thereby reducing the clipping effect of these diodes, effectively resutling in an increase in the amplitude of the step function applied to the control grid of Miller Integrator 624. Thus the above described automatic gain control circuit in combination with clipping diodes 620 and 622 constitutes an automatic means for maintaining a near constant output of the Miller Integrator, since it acts to reinforce the step function input to the Miller Integrator when the output of the integrator would tend to fall due to frequency variation. Actually the output of the Miller Integrator is slightly higher at the upper end of the frequency band but this is desirable in the preferred embodiment since the torque which the motor must develop increases slightly at the higher frequencies due to the increased effect of friction and windage. A substantially uniform output level is required since the amplitude of the signal applied to the phase splitting network which comprises a part of the motor drive circuit must be substantially uniform over the entire frequency range for satisfactory operation.

MOTOR DRIVE CIRCUIT

Referring now to FIG. 6, there is illustrated in schematic form a motor drive circuit of the type identified as block 20 in FIG. 1. The function of the motor drive circuit during normal operation is to convert the triangular output of the azimuth synchronizing circuit into a two phase potential for driving the motor 28. The required two phase supply must be electrically in quadrature and not in direct opposition, that is, they must differ in phase by 90° and not 180°. This is accomplished in the preferred embodiment by applying the input through a phase splitting network to produce two 90° phase displaced outputs. In the ensuing description, it will be assumed that the input to the motor drive circuit comprises the trangular output from the Azimuth Synchronizing Circuit applied during normal operation. However, it will be readily appreciated that the input to the motor drive circuit could also be a conventional 60 cycle sinusoidal supply such as supplied to the Motor Drive Circuit during a Start operation or under an Alarm condition.

The triangular output from the level amplifier stage 700 (FIG. 5*b*) is applied through conductor 18 to control grid 801 of cathode follower input stage 802. Transformer 804, connected to cathode 806 of cathode follower 802, provides the coupling to the phase splitter network. Transformer 804 is a 1:3 step up transformer so that the potential output of the cathode follower is amplified before being applied to the phase splitting network. The phase splitting network in the preferred embodiment essentially comprises two constant amplitude linear phase difference RC networks, the outputs of which remain 90° out of phase over the frequency range employed. The filtering networks employed in the preferred embodiment hereinafter described were empirically developed for optimum output, and a detailed description of the operation of such networks is not considered essential for an understanding of the present invention. Design considerations for such networks are described, for example, in "Design of RC Wide-Band 90-Degree Phase Difference Network" by Donald K. Weaver, Proceedings of the I.R.E., April 1954.

The phase splitting network of the preferred embodiment is a bandpass type network comprising resistors 810 through 819, and capacitors 821 through 830 inclusive. The secondary winding of transformer 804 is center tappped to ground to provide a common reference level for the two phase output. Since the phase splitting network herein described is of the bandpass variety, it maintains the 90° phase difference between the two outputs throughout a frequency range of approximately 8 to 120 cycles per second. Therefore this circuit provides the correct output phase relationship over the frequency range herein employed.

Although the normal fundamental frequency employed in the present embodiment does not exceed 42.5 cycles per second, there is a third and fifth harmonic content in this signal as evidenced by the triangular wave shape. The outputs of the phase shifting networks are not triangular, however, due to the frequency response characteristics of such networks under which the phase relationship between the higher order and the fundamental is not the same as exists at the input. For these reasons, the output waveform of the phase shifting network is substantially sinusoidal. The output quadrature signals on conductors 832 and 834 must be suitably amplified before being applied to motor 28. In the particular embodiment constructed, these output signals are applied through parasitic suppressors 836 and 838 to control grids 840 and 842 of driver stages 844 and 846 respectively. Driver stages 844 and 846 essentially comprise modified cathode followers having transformers in their cathode circuit to provide transformer coupling between the driver stages and the push-pull amplifier output stages. Transformers 848 and 850, connected in the cathode circuit of driver stages 844 and 846 respectively, are step up transformers having a 1:3 ratio which function to amplify the output of the driver stages before being applied to the push-pull amplifier stages.

Since the push-pull amplifiers and associated driver stages are identical, a description of one amplifier and driver circuit will suffice for an understanding of both. The output developed across secondary winding 852 of transformer 848 is applied through conductors 854 and 856 to control grids 858 and 860 of push-pull amplifier tubes 862 and 864 respectively. Resistors 866 and 868 are used to suppress parasitic oscillation in the amplifier circuit. Resistors 870 and 872, connected across transformer secondary winding 852, are damping resistors to provide a suitable output from the transformer to the push-pull amplifier. Resistors 874 and 876, connected through conductor 878 to the center tap of transformer secondary winding 852, comprise a bleeder network which establishes a grid bias between −150 and −300 volts for push-pull amplifiers 862 and 864. The output from amplifiers 862 and 864 is applied from anodes 880 and 882 through parasitic suppressors 884 and 886 to opposite ends of primary winding 888 of output transformer 890. Output transformer 890 is a power transformer having an impedance ratio of 10:1 which is utilized to match the impedance of the push-pull amplifier stages with the impedance of synchronous motor 28. The output impedance of the push-pull amplifiers herein employed is approximately 3600 ohms, while the impedance of the motor in the embodiment as constructed is approximately 360 ohms.

The potential developed across transformer secondary winding 892 of transformer 890 is applied through conductors 22 and 24 to motor 28. As noted above, the push-pull amplifiers associated with driver stage 846 are substantially identical in construction to the push-pull amplifiers 862 and 864 above described, and function to deliver a similar but 90° phase displaced output across primary winding 894 of transformer 896. The output across secondary winding 898 of transformer 896 is applied through conductors 24 and 26 to motor 28 to provide the second phase input for the two phase motor. Capacitors 900 and 902, connected across primary winding 888 of transformer 890, are provided to damp any initial voltage surge which may occur when the present apparatus is first energized. Capacitors 904 and 906 asssociated with transformer winding 894 perform a similar function.

In the particular embodiment as actually constructed, motor 28 is a conventional hysteresis synchronous motor having a nominal impedance of approximately 360 ohms which functions to provide a high and substantially uniform torque from synchronous speed to 100% slippage. A hysteresis motor was selected partially because of its superior starting torque characteristic and the fact that no auxiliary starting circuit is required. Motor 28 is adapted to drive an output shaft 30 so that the yoke 60 of cathode ray tube 90 may be driven in synchronism with a remote radar antenna.

NORTH SYNCHRONIZING CIRCUIT

Since target information from a Radar is displayed on a P.P.I. type indicator, should any difference in synchronization occur between the transmission and display of radar target data, serious errors in target data would be supplied to the Data Processing Machine. Such loss of synchronization could result, for example, from large jitter or noise on the azimuth pulses, thereby causing the yoke rotation rate to differ from the radar antenna rotation rate. The North Synchronizing Circuit functions to eliminate or substantially reduce such errors by maintaining the deflection yoke of the cathode ray tube in correct polar orientation with respect to the corresponding radar scanning antenna. Under maximum anticipated noise and jitter, the correction required will be less than ±3 azimuth positions per scan, which represents approximately a ±1% maximum error.

In the preferred embodiment herein described, the circuit detects any difference in time between the yoke North pulse and the radar North pulse and actuates the yoke speed changing mechanism 62 to speed up or stop the yoke until it is in synchronism with the radar antenna. This difference in time, representing the necessary correction, is applied to the input shaft of a mechanical differential in the yoke speed changing mechanism, the output of which drives the yoke.

Generally speaking, there are three possible conditions existing between the yoke North and radar North pulses to which the system must respond: first, the yoke North signal is generated before the radar North signal arrives; second, the yoke North signal is generated after the arrival of the radar North signal, and the third condition is that the yoke and radar North signals occur in synchronism. Generally speaking, under the first condition, a brake is applied to stop the yoke at the North position until the radar North pulse is received. Under the second condition, a double speed brake is energized to accelerate the rotation of the yoke at double speed for a time interval equal to the difference between the two North signals when the radar North signal arrives. Under the third condition, a normal speed brake is operated which permits the yoke to continue rotating at synchronous speed. The operation of the North Synchronizing Circuit under these three conditions will now be described in detail.

Referring now to FIGS. 7*a* and 7*b*, there is illustrated in schematic form the North Synchronizing Circuit identified as block 64 in FIG. 1*a*.

The yoke North pulse on conductor 74 is generated by a photomultiplier in response to a light source passing through several discs mounted on the yoke shaft. The duration of this pulse is a function of the yoke speed, and under normal operating conditions, will be several microseconds. The radar North pulse on conductor 72, as heretofore described, is the 5 microsecond pulse used to reset the range counters.

Assuming under condition 1 that the yoke North signal on conductor 74 is received more than the permissible 1% deviation in advance of the radar North signal, it is necessary to stop the yoke 60 (FIG. 1) at its North position until the radar North pulse is received, at which time the yoke starts in synchronism with the radar antenna. The yoke North pulse generated by the photo pickup device is suitably amplified before being applied to conductor 74. Conductor 74 is connected through resistor 912 to control grid 914 of a thyratron relay driver 916. When the yoke North pulse is applied to control grid 914, relay driver 916 fires, and the resulting current through anode 918 passes through conductor 920 to energize relay 922. Since the potential at anode 918 falls when the relay driver is fired, the circuit through which relay 922 is energized is from anode 918 through conductor 920, relay 922, resistor 924, conductor 78, North reset switch 76 to a source of positive potential at terminal 926. Relay 922 together with the remaining relays employed in the North Synchronizing Circuit are mercury contact relays which operate in approximately 2 milliseconds. Such relays are well known in the art, one type being Western Electric type 275D. When relay 922 is energized as above described, contacts 928 and 930 are opened and contacts 932 and 934 closed. When contacts 928 and 930 are open, relay 934, which is energized during normal operation, is de-energized. Relay 934 is normally energized through the circuit from −150 volt terminal 936, contacts 928 and 930 of relay 922, conductor 938, relay 934, resistor 940 to ground. The contacts of relay 934 are shown in the normal energized condition.

Referring back briefly to FIG. 1, it was noted that the North Synchronizing Circuit 64 controls the Yoke Speed Changing Mechanism 62 through conductors 66, 68 and 70, depending upon the relative occurrence between the radar North pulse and the yoke North pulse. As will be shown in greater detail hereinafter, conductors 66, 68 and 70 control associated electromechanical brakes in the yoke speed changing mechanism. Under synchronous operation, conductor 66 will be energized, conductors 68 and 70 deenergized. Under the assumed condition wherein the yoke North pulse is generated before the radar North pulse, conductor 68 is energized and conductors 66 and 70 de-energized. Under the condition where the radar North pulse is received before the yoke North pulse, conductor 70 is energized and conductors 66 and 68 de-energized. From the above description it is apparent that only one of conductors 66, 68 and 70 may be energized at any one time. Conductor 66 controls the brake known as the normal speed brake, conductor 68 controls the brake known as the stop brake, and conductor 70 controls the brake known as the double speed brake.

Thus from the above description under the condition being described, conductors 66 and 70 will be de-energized, and conductor 68 energized. Referring back to FIG. 3, when relay 934 is de-energized as above described, the potential normally applied from 48 volt source 942 through contacts 944 and 946 of relay 934, conductor 948, and contacts 952 and 954 of relay 950 to conductor 66 is removed. This 48 volt potential is applied through contacts 944 and 945 of relay 934 to conductor 68. Since the potential is removed from conductor 948, no potential can exist on conductors 66 or 70, both of which receive their potential from conductor 948 and contacts 954 or 955 of relay 950. Thus the necessary condition wherein conductor 68 is energized and conductors 66 and 70 de-energized has been fulfilled. Under this condition a stop brake will be applied through a differential in the yoke speed changing mechanism to prevent further rotation of the yoke until a radar North pulse is received.

When the radar North pulse is received on conductor 72, it is applied through resistor 956 to control grid 958 of thyratron relay driver 960, thereby causing relay driver 960 to fire. Grid bias is applied to relay drivers 916 and 960 from negative 15 volt source 962 through resistors 964 and 966 respectively. When relay driver 960 is energized, relays 968 and 970 are energized through the circuit from anode 972 of relay driver 960, parallel connected relays 968 and 970, conductor 974, resistor 976, conductor 78, North reset switch 76 to +150 volt potential source 926.

When relay 970 is energized, contacts 978 and 980 complete a circuit from negative 150 volt source 982 through conductor 938, relay 934 and resistor 940 to ground, thereby energizing relay 934. When relay 934 is thus energized, the positive potential on conductor 942 is applied through contacts 944 and 946 of relay 934, through conductor 948, contacts 952 and 954 of relay 950 to conductor 66. Simultaneously the potential applied through contacts 944 and 945 of relay 934 to conductor 68 is removed. Thus conductor 66 is energized and conductors 68 and 70 de-energized, indicating that the yoke and radar antenna are in synchronism. When the potential is removed from conductor 68, the brake holding yoke 60 is de-energized, whereupon the yoke starts in synchronism with the radar North pulse.

From the above description it is obvious that the yoke drive shaft will be stopped by the yoke North signal if the yoke North pulse precedes the radar North pulse by more than the permissible 1% deviation. In initially synchronizing the yoke and radar antenna, if the two signals vary by more than approximately 3 azimuth positions, the yoke shaft will be stopped until the radar North signal causes it to resume rotation. It should be noted that the brakes controlled by conductors 66, 68 and 70 are extremely rapid in operation and their action is practically instantaneous after the actuating signal is received.

The second condition herein described occurs when the radar North signal on conductor 72 is received prior to generation of the yoke North signal. Under this condition conductor 70 will be energized for a period corresponding to the interval between the two signals, while conductors 66 and 68 will be de-energized. Conductor 70 causes the double speed brake in the yoke speed changing mechanism to rotate the yoke through an associated differential at double speed for a time equal to the interval between the radar and yoke North signals, thereby permitting the yoke to "catch up" with the radar antenna. As previously described, when the radar North pulse is received on conductor 72, relays 968 and 970 are energized by relay driver 960. Prior to relay 970 being energized, contacts 984 and 986 are closed, and a negative potential varying between —150 and —300 volts exists at terminal 988 of the resistance network comprising resistors 990, 992 and 994. This potential is applied through contacts 984 and 986, conductor 996, resistors 998 and 1002 to control grid 1004 of Miller Integrator 1000. The grid bias of Miller Integrator 1000 is thus maintained near cutoff. However, when relay 970 is energized, this potential is removed through the opening of contacts 984 and 986. A potential varying between —150 volts and ground is applied from the voltage divider network comprising resistors 1006, 1008 and 1010 through resistors 998 and 1002 to control grid 1004 of Miller Integrator 1000. Thus effectively the energizing of relay 970 by increasing the signal level applied to the control grid 1004 results in a positive step function being applied to Miller Integrator 1000. As is well known in the art, a Miller Integrator is a circuit which generates a triangular output having a time base width approximately equal to the period of a single cycle of a rectangular input wave function applied thereto. As the positive step function is applied to control grid 1004 of Miller Integrator 1000 in the manner described, the potential at anode 1012 falls linearly at a rate determined by the time constant of the integrator. This linearly decreasing potential is applied through conductor 1014 and an RC coupling network comprising resistor 1016 and capacitor 1018 to control grid 1020 of cathode follower 1022, the output of which is developed across resistor 1024 and applied to control grid 1026 of relay driver 1028. A diode clamping device comprising diode connected tube 1030 functions to prevent the potential on control grid 1026 of relay driver 1028 from falling below —90 volts, thereby preventing injury to the relay driver tube.

Relay driver 1028 is normally conducting, thereby maintaining relay 950 in its anode circuit energized. As the anode potential of Miller Integrator 1000 drops during integration of the step function input, relay driver 1028 is cut off through the resulting lowered potential applied to control grid 1026, thereby de-energizing relay 950 in its anode circuit. When relay 950 is de-energized, contacts 952 and 955 are closed, causing the positive potential on conductor 948 to be applied through contacts 952 and 955 to conductor 70. Simultaneously the potential existing on conductor 66 is removed when contacts 952 and 954 of relay 950 are opened. When conductor 70 is thus energized, the associated double speed brake in the yoke speed changing mechanism starts to rotate the yoke 60 at twice normal speed.

The time during which Miller Integrator 1000 functions is controlled in the following manner: when the yoke North pulse is received on conductor 74, it energizes relay 922 in the manner heretofore described, thereby opening contacts 928 and 930 and closing contacts 932 and 934. When contacts 928 and 930 are opened, the negative potential at terminal 936 through which relay 934 has been energized is removed. However, relay 934 remains energized through a circuit from negative 150 volt source 982 through contacts 978 and 980 of relay 970, conductor 938, relay 934 and resistor 940 to ground. When contacts 932 and 934 of relay 922 are closed, a negative potential is applied from —300 volts source 1032 through resistor 1034, contacts 932 and 934 of relay 922, conductor 996, resistors 998 and 1002 to control grid 1004 of Miller Integrator 1000. Thus effectively the arrival of the yoke North pulse on conductor 74 causes a negative step function to be applied through control grid 1004 of Miller Integrator 1000, thereby causing the potential at anode 1012 to raise at substantially the opposite slope as it had previously fallen. The net result of this operation is to produce at anode 1012 of Miller Integrator 1000 an inverted triangular pulse having a base width substantially equal to the time period of the original error or time difference between the yoke and radar North signals.

Since the radar antenna continues to rotate at normal speed, it is obvious that in order for the yoke 60 to "catch up," it must rotate at double speed for a time equal to the initial time difference between the radar and yoke North signals. When the potential on control grid 1004 of Miller Integrator 1000 reaches the level existent before the radar North pulse arrived, relay driver 1028 is again energized, thereby energizing relay 950. When relay 950 is energized, the potential on conductor 948 is removed from conductor 70 through the opening of contacts 952 and 955 and applied to conductor 66 through the closing of contacts 952 and 954. Thus conductor 66 is energized and conductors 68 and 70 de-energized, thereby indicating correction and resulting synchronous operation between the radar antenna and the yoke.

The manner in which the correct period for double speed operation of the yoke is ensured by the present apparatus may be summarized as follows: when the radar North pulse causes a positive step function to be applied to the control grid of the Miller Integrator, the anode potential of the Miller Integrator falls at a linear rate until the yoke North pulse is received. When the yoke North pulse causes a negative step function to be applied to the control grid of the Miller Integrator, the anode potential of integrator 1000 rises to its original value in substantially the same amount of time as it took to fall. Relay driver 1028 is cutoff by the potential drop at anode 1012 of Miller Integrator 1000 and remains cut off for substantially the time interval during which Miller Integrator 1000 is operated. Relay 950, controlled by relay driver 1028, remains deenergized for a period equal to this time interval.

From the above description it is seen that the Miller Integrator associated with the North Synchronizing Circuit functions only under the condition where the radar North pulse precedes the yoke North pulse in time. Under the remaining two conditions herein described, Miller Integrator 1000 remains inactive. It should be further noted that this correction will only occur when the radar North precedes the yoke North pulse by less than 3 azimuth positions. When a greater deviation occurs, either the yoke will be stopped as previously described until the radar North pulse is received, or a second double speed correction will be undertaken at the next radar North position. If the time deviation between the two pulses exceeds the maximum correction possible in two double speed corrections, the yoke will be stopped until the succeeding radar North signal.

Under the third condition wherein the yoke and North signals are synchronized, conductor 66 will remain energized, and conductors 68 and 70 de-energized, thereby permitting the yoke to continue rotating at synchronous speed. Assuming that the two signals are received in synchronism, thyratrons 916 and 960 fire nearly simultaneously, thereby energizing relays 992, 512 and 970 respectively.

When relay 922 is energized, contacts 928 and 930 are opened, thereby removing the −150 volt potential applied through conductor 938 to energize relay 590. Simultaneously, however, a second −150 volt source is applied from terminal 982 through contacts 978 and 980 of relay 970 to maintain relay 590 energized. The net effect of this operation is that relay 590 remains energized, thereby maintaining the positive potential from conductor 942 through contacts 944 and 946 to conductor 948. When relay 512 is energized by the radar North pulse, ground potential is removed from terminal 1019. When the thyratrons are reset by the North cam reset switch as previously described, relay 512 is de-energized and the ground potential is used to discharge capacitor 1018. Relay 512 is also shown in the Start and Alarm Circuit (FIG. 4), where it functions to delay readout of the contents of the range and azimuth counters after a start or alarm condition when the target data flow switch 492 is actuated until the succeeding radar North pulse has cleared the azimuth counters. The range counters are reset by each azimuth signal. Since relay 950 is normally energized except during a stop correction, the potential on conductor 948 remains applied through normally closed contacts 952 and 954 to conductor 66, thereby maintaining the normal speed brake energized. When contacts 984 and 986 of relay 970 are opened, normally resulting in a positive step function being applied through conductor 996 to the control grid of Miller Integrator 1000, a substitute negative potential from terminal 1032 is applied through contacts 932 and 934 of relay 922 via conductor 996 to the control grid of the Miller Integrator. This effectively prevents a positive step function from being impressed on the Miller Integrator and the resulting deenergization of relay 950. Thus the net effect on the present apparatus when the two pulses occur in synchronism is that conductor 66 remains energized and conductors 68 and 70 remain deenergized, thereby fulfilling the prescribed conditions where no correction is required. The North reset switch 76 interrupts the anode potential applied through conductor 78 to anodes 918 and 972 of relay drivers 916 and 960 before the next correction period, thereby resetting the thyratrons to their unfired state. This operation is performed irrespective of the correction taking place.

When relay 590 is energized, the positive 48 volt potential from terminal 942 is applied through contacts 944 and 947 of relay 934 to relay 482. However, during a stop correction, relay 590 is deenergized when the operation of relay 922 opens contacts 928 and 930. Referring back to the Start and Alarm Circuit (FIG. 4), when relay 590 is deenergized, the 48 volt potential applied through contacts 944 and 945 of relay 590 is removed and relay 482 is deenergized. When relay 482 is deenergized, it completes a circuit from 150 volt source 532 through relay 530 and contacts 538, 540 of relay 482 to ground, thereby energizing relay 530. When relay 530 is energized, −300 volt marginal checking voltage 542 is removed from the conductor labeled data inhibit. This data inhibit conductor normally supplies the −300 volt marginal checking voltage to Model C flip-flop 1542 in the Control Element (FIG. 12) to indicate that no data is available to the data processing machine during a stop correction. After the stop correction has terminated, relay 530 is deenergized and target data is made available for the data processing machine. The manner in which data is inhibited will be described in detail hereinafter with reference to the description of the Model C flip-flop.

Since North reset switch 76 is operative only during the period approximately 10 degrees before and 5 degrees after yoke North time, the operation of the North Synchronizing Circuit is limited to this 15 degrees interval. The output potential from the North reset switch is also applied through conductor 78 to bleeder 295 shown in the Azimuth and North Protection Circuit (FIG. 2) to reduce the potential to a sufficiently low value to operate logical AND circuit 294.

While a specific embodiment of the North Synchronizing Circuit has been herein described with reference to FIG. 3, such a circuit is basically not restricted to supplying only North corrections for the radar input mapping system. Generally speaking, this circuit is adaptable for rapidly and accurately providing position synchronizing by means of discrete pulse inputs. Such discrete pulse inputs could originate, for example, with a remotely positioned shaft to which it is desirable to synchronize a shaft such as output shaft 63 in the described embodiment.

From the above description it is apparent that correction can only occur within a relatively short period about yoke North time. If the pulses are separated by an interval exceeding this period, or exceeding twice this period for a double speed correction, the yoke will stop until the following radar pulse, at which time it will start in synchronism with the radar North pulse. This is possible because the transient time required for the yoke to reach its normal speed after the radar North pulse arrives is practically negligible within the antenna speed range considered herein, so that the yoke is enabled to start in substantial synchronism with the radar antenna, as identified by the radar North pulse.

YOKE SPEED CHANGING MECHANISM

Referring now to FIG. 8*a*, there is illustrated in schematic form the Yoke Speed Changing Mechanism shown as block 62 in FIG. 1*a* together with the remaining elements associated with the mechanical assembly through which the yoke 60 is driven by motor 28. This assembly includes components which were deleted from FIG. 1 for ease of illustration. While the present system is designed to operate over a radar antenna range of 4 to 10 r.p.m., the ensuing description will be directed toward the heretofore assumed antenna speed of 6 r.p.m.

The function of the mechanical assembly illustrated in FIG. 8*a* is to maintain the yoke 60 in synchronization with the North position of the radar antenna. To accomplish this, the output shaft 63 of the mechanical assembly must be able to produce three different rates of speed, the particular rate being determined by the correction to be made, while maintaining the speed of the input shaft 59 constant. This is accomplished in the following manner:

Referring specifically to FIG. 8*a*, the azimuth drive motor 28 and its output shaft 30 are driven at 1536 revolutions per minute under the assumed 6 r.p.m. antenna speed. The shaft 30 has a gear 252 mounted thereon which meshes with gear 254 to drive the azimuth protection drum 250 as previously described. Gear 254 also meshes with gears 1110 and 1112, the former of which is connected through shaft 1114 to centrifugal switch 1116. Centrifugal switch 1116 includes the contacts of low and high speed centrifugal switches shown as blocks 14 and 32 in FIG. 1*a* mounted in a single housing. Gear 1112 is connected through shaft 43 to mechanical gear assembly 58. Mechanical gear assembly 58 comprises two 4:1 reduction units which reduce the speed on its output shaft 59 to 96 r.p.m. Shaft 59 functions to drive gear 1118, which is connected to end gears 1120 and 1122 of differential units 1106 and 1108 respectively, at a uniform rate. As is shown in greater detail in FIG. 8*c* and described in reference thereto, a differential unit consists of two end gears and an output shaft. The speed of the output shaft of a differential unit can be determined from the equation $$\frac{X+Y}{2}=Z$$

wherein $X+Y$ is the algebraic sum of the speeds of the respective end gears of the differential unit and wherein Z is the speed of the output shaft. Initially it will be assumed that the direction of rotation of the end gears of differential 1106 will be the direction indicated by the associated arrows.

In order to obtain the required speed correction in the present apparatus, output shaft 1124 of differential unit 1106 must be controlled to rotate at speeds of 48, 96 or 0 r.p.m. under the normal speed correction, double speed correction or stop correction respectively. End gear 1120 under all conditions will rotate in the direction indicated at a constant speed of 96 r.p.m. The desired outputs from differential 1106 are obtained by controlling either the speed or direction of rotation of end gear 1121 of differential 1106. The present embodiment utilizes three electromagnetic brakes which are represented schematically in FIG. 8*a* by armature discs 1128, 1130 and 1132, which in turn are associated with the normal speed brake 1100, the stop speed brake 1102 and double speed brake 1104 respectively, described hereinafter with reference to FIG. 8*b*. As noted heretofore, only one of these brakes which are controlled by conductors 66, 68 and 70 can be energized at any one time, the particular brake energized being determined by the correction to be made. Under normal speed operation, the normal speed brake is energized, while under stop and double speed correction, the associated stop or double speed brake will be energized.

Assuming in the first instance that the yoke and radar antenna are in synchronism, thereby requiring the aforesaid normal speed operation, armature disc 1128 will be energized, thereby preventing shaft 1134 from rotating. Shaft 1134 controls the rotation of gear 1136 which in turn is connected to end gear 1121 of differential 1106 through gear 1138. Since gear 1136 is prevented from rotating by the action of the normal speed brake, end gear 1121 is also prevented from rotating and the rotational speed of output shaft 1124 from the preceding equation is equal to $$\frac{96+0}{2}$$

or 48 r.p.m. 48 r.p.m. in the exemplified embodiment is the synchronous speed of shaft 1124.

Under the condition where the yoke North pulse occurs after the radar North pulse within the previously defined limits, the output shaft 1124 is rotated at double speed for the required time interval to permit the yoke to "catch up" with the radar antenna. Under this correction, the double speed brake 1104 is energized, and its associated armature disc 1132 prevents shaft 1140 from rotating. End gear 1122 of differential 1108 is driven under all conditions by gear 1118 at a constant speed of 96 r.p.m. in the direction indicated by the arrow. From the preceding equation, it is apparent that end gear 1123 must be driven at the same speed but in the opposite direction as end gear 1122 in order to obtain a zero output on shaft 1140. Accordingly, end gear 1123 is driven in the opposite direction to that indicated by the arrowhead at the same speed as end gear 1122, or 96 r.p.m. As the end gear 1123 rotates in the opposite direction to that indicated by the arrowhead, the gears 1136 and 1138 cause the end gear 1121 of differential unit 1106 to rotate in the direction indicated by its arrowhead at a speed of 96 r.p.m. From the preceding equation therefore, the speed on output shaft 1124 is equal to $$\frac{96+96}{2}$$

or 96 r.p.m., corresponding to double speed in the exemplified embodiment.

When the yoke North pulse precedes the radar North pulse, a stop correction is performed to stop the yoke until the radar North occurs. Under the stop condition, stop brake 1102 is energized, and its associated armature disc 1130 prevents shaft 1124 from rotating. As is apparent from the preceding equation, end gear 1121 is driven in the opposite direction and at the same speed as end gear 1120. The stop correction is performed whenever the yoke North pulse precedes the radar North pulse. Shaft 1124 remains in this condition until the succeeding radar North pulse causes it to start out in synchronism with the radar antenna in the manner heretofore described with reference to FIG. 7.

Another element included in the yoke speed changing mechanism is the yoke North pulse generator which generates the yoke North pulse on conductor 74 to initiate the necessary correction. The yoke North pulse generator comprises a light source 1142, contra-rotational gear 1144 and disc 1146 and photo pickup 1148. Due to the 8:1 speed reduction occurring between gears 1152 and 1144, shaft 1124 is rotating at 8 times the speed of the yoke 60. Disc 1146, which is rotatably mounted on shaft 1134, is driven through idler gear 1150 to rotate at the same speed as shaft 1124. Gear 1144, on the other hand, is fixed to shaft 63 As shown the gear 1144 and disc 1126 rotate in opposite directions. The yoke North position will be indicated once each revolution of gear 1144 when the associated slots are aligned between the light source 1142 and the photo pickup 1148. This condition of alignment occurs only once for each rotation of the yoke irrespective of the speed of rotation. The resulting pulse generated by photo pickup 1148 is then applied through conductor 74 to the North Synchronizing Circuit 64 (FIG. 1*a*). Since output shaft 63 is pinned to gear 1144, it therefore rotates at ⅛ the speed of shaft 1124. Yoke 60 is connected to shaft 63 through a gear train comprising gears 1153 through 1156, universal joint 1158, shaft 1159 and gear 1160. Yoke 60 is therefore enabled to rotate at the same speed as output shaft 63. Cam 1157 which actuates the North Reset Switch shown as block 76 in FIG. 1*a* and lamp relay reset cam 1161 are mounted on output shaft 63.

In order to illustrate the electrical controls used to energize the yoke speed changing mechanism, reference is made to FIG. 8*b*. The assembly as shown comprises the normal speed brake 1100, stop brake 1102 and double speed brake 1104 which are energized by conductors 66, 68 or 70 respectively. Brakes 1100, 1102 and 1104 are shown schematically as having armatures 1162, 1164 and 1166 respectively. Input and output shafts, and differential units are interconnected and function in the manner heretofore described in connection with FIG. 8*a*. When the yoke North pulse generator 1168 generates a pulse on conductor 74, the North Synchronizing Circuit 64 will apply a 48 volt potential to conductor 66, 68 or 70 depending on the relative occurrence of the yoke North pulse with respect to the occurrence of the radar North pulse, that is, if the yoke is lagging the North pulse, the double speed brake 1104 is energized; if the yoke pulse is in synchronism with the radar North pulse, the normal speed brake 1100 is energized; if the yoke pulse precedes the radar North pulse, the stop brake 1102 is energized. The manner in which the determination of which brake to energize is made, as well as the length of time the brake is maintained energized has been described in detail with reference to the North Synchronizing Circuit (FIG. 7).

When a positive 48 volt potential is applied from the North Synchronizing Circuit to conductor 68 or 70 associated with the stop or double speed brakes 1102 or 1104, the circuit through armature 1164 or 1166 is completed through conductor 1170 and lamp 1172 to a negative 48 volt terminal 1174. The circuit through which armature 1162 of normal speed brake 1100 is energized is complated from conductor 66 through armature 1162, through conductor 1176 and normal lamp 1178 to negative 48 volt terminal 1179. When relay 1180 is deenergized, standby lamp 1181 is connected in parallel with normal lamp 1178. Thus it is seen that each brake circuit has a lamp associated therewith.

For the satisfactory operation of the yoke speed changing mechanism, it is necessary that normal speed brake 1100, stop brake 1102 and double speed brake 1104 operate as rapidly as possible after being energized. This is done by initially applying a surge of current higher than the normal operating current through the brakes. However, after operation of the brakes has been initiated, normal operating current must be supplied. Since lamp filaments are characterized by low resistance when cool and higher resistance when heated, the above specified current variation is obtained by utilizing the lamp in series with each brake. As noted above, lamp 1172 is in series with stop brake 1102 and double speed brake 1104, and normal lamp 1178 is in series with normal speed brake 1100. When relay 1180 is deenergized, a standby lamp 1181 is in parallel with normal lamp 1178.

During synchronous operation, normal speed brake 1100 is energized. At approximately 5 degrees after yoke North time, the lamp reset cam 1196 completes a circuit from —48 volt terminal 1179 through reset cam 1196, resistor 1182, relay 1180, conductor 66, contacts 954 and 952 of relay 950 (FIG. 7*b*), conductor 948, contacts 946 and 944 of relay 934 to positive 48 volt terminal 942. When energized, relay 1180 is maintained energized by a holding circuit from negative 48 volt terminal 1179, contacts 1183 and 1184 of relay 1180, resistor 1182 and relay 1180 to the above described positive 48 volt sourcce 942. If the yoke 60 is required to rotate at double speed, relay 950 (FIG. 7) is deenergized as previously described, thereby opening its contacts 952 and 954 through which relay 1146 is energized. If the yoke is required to stop, relay 934 is de-energized, thereby opening its contacts 946 and 944 resulting in deenergizing relay 1180. Thus it is seen that relay 1180 is deenergized during stop or double speed correction.

Relay 1180 when deenergized, opens its contacts 1183 and 1184 and closes its contacts 1183 and 1185. Under this condition, standby lamp 1181 is connected in parallel with normal lamp 1178, thereby insuring a cool filament and a corresponding low resistance path to normal speed brake 1100 should normal speed correction, that is, from stop or double speed to normal speed, be accomplished before normal lamp 1178 becomes sufficiently cool to provide the necessary low resistance path. Thus the function of relay 1180 is to provide a cold cathode for the normal speed brake after the time when speed correction from double speed or stop to normal speed has been accomplished. Lamp reset cam 1196 makes momentary contact after the normal speed brake 1100 is again energized. Thus relay 1180 is energized and remains energized through the holding circuit above described. As previously noted, lamp 1172 is in series with the stop and double speed brake circuits and performs a similar function during a stop or double speed operation of the yoke as that performed by the above described lamps 1178 and 1181. No standby lamp is required for lamp 1172, since lamp 1172 always has time to cool before the next use due to the relatively short correction interval.

Referring now to FIG. 8*c*, there is illustrated in detail a mechanical differential of the type shown as 1106 in FIG. 8*a* and generally described with reference thereto. As is well known in the art, a differential is an arrangement of gears having two input gears and an output shaft. The output shaft rotates at a speed which is half the algebraic sum of the two input gear rotations. Referring specifically to FIG. 8*c*, a gear assembly comprising an end gear 1120 fixed to a bevel gear 1188 is rotatably mounted on the shaft 1124 and retained against longitudinal movement in one direction by a collar 1189 pinned to the shaft 1124. A similar gear assembly comprising gears 1121 and 1190 is retained on the shaft 1124 by a collar 1191. An arm 1192 is fixed to the shaft 1124 by a pin 1193 and carries a stud 1194 upon which is rotatably mounted a bevel gear 1195 meshing with the bevel gears 1188 and 1190. If one gear assembly, for example, 1121, 1190, is locked against rotation and the other, 1120, 1188, is rotated, the gear 1195 will be rotated by the driven gear assembly. Since the gear 1195 also meshes with the gear 1190 which is locked against rotation, the gear 1195 rotates around the gear 1184, and in so doing, rotates the shaft 1124 at one half the speed of gear 1188. Differential unit 1108, mounted on the shaft 1140, is identical in construction to differential unit 1106 as above described.

Briefly summarizing the operation of the yoke speed changing mechanism, either the normal speed brake 1100, the stop brake 1102 or the double speed brake 1104 will be energized at all times during operation. If the double speed brake is energized, a set of different gears is engaged which causes the yoke to rotate at twice its normal speed. If the stop brake is energized, a different set of differential gears is engaged which stops yoke rotation. If neither the double speed nor the stop brake is energized, the normal speed brake will be energized and the yoke will therefore rotate at normal or synchronous speed.

SWEEP CIRCUIT

Referring now to FIG. 9, there is illustrated in block and schematic form a Sweep Circuit identified as block 82 in FIG. 1*a*. The function of the sweep circuit in the preferred embodiment is to generate the necessary potentials to deflect the electronic beam at a substantially linear rate from the center of the cathode ray tube 90 toward the outer edge of the display. Thus a rotating coil deflection system is used to obtain a polar presentation of the target area to be mapped. The input signals to the sweep circuit should recur at substantially constant intervals and be of sufficient amplitude to fire the thyratron generator 1200. Since range information appears at a fixed rate and is started from zero at each azimuth pulse, the azimuth pulses are used to trigger an RC sweep.

Referring now to FIG. 9*a*, the sweep circuit shown in block form comprises a thyratron sawtooth generator 1200, a cathode follower 1202 and a deflection power amplifier 1204, the output of which is applied through conductor 84 to the deflection yoke 60 of the cathode ray tube. The input signal on conductor 44 used to trigger the sweep circuit are the 5 microsecond signals recorded on write head 264 in the substitute azimuth generator (FIG. 3). This signal may be a 5 microsecond positive going pulse having a magnitude of from 20 to 40 volts. If an azimuth pulse is missing, the sweep normally generated by that pulse is omitted.

Referring now to FIG. 9*b* for a detailed description of the operation of the radial sweep circuit, when a positive going signal such as the above defined 5 microsecond pulse is applied to input conductor 44, an RC coupling network comprising capacitor 1206 and resistor 1208 transmits a pulse to control grid 1210 of thyratron 1200. When this signal is applied to control grid 1210, thyratron 1200 fires. At this time due to ionization of the thyratron, the voltage drop between cathode 1211 and anode 1220 of thyratron 1200 drops to a relatively low level. Capacitor 1212, connected between the anode and cathode circuits of thyratron 1200, discharges until the current through the thyratron reaches the deionization level of the tube. When the thyratron 1200 is deionized, capacitor 1212 begins to charge at a linear rate through resistor 1214 and amplitude potentiometer 1216 toward a level of +250 volts shown at terminal 1218.

In order to insure that condenser 1212 will always begin to recharge from the same voltage level, inductor 1222, resistor 1224 and vacuum tube diode 1226 are connected into the basic sawtooth generator circuit as shown in FIG. 9*b*. Inductor 1222 and resistor 1224 in the anode circuit of thyratron 1200 insure that capacitor 1212 will be discharged below the voltage level of the anode of vacuum tube diode 1226. Therefore the cathode of vacuum tube diode 1226 will immediately conduct and thereby establish the base level potential from which condenser 1212 begins to recharge. By means of the above described circuit, parameter variations from firing to firing, such as the voltage drop across thyratron 1200 are automatically compensated for. The voltage drop across thyratron 1200 in turn will result from variation between tubes, variations of parameters within a given tube, variations resulting from internal oscillations which may be produced during conduction of thyratrons or any combination thereof.

Diode 1228 functions as a protective clipping diode to prevent the thyratron output potential from rising above +250 volts when no input signal is present. If the voltage output of the thyratron was permitted to rise above this level, it would cause the associated deflection amplifier to draw excessive current, thereby resulting in possible damage to the yoke.

The RC network comprising capacitor 1212 and resistors 1214 and 1216 determines the basic sweep rate of the subject apparatus. Variable resistor 1216 provides a linear adjustment of the basic sweep rate. Since this network determines the rate of rise of the sawtooth waveform, it thereby controls the voltage amplitude. The output of condenser 1212 is applied through conductor 1238 and parasitic suppressor 1240 to control grid 1242 of cathode follower circuit 1202. Cathode 1250 of cathode follower 1202 is thereby enabled to follow the voltage changes occurring across capacitor 31. Vacuum tube diode 1228 limits the maximum voltage to which condenser 1212 may charge and further serves to prevent harmful overloading which might otherwise occur in the absence of input signals on conductor 44.

Centering potentiometer 1230 is part of the bias dividing network for thyratron 1200, this network also including resistors 1232 and 1234. Potentiometer 1230 provides adjustment of the reference potential at which capacitor 1212 begins discharging operations, and thereby may function as a sweep start control for the deflection yoke 60 which receives its driving current from the anode of deflection amplifier 1204. Potentiometer 1230 is adjusted so that zero current flows through yoke 61 at the start of the sweep.

Cathode follower circuit 1202 includes a voltage divider network comprising resistors 1244, 1246 and 1248 connected to cathode 1250 to insure that the correct D.C. level is applied to screen grid 1254 of deflection amplifier 1204. These resistors comprise both a cathode load resistor and the voltage divider of the cathode circuit.

The output from cathode follower circuit 1202 is applied to screen grid 1254 of the deflection amplifier in order that a larger voltage swing can be introduced into the output tube. It is desirable to utilize a large output swing, since the overall sweep circuit is D.C. coupled and thyratron 1200 should always maintain a reasonable potential difference between its cathode and anode when an input pulse arrives. Since the signal applied to screen grid 1254 is the sawtooth waveform heretofore described, the current at anode 1258 will also reflect the sawtooth waveform. Since deflection yoke 60 is directly connected to anode 1258, the sawtooth waveform current will also flow through the yoke. Since cathode 1260 of deflection amplifier 1204 is maintained at —150 volts through resistor 1262, a slight amount of grid current is drawn. Control grid 1256 is connected through resistor 1264 to ground thereby maintaining a potential slightly positive with respect to the potential at cathode 1260. However, when the deflection amplifier conducts, the grid current drawn by control grid 1256 is limited by resistor 1264, so that control grid 1256 will be substantially at the same potential as cathode 1260, thereby compensating for the contact potential within the output tube 1204. Resistor 1262 in the cathode circuit of the deflection amplifier functions as a degenerative element which compensates for parameter variations in the output tube, and permits the output tube to function properly with large signal variations applied to the screen grid. Cathode degeneration and the screen grid characteristics compensate for the non-linearity in the driving voltage to effect a more linear output through the yoke 60. Resistor 1264 is shunted across yoke 60 to damp out oscillations across the yoke when the current through the yoke falls rapidly. Fuse 1266 in the anode circuit of the deflection amplifier functions as a yoke current overload protector. The particular voltage levels selected in the present circuit permit one side of yoke 60 to be connected to ground, thereby providing a safety feature in operation and maintenance of the circuit.

From the preceding description, it should be noted that the time required for flyback of the sweep generator is extremely short with respect to the duration of the sawtooth waveform, and may be on a relative order of approximately 25 microseconds. In the preferred embodiment herein described, the short flyback time allows the input pulse to reset the sawtooth generator as well as initiate a new sweep. The exceedingly short flyback time compared with the sweep length make it unnecessary to provide the usual circuitry ordinarily required to reset the sawtooth generator and provide blanking signals prior to the arrival of the next input pulse which starts a new sweep.

DISPLAY CONTROL CIRCUIT 86

Figure 10A:
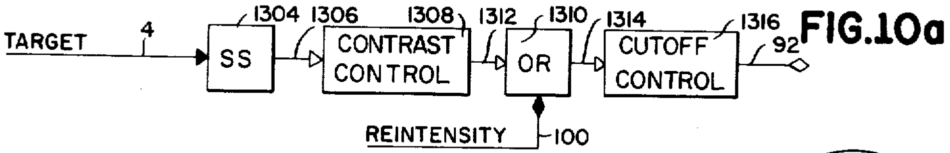
Figure 10B:
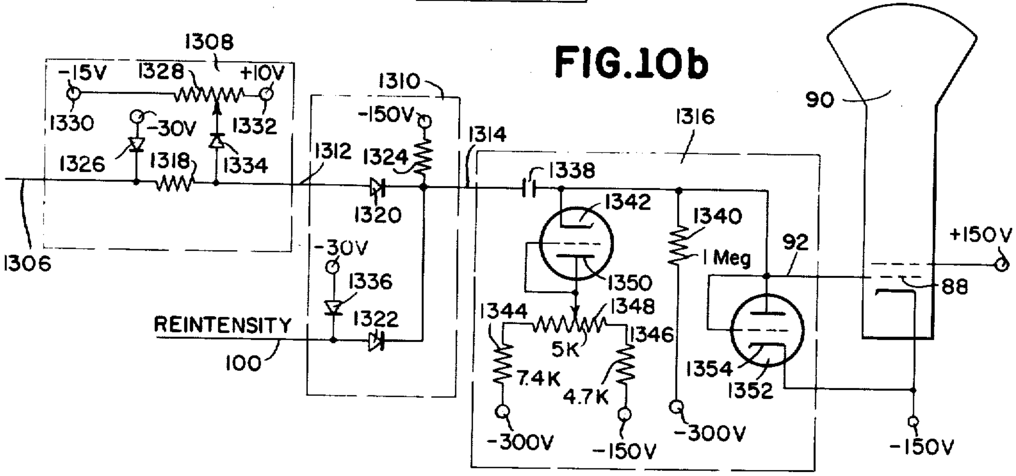

Referring now to FIGS. 10*a* and 10*b*, there is illustrated in block and schematic form respectively, the Display Control Circuit identified as block 86 in FIG. 1*a*. As shown in FIG. 1*a*, the circuit has two inputs; an unsynchronized target pulse on conductor 4, and a reintensify signal on conductor 100. The object of the Display Control Circuit is to provide a visual indication on the cathode ray tube of when a target has been mapped through a system of double intensification in which filtered or unmasked targets appear at a higher level of brightness than unfiltered or masked targets. A general description of the video mapping technique of filtering targets employed in the present apparatus has been outlined heretofore with reference to FIG. 1.

Referring now to Diagram "*a*" of FIGURE 10, a target pulse on conductor 4 is applied to single shot multivibrator 1304. Single shot 1304 is a "B" type single shot of the type heretofore described which is adjusted to generate a pulse of approximately 40 volts amplitude and 43 microseconds duration in response to the target pulse applied thereto. The 43 microsecond output from single shot 1304 is applied through conductor 1306 to Contrast Control Circuit 1308. Contrast Control Circuit 1308 provides the necessary contrast between filtered and unfiltered target signals by adjusting the output amplitude level from single shot 1304 before it is applied to OR circuit 1310. OR circuit 1310 in addition to the filtered target signal applied through conductor 1312 has a reintensity signal applied through conductor 100. The output of the OR circuit is then applied through conductor 1314 to cutoff control circuit 1316, which controls the unblanking of the cathode ray tube in accordance with the input signal applied to conductor 1314. The output of the cutoff control circuit is then applied through conductor 92 to control grid 88 of cathode ray tube 90.

Referring now to diagram "*b*" of FIG. 10 for a detailed description of the Display Control Circuit, the 43 microsecond signal generated by multivibrator 1304 is applied through conductor 1306 and resistor 1318 to diode 1320 in OR circuit 1310. Diodes 1320 and 1322 together with resistor 1324 constitute the logical OR circuit shown as block 1310 in FIG. 10*a*. Diode 1326 is a clipping diode which prevents the level of the input signal to diode 1320 from dropping below −30 volts. Variable resistor 1328 connected between −15 and +10 volt terminals 1330 and 1332 respectively, together with diode 1334, determines the level of the input signal applied to diode 1320. Variable resistor 1328 is used to set the clipping level of diode 1334 to thereby provide a contrast adjustment by adjusting the signal level on conductor 1312, constituting one of the inputs to OR circuit 1310. Since no adjustment is provided on the reintensify input applied through conductor 100 to OR circuit 1310, the entire contrast is provided in the manner above described. Such amplitude control is necessary to vary the relative amplitudes between the two pulses since the difference in pulse duration alone does not produce sufficient contrast between the intensified and reintensified spots on the cathode ray tube screen. At the maximum setting of variable resistor 1320, the intensified signal applied to diode 1320 will be as large as the reintensified signal applied to diode 1322. The reintensified signal on conductor 100 is a pulse of approximately 180 microseconds duration and varying in amplitude between +10 and −30 volts which is generated by control circuit 98 in response to a signal generated by photo pickup circuit 94 and applied through conductor 96 to control circuit 98. Diode 1336 is a clipping diode which prevents the level of the reintensified signal from dropping below −30 volts.

The output of OR circuit 1310 is applied through conductor 1314 and capacitor 1338 to control grid 88 of cathode ray tube 90. Capacitor 1338 is a coupling capacitor which isolates the output of OR circuit 1310 and control grid 88, since they are different levels. Resistor 1340 and diode connected vacuum tube 1342 provide the bias to control grid 88 of cathode ray tube 90 in the following manner. The voltage divider network comprising resistors 1344, 1346 and variable resistor 1348 controls the potential at anode 1350 of vacuum tube diode 1342, which in turn permits control of the current through resistor 1340. The potential drop across resistor 1340 allows proper bias of cathode ray tube 90, which is necessary to compensate for the variation in cutoff voltage in the cathode ray tubes. A vacuum tube diode is used rather than a crystal diode because the comparatively low back resistance of a crystal diode at the end of its life would be in shunt with resistor 1340, thereby lowering the RC time constant of the network comprising capacitor 1338, diode 1342 and resistor 1340, resulting in lowered amplitude of signals passing through the circuit. Diode connected vacuum tube 1352 having its cathode 1354 connected to a source of −150 volt potential is a clipping diode to prevent control grid 88 of cathode ray tube 90 from going excessively positive and possibly damaging the tube in the event that contrast control potentiometer 1328 and cutoff control potentiometer 1348 are simultaneously out of adjustment.

By means of the Display Control Circuit, a filtered target signal generated by the Control Element 98 generates a brighter level of intensification on the face of the cathode ray tube, providing a definite indication that a specified target has been made available to the data processing machine and has not been masked. Masked targets and spurious signals appear dimly illuminated with respect to unmasked signals, thereby providing an optical display to the operator monitoring the cathode ray tube.

PHOTOPICKUP CIRCUIT 94

Referring now to FIG. 11, there is illustrated in schematic form the photopickup circuit identified as block 94 in FIG. 1*a*. The photopickup device converts a light pulse appearing on the screen of CRT 90 (FIG. 1) indicating a target, into an electrical impulse which, in the case of an unmasked target, is applied to Control Element 98 to cause read-out of the range and azimuth counters, and to further cause generation of the reintensification signal.

As heretofore described, the object of the reintensification feature is to visually indicate on the surface of the cathode ray tube, by means of different intensity levels, which unblanking target signals have been optically shielded from the photopickup device and thereby provide a check on any mapping errors which might result, for example, from parallax differences between the operator's viewing position and the photo pickup viewing position. The reintensification is effected by feeding back the output pulse which appears as a result of a target signal pickup by the phototube. This feedback actuates the display control circuit 86 which both intensifies and prolongs the unblanking signal. As a result, an unmapped signal is brighter to the eye than a mapped signal.

Basically the photo pickup device comprises a photomultiplier tube followed by a three-stage amplifier. The photo-multiplier tube is sensitive to blue light, and detects the unmasked blue flashes, indicating targets, and converts them to electrical impulses which are amplified through the following amplifier stages and transmitted to the range and azimuth counters to cause readout of the target information.

Referring specifically to FIG. 11 for a detailed description of the operation of the subject apparatus, a photo multiplier 1360 has a cathode 1362, an anode 1364 and a plurality of intermediate dynodes 1365 through 1374 inclusive. Since the light output from a cathode ray tube is relatively low, a photomultiplier type phototube is required to obtain the desired output signal level. The input signal to the photomultiplier consists of a light pulse of approximately 43 microseconds duration obtained from the face of the cathode ray tube. In the preferred embodiment, cathode 1362 is connected to a variable −1500 volt supply, shown as terminal 1376, which permits adjustment of phototube gain. A chain of resistors, shown as 1377 through 1384 inclusive, connected between cathode 1362 and the −300 volt regulated power supply terminal 1386, establishes the voltage difference for dynodes 1365 through 1371, providing a voltage increase of approximately 100 volts per dynode. Dynodes 1372, 1373 and 1374 normally conduct the largest share of the tube current and are therefore connected directly to −300 volt terminal 1386, −150 volt terminal 1388 and ground, respectively. It should be noted that resistor 1384 is twice the value of resistors 1377 and 1383, inclusive, to provide twice as much voltage between cathode 1362 and dynode 1365, as between successive intermediate dynodes 1365 through 1372 inclusive. Capacitors 1390 and 1392 provide a low impedance A.C. path between dynodes 1372, 1373 and 1374 to prevent voltage fluctuation during the conduction period. Capacitors 1394 through 1400 prevent the variation of the stage-to-stage dynode voltage difference and thus maintain substantially constant tube gain during the pulse period. The anode potential for the phototube is +150 volts, which is applied from terminal 1402 through resistor 1404 to anode 1364.

The electrical pulse produced by the photomultiplier is capacitively coupled through capacitor 1406 and across grid leak resistor 1408 to control grid 1410 of amplifier 1412. Since the duty factor of the pulse input may sometimes become as high as 50%, and since the combination of capacitor 1406 and resistor 1408 has a relatively long time constant, diode 1414 connected across resistor 1408 provides a low resistance discharge path for capacitor 1406. Resistors 1408, 1414, 1416 and 1418 provide bias for amplifier 1412, while resistors 1420 and capacitor 1422 provide cathode decoupling. Parallel resistors 1424 and 1426, which comprise the plate load impedance for triode 1412, together with cathode resistors 1414, 1416 and 1418 establish a large amount of degeneration in the circuit to thereby provide a substantially constant gain of the amplifier stage despite variations in tube or component parameters. The output of amplifier 1412 is a positive-going pulse which is capacitively coupled by capacitor 1428 and conductor 1430 to the cathode 1432 of D.C. restorer 1434.

In the D.C. restorer stage, tube 1434 is diode connected. Resistors 1436 and 1438 form a voltage divider network between −150 volt terminal 1440 and ground. Anode 1442 of D.C. restorer 1434 is connected at the junction 1444 of the voltage divider network, biasing it at a fixed level and clipping the negative pulse from amplifier 1412 at this level. Switch 1446, labeled "Operate-Adjust," is used to set the circuit into normal operation. With switch 1446 in the adjust position, terminal 1448, the output of the photo pickup is reduced by 50%, since terminal 1448 is connected to the center of a voltage divider network comprising resistors 1450 and 1452. With switch 1446 in the Adjust position, a signal is applied to the end or outer radius of the cathode ray tube and the −1.5 kv. voltage supply adjusted until the resulting output signal from photopickup circuit 94 is of sufficient amplitude for satisfactory operation. The outer radius was selected as the spot of minimum light response of photopickup 94 due to distance and angle from which it is removed from the photopickup. After the above described adjustment has been performed, the switch is then moved to the Operate position. The adjustable 1.5 supply 1376 thereby provides a manual compensation for changes in sensitivity resulting from variation in CRT brightness, photomultiplier tube sensitivity and circuit gain variations.

After passing through switch 1446, the signal is applied to control grids 1454 and 1456 of triodes 1458 and 1460 respectively. Tubes 1458 and 1460 and associated circuit constitute an output cathode follower stage. Anodes 1462 and 1464 are individually decoupled by resistors 1466 and 1468 and capacitors 1470 and 1472 respectively. The output signal is developed across parallel connected resistors 1474 and 1476 of cathode followers 1458 and 1460 respectively, and transmitted through conductor 96 to Control Element 98 (FIG. 1*b*). The output signal on conductor 96 is hereinafter referred to as a "filtered target" signal. Diode 1478 is a clipping diode to prevent the output signal from falling below the −30 volt level. The maximum positive level of the output signal therefore depends on the intensity of the light flash on the CRT screen.

CONTROL ELEMENT 98

Reference is made to FIG. 12 wherein is shown in detail the control circuits shown in block form as Control Element 98 in FIG. 1*b*. In response to an unsynchronized range pulse on line 6, a flip-flop 1502 is set in the Zero state of conduction and a flip-flop 1504 is set in the One state of conduction. The One output of the flip-flop 1504 conditions gates 1506 and 1508 while the Zero output conditions a gate 1510. An OD–2 pulse applied to gate 1512 is passed to gates 1510 and 1506 provided a flip-flop 1514 is in the One state to supply a positive level to the gate 1512. The previous OD–4 pulse passed by gate 1508 sets flip-flop 1514 to the One state. An output pulse from gate 1506 is applied on conductor 102 to the One input side of flip-flop 1516, and the Zero input side of flip-flop 1504. This pulse is also applied on conductor 102 as a synchronized range pulse to Display Control Circuit 86 and Azimuth and North Protection Circuit 38 (FIG. 1*a*). An output pulse from the gate 1510 is applied to the One input side of a flip-flop 1518.

An OD–2 pulse applied to the input of gate 1512 is also applied through delay unit 1520 to the zero input side of the flip-flop 1518. The zero output side of the flip-flop 1518 is connected to a cathode follower 1522, which in turn supplies an output to a power inverter 1524 and a negative AND circuit 1526. The output of power inverter 1524 is applied to core shift drivers 1528 through 1532. Core shift drivers 1528 and 1529 supply an output on respective conductors 126 and 128 to azimuth counter 106 in FIG. 1*b*. The output is in the form of pulses which serve to shift the azimuth counter. Core shift drivers 1530 and 1531 supply shift pulses on respective output conductors 130 and 132 to range counter 110 in FIG. 1*b*. Output pulses from core shift driver 1532 are applied on conductor 134 to shift the delay register 114 in FIG. 1*b*.

The negative AND circuit 1526 responds to negative inputs from the cathode follower 1522 and the zero output of the flip-flop 1502 to provide a negative output to the power inverter 1534, which in turn supplies an output on conductor 138 to core shift driver 1535 to shift the azimuth and range read-out registers 122 and 124 of FIG. 1*b*.

A pulse on conductor 136 labeled Stop Shift from the delay register 114 in FIG. 1*b* is applied to the zero input of the flip-flop 1514 in FIG. 12. When received, this pulse indicates that the shifting operation should be terminated. By setting the flip-flop 1514 to the zero state, the gate 1512 is deconditioned, thereby inhibiting further shift pulses. The positive output from the zero side of the flip-flop 1514 is applied through core shift driver 1515 and conductor 116 to reset the delay register 114 in FIG. 1*b*. Whenever flip-flop 1516 is set in the One state, its one output side supplies a positive signal through core shift driver 1517 to conductor 112 to prime the delay register 114 and provide an Add One range input to range counter 110 of FIG. 1*b*. The one output from the flip-flop 1516 in FIG. 12 is also applied to condition a gate 1536 which is sampled by OD–4 pulses to reset flip-flop 1516 and to sample a gate 1538. The gate 1538 serves to pass the pulse from gate 1536 provided that a positive signal level representing a filtered target is present on conductor 96.

An output pulse from the gate 1538 is applied to the one input side of the flip-flop 1502 and through an OR circuit 1540 to the zero input side of a flip-flop 1542. The one output side of the flip-flop 1502 is applied to a positive AND circuit 1544, the other input of which is from the One output side of flip-flop 1514. Whenever both inputs to the AND circuit 1544 are positive, a positive input is provided to a cathode follower 1546 and to the one input side of flip-flop 1542. The output of the cathode follower 1546 is applied as a reintensity signal on conductor 100 to Display Control Circuit 86 (FIG. 1*a*), and is also applied to the excess target counter 1548.

A drum demand pulse from the Write Status Circuit 156 in FIG. 1*b* is applied via conductor 150 to sample gates 1552 and 1554. If the flip-flop 1542 is in the Zero state, thereby supplying a positive level to the gate 1552, an output pulse is established from this gate on conductor 1556 which indicates No Data Available. If the flip-flop 1542 is in the One state when the drum demand pulse is received on conductor 150, gate 1554 yields an output pulse on conductor 152 labeled Data Available. As shown in FIG. 1*b*, this pulse is applied via delay unit 153 and write status circuit 156 to indicate that data is available. The output pulse from the gate 1554 is also applied to a single shot multivibrator 1558, which in turn drives a cathode follower 1560 and core shift driver 1561 to provide a read-out pulse on conductor 140 to the azimuth and range read-out registers 122 and 124 of FIG. 1*b*.

In operation, unsynchronized range pulses received on conductor 6 cause a series of shift pulses to be generated. This operation will now be described. An unsynchronized range pulse on conductor 6 sets flip-flop 1502 to the Zero state and flip-flop 1504 to the One state. Since the gate 1506 is now conditioned with a positive level from the one output side of the flip-flop 1504, the next OD–2 pulse passed by gate 1512 is also passed by the gate 1506 as a synchronized range pulse. By this operation the unsynchronized range pulses received on conductor 6 are synchronized by the Control Element with OD–2 pulses from the drum timing circuit 148 (FIG. 1*b*).

The pulses applied to power inverters 1524 and 1534 to effect shifting in the azimuth counter, range counter, delay register and read-out register in FIG. 1*b* are controlled by the flip-flop 1518. The flip-flop 1518 usually provides a positive signal from the Zero output side. However, each OD–2 pulse passed by the gate 1510 causes flip-flop 1518 to be set in the One state, thereby providing a negative output from the Zero output side. As soon as the OD–2 pulse passes through delay unit 1520, flip-flop 1518 is returned to the Zero state, thereby supplying a positive signal from the Zero output side. Since the output of power inverter 1524 has a polarity opposite that of the input, it can be seen that a positive pulse applied to the various core shift drivers is of a duration equal to the time that the Zero output level of flip-flop 1518 is negative. The duration of this period is determined by the amount of delay effected as the OD–2 pulse passes through delay unit 1520. The delay period of delay unit 1520 is sufficient to allow a core shift drive pulse to effect one shift. Accordingly, it is seen that the shift pulses from core shift drivers 1528 through 1532 and power inverter 1534 occur, if at all, at each OD–2 pulse, and persist for a period determined by the delay unit 1520.

In response to each unsynchronized range pulse received on conductor 6, the flip-flop 1504 is set to the One state, thereby conditioning gate 1506. If the flip-flop 1514, which is in the One state except when shifting operations are taking place, is supplying a positive level to condition gate 1512, an OD–2 pulse is passed which is applied to the gates 1506 and 1510. Since the gate 1506 is conditioned by a positive level from the One output of flip-flop 1504, a pulse is padded on conductor 102 to reset the flip-flop 1504 in the Zero state, thereby conditioning gate circuit 1510. The next OD–2 pulse passed by the gate 1512 is gated through gate 1510 to the One input side of the flip-flop 1518, thereby establishing a negative level at the Zero output side of this flip-flop. After a suitable delay produced by delay unit 1520, the OD–2 pulse causes the flip-flop 1518 to be returned to the Zero state, thereby establishing a positive level on the Zero output side. Each subsequent OD–2 pulse causes a similar change at the Zero output side of the flip-flop 1518 until a stop-shift pulse is received on conductor 136. This stop-shift pulse sets the flip-flop 1514 to the Zero state, providing a negative level on the One output side of this flip-flop to decondition the gate 1512, thereby setting flip-flop 1518 in the Zero state and preventing further OD–2 pulses from manipulating the flip-flop 1518. Once the flip-flop 1518 is set in the Zero state, power inverters 1524 and 1534 supply a constant negative level on their output side. As pointed out in detail in the above referred to copending application Serial Number 502,634, the number of shift pulses required for the azimuth and range counters for each counting operation is equal to the number of stages in these counters. In the preferred embodiment the azimuth and range counters are each eight stage magnetic core shifting registers. Thus it can be seen that in response to each unsynchronized range pulse on input conductor 6, a series of shift pulses is supplied to the azimuth counter 106, range counter 110 and delay register 114 in FIG. 1*b*.

Prior to the series of shift pulses supplied to the azimuth and range counters, an Add One range input signal is supplied on conductor 112 to the range counter 110 in FIG. 1*b*. This is accomplished by the synchronized range pulse from the gate 1506, which is applied to the One input of the flip-flop 1516, which in turn causes a positive signal level to be established on output conductor 112. The flip-flop 1516 supplies this Add One range signal through core shift driver 1517 simultaneously as the flip-flop 1504 conditions the gate 1510. Thus the series of shift pulses is not initiated until the following OD–2 pulse. The shift pulses applied to the azimuth counter fail to advance the count contained therein unless an azimuth pulse is first received by the azimuth counter 106. It is recalled that if the displayed target is not masked, the resulting blue flash on the cathode ray tube screen is detected by the photopickup 94, and the resulting filtered target signal applied through conductor 96 to control element 98. Since the count in the azimuth and range counters define the position of a target, it is necessary to read out the contents thereof whenever a filtered target signal is received. The operations performed by the Control Element 98 in FIG. 12 to cause readout of the range and azimuth counters in response to the filtered target pulse on input conductor 96 will now be explained.

Flip-flop 1516, which is in the One state after a synchronized range pulse has caused an Add One range output, conditions the gate 1536 to pass an OD–4 pulse to the Zero input side of flip-flop 1516 and the gate 1538. This deconditions gate 1536 by setting the flip-flop 1516 to the Zero state of conduction. The gate 1538 provides an output pulse, if the filtered target signal is present, to the One input side of the flip-flop 1502, and through OR circuit 1540 to the Zero input of flip-flop 1542, thereby setting these flip-flops in the One and Zero states respectively. The positive level established from the One output of flip-flop 1502 is applied to positive AND circuit 1544. The other input to positive AND circuit 1544 is from the one output side of flip-flop 1514. The output of the positive AND circuit 1544 is applied to the One input side of the flip-flop 1542 and through the cathode follower 1546 to the output conductor 100 which supplies a reintensity level to Display Control Circuit 86 of FIG. 1*a*. The reintensity signal level on conductor 100 is also applied to the excess target counter 1548. The excess target counter 1548 controls a relay driver 1550 which actuates an alarm circuit in the event that an excessive number of targets are received on input conductor 96 within a given period, indicating that an area may not have been properly mapped. In the preferred embodiment, as heretofore described, the time relation is such that the duration of a filtered target signal on conductor 96 is approximately 43 microseconds, and the duration of the resulting reintensity signal on output conductor 100 is approximately 180 microseconds.

The flip-flop 1542, in response to the positive output signal from the positive AND circuit 1544, conditions the gate 1554 to pass a drum demand pulse on conductor 150 to the input of the single shot multivibrator 1558. The output of multivibrator 1558 is applied through cathode follower 1560 and core shift driver 1561 to output conductor 140, thereby causing readout of the azimuth read out register 122 and the range read out register 124 (FIG. 1*b*). Multivibrator 1558 serves to convert the .1 microsecond input pulse to a pulse on its output having sufficient width to cause read out of magnetic core circuits in the azimuth and range read out registers 122 and 124 respectively in FIG. 1*b*. Thus it can be seen that a filtered target pulse on input conductor 96 to the Control Element in FIG. 12 causes a positive reintensity signal on output conductor 100; it further serves with a drum demand pulse on input conductor 150 to establish a readout pulse on output conductor 140. It is also pointed out that a pulse on conductor 152, indicating data available, is supplied through delay unit 153 to gates 142 and 144 as well as to Write Status Circuit 156 in FIG. 1*b* each time a read-out pulse is established on output conductor 140. The data available pulse on conductor 152 conditions the Drum Write Circuit 168 to accept the information supplied from the azimuth read out register 122 and the range read out register 124 to the gates 142 and 144 respectively, as more fully explained in the above referred to copending application Serial Number 494,982. In the event that no filter target signal is received on input conductor 96, the flip-flop 1542 continues in the Zero state to which it is set by the data available pulse on conductor 152 applied through OR circuit 1540. Consequently, drum demand pulses received while flip-flop 1542 is in the Zero state are passed by the gate 1552 to the output conductor 1556, representing no data available. The output of gate 1552 labeled No Data Available may be employed in an arrangement such as shown in copending application Serial Number 494,982 (IBM Docket 4490), to accommodate the entry of data from a plurality of equipments such as previously described on to a common drum.

YOKE NORTH PULSE GENERATOR

Referring now to FIG. 13, there is illustrated in schematic form the Yoke North Photopickup and associated circuitry shown in block form in FIG. 8*a*. As shown and described with reference to FIG. 8*a*, when the yoke rotates through its North position, a yoke North pulse is generated by a photopickup in response to a light beam passing between the slits of two rotating members, when the yoke passes through the North position. The yoke North photopickup is shown as block 1148 in FIG. 8*a*.

Referring now specifically to FIG. 13, the photo pickup includes a photo multiplier tube, an associated amplifier and an output cathode follower. When the light beam strikes the light sensitive cathode 1561 of photo multiplier 1560, the cathode thereupon emits electrons. Photo multiplier 1560 includes cathode 1561, anode 1562 and intermediate dynodes 1563 through 1568. Resistors 1571 through 1576 comprise a voltage divider network which causes each dynode to be at an increasingly more positive potential than the immediately preceding dynode. The operation of the photo multiplier 1560 is substantially identical to the operation of the photomultiplier described in reference to the photo pickup circuit shown in FIG. 11. When excited, the six stage photo multiplier develops a negative 20 volt signal at anode 1562.

The output of photo multiplier 1560 is applied through capacitor 1577 to control grid 1578 of pulse amplifier 1580. Pulse amplifier 1580 normally conducts very heavily, since it has no cathode bias resistor and no external fixed bias on the grid 1578. During the generation of the photo multiplier output pulse, pulse amplifier 1580 is cut off. The resulting waveform at anode 1579 is a rectangular wave having an amplitude of approximately 200 volts. This signal is coupled through capacitor 1584 to a voltage divider network comprising resistors 1585 and 1586, which functions to prevent the output cathode follower stage 1590 from being overdriven. The control grid 1587 of cathode follower 1590 is biased by an external source of negative 15 volts applied through resistor 1586. Resistor 1588 is a parasitic suppressor associated with control grid 1587.

When a positive pulse from pulse amplifier 1580 is applied to control grid 1587 of cathode follower 1590, it is limited by grid current flow through parasitic suppressor 1588 so that it does not have the full amplitude established at junction 1589 of the above described voltage divider network. Because of the comparatively high value of cathode resistor 1592, the output pulse of the cathode follower stage at conductor 74 is almost substantially identical in amplitude with the input pulse. This pulse, referred to as a filtered target signal, is then applied through conductor 74 to the North Synchronizing Circuit 64 (FIG. 7) to function in the manner heretofore described.

AZIMUTH ALARM COUNTER 318

Referring now to FIG. 14, there is illustrated in schematic form the azimuth alarm counter identified as block 318 in FIG. 4*a*. As previously noted with reference to the description of the Start and Alarm Circuit (FIG. 4), the azimuth alarm counter 318 is an analog counter which builds up a potential sufficient to trigger an alarm circuit in response to a succession of pulses applied thereto within a predetermined interval. In the preferred embodiment, the signals applied to the azimuth and alarm counter 318 comprise unsynchronized azimuth signals which are applied from conductor 2 through relay contacts in the Start and Alarm Circuit to the azimuth alarm counter. The output from the azimuth alarm counter controls the operation of a relay through an associated relay driver. When energized, the relay controls either the starting function during a start cycle or energizes an alarm circuit during normal operation. With reference to the first function, the azimuth alarm counter utilizes the incoming unsynchronized azimuth signals to energize a relay which completes an energizing circuit to the motor. With reference to the second function, the azimuth alarm counter detects abnormal conditions which are related to the azimuth pulses applied to the present apparatus.

Referring specifically to FIG. 14 for a detailed description thereof, the azimuth alarm counter shown in schematic form essentially comprises a thyratron trigger circuit, an output storage circuit and a relay driver in the load. Depending on the rotational rate of the remote radar antenna, the azimuth alarm counter 318 must be capable of handling pulses applied at a substantially uniform rate which may vary, for example, between 4 and 40 pulses per second. When an arbitrary number of these pulses have been received within a predetermined interval, the counter must be capable of producing an output sufficiently large to energize the associated relay driver. While the number of pulses required to energize the azimuth alarm counter is a matter of adjustment which is not deemed critical, in the preferred embodiment between 10 and 20 pulses have been arbitrarily selected as the number required to energize the relay, while a corresponding time interval would vary between .4 and 1.2 seconds.

Incoming pulses on conductor 316 are coupled through capacitor 1602 to control grid 1604 of thyratron 1606. These input pulses vary in amplitude between −30 and +10 volts, and may vary in duration between 5 microseconds and 120 milliseconds. A thyratron trigger 1606 is employed to enable the counter to receive pulses of varied width as above noted and store the same charge in the capacitor storage for each pulse. This is possible since the output from the thyratron is substantially constant and independent of the input signal used to fire the thyratron.

Thyratron trigger 1606 is normally cut off by a fixed bias applied to control grid 1604 from a −30 volt supply applied through resistors 1608 and 1610. Due to the inherent characteristics of thyratron circuits, thyratron 1606 will not fire until approximately 3 microseconds after the input pulse is applied to control grid 1604. For this reason, the input signal must be a minimum 3 microseconds in duration. When the thyratron 1606 fires, capacitor 1612 discharges through the thyratron. The potential at anode 1614 is determined by the charge across capacitor 1612. Therefore when the capacitor 1612 discharges and the anode potential drops below a certain level, the thyratron is deionized. When the thyratron deionizes, capacitor 1612 starts to recharge toward +250 volts through resistor 1616 and the plate resistor 1618. Resistor 1616 is a current limiting resistor which limits the discharge current through the thyratron to the desired level, thereby preventing damage to the tube due to excessive current. The relatively large value of resistor 1618 prevents capacitor 1612 from recharging too rapidly. Diode connected vacuum tube 1620 in the anode circuit of thyratron 1606 is a clipping diode which functions to clip the anode voltage from the thyratron at 90 volts. This insures that the anode of the thyratron will reach the same voltage level between input pulses, even though such pulses appear at a relatively rapid rate. Coupling capacitor 1622 is used to build up the charge on the capacitor storage circuit comprising capacitors 1624 and 1626. Each time thyratron 1606 conducts, coupling capacitor 1622 is discharged through diode connected vacuum tube 1628. After the thyratron deionizes, capacitor 1622 is recharged through a path comprising capacitors 1624, 1626 and diode connected vacuum tube 1630 to a potential of approximately 90 volts. Therefore each time coupling capacitor 1622 is recharged, it adds to the charge in the storage circuit. Diode 1630 functions to isolate the storage circuit from the coupling capacitor 1622 when the thyratron fires, thereby preventing the storage circuit from discharging through the low impedance path provided by diode 1628. Diode 1628 prevents the storage circuit side of capacitor 1622 from dropping below a level of −30 volts. Therefore, when the thyratron anode potential drops, coupling capacitor 1622 cannot retain its charge and discharges immediately. A resistor 1632 is in the discharge path for storage capacitors 1624 and 1626. The storage circuit of the preferred embodiment comprising capacitors 1624 and 1626 and resistor 1632 has a time constant of approximately 2.4 seconds. Thus, although unsynchronized azimuth signals may be received on conductor 316 at a relatively slow rate, the charge in the capacitor storage circuit is increased with each pulse. The resulting potential is connected through resistor 1634 to the control grid 322 of relay driver 320 (FIG. 4*a*). Relay driver 320 has been shown and described in FIG. 4*a*, and no further description is required.

A waveform shown as curve 1636 illustrates the manner in which the signal applied to control grid 322 of relay driver 320 reaches the threshold value of the relay driver. The rising portion of the waveform applied to control grid 322 of relay driver 320 as shown in curve 1636, is the charge time of coupling capacitor 1622. Flat portions of waveform 1636 indicate the discharge of the storage capacitor circuit comprising capacitors 1624, 1626 and resistor 1632. As the input pulse rate decreases, the flat portion of the input waveform will become larger since the discharge of the capacitor storage circuit will be of longer duration. Each rising portion of waveform 1636 signifies the recharge of coupling capacitor 1622 resulting from the firing of thyratron 1606. Cathode resistor 1638 of relay driver 320 provides degenerative resistance, thereby permitting the relay driver to operate reliably even though the tube has altered considerably from its nominal parameters.

EXCESS TARGET ALARM CIRCUIT

Referring now to FIG. 15, there is illustrated in schematic form the Excess Target Alarm Counter and its associated relay driver shown as blocks 1548 and 1550 respectively in FIG. 12. The Excess Target Alarm Counter is used to set off an alarm when an excessive amount of target information is being applied to the data processing machine. Such undesirable data, if continuously applied to the data processing machine, would prevent proper operation by over-burdening the machine. As previously noted, an excess target alarm condition may be caused by improper mapping of fixed targets on the mapper console. As previously described, all filtered targets in addition to being reintensified are applied to excess target counter 1548 (FIG. 12). The Excess Target Alarm Counter is an analog type counter similar to the Azimuth Counter described in FIG. 14. If more than a predetermined number of target signals are detected during a certain interval, the excess target counter causes energizing of an excess target alarm relay which, when energized, interrupts the flow of data to the data processing machine and gives a red light indication of such a condition.

Referring specifically to FIG. 15, input pulses applied to conductor 100 are approximately 180 microseconds in duration and vary in amplitude between −30 and +10 volts. The excess target analog counter circuit in the preferred embodiment operates at a maximum repetition rate of 1600 pulses per second. When between 30 and 50 of such pulses are received, the circuit will produce an output sufficiently large to energize an associated alarm relay. The excess target analog counter does not employ a thyratron trigger, since the input signals are substantially uniform in amplitude and the timing of a thyratron circuit is not sufficiently rapid to permit circuit operation at the above cited repetition rate.

The input pulses on conductor 100 are applied through resistor 1648 to control grid 1652 of cathode follower 1650. These input signals are sufficient to produce grid current flow in the cathode follower tube 1650, while resistors 1654 and 1656 in the cathode circuit provide the proper power rating for the resulting heavy load on the cathode follower. The output of the cathode follower stage is connected from cathode 1658 through capacitor 1660 and diodes 1662 and 1664 to the storage circuit comprising parallel connected capacitors 1668, 1670, 1672 and 1674 and resistor 1676. The incoming pulses charge up this bank of storage capacitors until the associated relay driver 1550 conducts. Coil 1676 in the relay driver anode circuit functions to prevent current surges to the output of the circuit. Diode connected vacuum tube 1664 isolates the storage circuit from the coupling capacitor 1660 when the cathode follower 1662 conducts. This prevents discharging of the above defined storage circuit in the low impedance path provided by diode connected tube 1662. Tube 1662 clips the storage side of coupling resistor 1660 at a level of −30 volts.

AZIMUTH PROTECTION DRUM WRITE CIRCUITS

Referring now to FIG. 16, there is illustrated in schematic form the Drum Write Circuits associated with magnetic drum 250 in the Azimuth Protection circuit, and identified as blocks 261 and 263 in FIG. 3. As previously described with reference to FIG. 2, the input signals to Drum Write Circuits comprise 5 microsecond pulses having an amplitude of +10 volts to indicate the presence of either true azimuth or substitute azimuth pulses. As further shown in FIG. 3, true azimuth pulses are applied to Write Circuit 261, while substitute azimuth pulses are applied to Write Circuit 263 in the event that true azimuth pulses are absent.

Referring specifically to FIG. 16 for a detailed description of the operation of the write circuits, true and substitute write circuits employ a thyratron write head driver stage shown as stages 1680 and 1682 respectively. Positive inputs to either stage are applied through conductors 44 and 46 and capacitors 1684 and 1686 to control grids 1688 and 1690 to fire thyratron drivers 1680 or 1682 respectively. Resistors 1692 and 1694 are current limiting resistors to minimize the effect of sudden current surges when conduction is initiated. When either thyratron fires, resulting in a lowered potential at the corresponding anode, capacitor 1700, common to both write circuits, which has charged from a 250 volt source through resistor 1702, discharges through the coil of the write head corresponding to the conducting thyratron. For example, in writing a true azimuth pulse, thyratron 1680 conducts and capacitor 1700 discharges through write head 260. The RC network of capacitor 1700 and resistor 1702 is common to both write heads, since only one write head driver is conducting at any given time. Discharge of capacitor 1700 through either write head coil induces a magnetic flux which causes the signal to be recorded on the permeable drum surface. Resistors 1704 and 1706 are employed to bias control grids 1688 and 1690 respectively, while RC networks comprising resistors 1708, 1710 and capacitors 1712, 1714 are decoupling networks associated with control grids 1688 and 1690 of thyratrons 1680 and 1682 respectively. Screen grid potential is applied to write head drivers 1680 and 1682 from ground through resistors 1716 and 1718 respectively.

AZIMUTH PROTECTION DRUM READ CIRCUIT

Referring now to FIG. 17, there is illustrated in schematic form a read circuit associated with magnetic drum 250 in the Azimuth Protection Circuit, and identified as block 265 or 267 in FIG. 3. Since the two read circuits are identical except for the control grid biasing network, which will vary according to the signal requirements of the output load, a detailed description of read circuit 265 will suffice for an understanding of both.

As previously described with reference to the Azimuth and North Protection Circuit (FIG. 2), the logic employed in the preferred embodiment is such that the output signal from read circuits 265 and 267 are of opposite polarity whenever an azimuth pulse is detected on magnetic drum 250. The output signal from read circuit 265 is positive, the output signal from read circuit 267 is negative. This 180° phase difference is produced at the input stage of the read circuits by so connecting the associated windings of the input transformer that the signal applied to read circuit 265 is negative, while the signal applied to read circuit 267 is positive. Since each read circuit includes an inverter stage, a positive output is obtained from read circuit 265 while a negative output is obtained from read circuit 267. Basically, each read circuit includes a step up transformer, an inverter stage and a cathode follower output stage.

Returning now to FIG. 17 for a detailed description of the operation of the read circuit, magnetic flux induced on the surface of drum 250 during writing cuts the windings of read head 264 (FIG. 3) and induces a signal which is applied through conductor **48*a* and stepped up by input transformer 1730. The amplified signal is A.C. coupled through capacitor 1732 to control grid 1734 of triode 1736. Resistor 1738 and capacitor 1740 provide current limiting and bypass action respectively. Since the voltage drop across resistors 1742 and 1744 biases tube 1736 at a relatively high positive level, positive input signals produce a substantially negligible effect on the conduction of tube 1736. However, negative input signals decrease conduction, thereby producing positive signals at anode 1746. This positive output is applied through conductor 1748 to control grid 1750 of cathode follower 1752. Diodes 1754 and 1756 clip the output signal of the cathode follower on conductor 48** at upper and lower levels of +10 and −30 volts respectively. The resulting positive signal is then applied to the Azimuth and North Protection Circuit as heretofore described.

The inverter associated with read circuit 267 on the other hand is biased at approximately cutoff, so that the negative input signals induced through the transformer have no effect on the associated inverter circuit. Positive input signals, however, are amplified and inverted and the resulting negative signal applied through the associated cathode follower output stage to negative AND circuit 246 (FIG. 2) whenever an azimuth pulse is detected by read head 266.

As previously described, all recorded signals on drum member 250 are read by read heads 264 and 266 which provide the outputs above described. However, the presence or absence of the succeeding azimuth pulse determines the further operations in the Azimuth and North Protection Circut to which the output of read heads 265 and 267 are applied through conductors 48 and 50 respectively.

MODEL C PULSE GENERATOR

Referring now to FIG. 18, there is illustrated in schematic form the Model C pulse generator associated with read circuit 265 described above, and identified as block 244 in FIG. 2. The Model C pulse generator functions to convert a substantially square wave input signal into a standard 0.1 microsecond pulse. Input signals from read circuit 265 are A.C. coupled from conductor 48 through capacitor 1760 to control grid 1762 of thyratron 1764. Thyratron 1764 is energized by the rising or positive-going portion of the input waveform. Capacitor 1766 in the thyratron anode circuit is normally charged from positive 250 volt terminal 1768 through resistor 1770. When an input signal causes thyratron 1762 to conduct, the potential at anode 1772 drops to a relatively low level and capacitor 1766 discharges through the tube and the primary winding of transformer 1774. The high resistance value of resistor 1770 provides a long time constant for capacitor 1766 to charge, while resistor 1776 limits the discharge current through the thyratron. Resistors 1778 and 1780 are current limiting resistors associated with the control grid and screen grid respectively. The discharge of capacitor 1766 through the primary winding of transformer 1774 produces a negative excursion at anode 1772 resulting in a positive pulse being induced in the secondary winding of step down transformer 1774. The time constant of the circuit is such that the induced pulse is 0.1 microsecond in duration. Resistor 1782 is a transformer terminating resistor which limits the amplitude of the induced pulse and damps out oscillations; while resistor 1784 and capacitor 1786 comprise a decoupling network associated with the output. Output conductor 1788 establishes the output reference level at −15 volts, while the output on output conductor 245 is the standard 0.1 microsecond pulse heretofore defined.

MODEL D FLIP-FLOP

Referring now to FIG. 19, there is illustrated in schematic form the Model D Flip-Flop identified as block 1518 in FIG. 12. A Model D Flip-Flop is required in the instant application in the control circuit due to the relatively rapid rise time characteristic of the output waveform as compared to corresponding characteristics of the Model C flip-flop employed throughout the present apparatus. Referring briefly to FIG. 12, the binary 1 input to flip-flop 1518 is a standard 0.1 microsecond pulse from gate circuit 1508, while the binary 0 input is a delayed OD–2 timing pulse.

Returning now to FIG. 19, a flip-flop 1508, a bistable electronic circuit, includes two amplifying vacuum tubes 1800 and 1802 which may be the respective halves of a Z2177 twin triode. Anodes 1804 and 1806 of the vacuum tubes 1800 and 1802 are cross-coupled to control grids 1808 and 1810 as shown. If one of the amplifying tubes 1800 or 1802 is conducting, the other is non-conducting except during a transition in state when both tubes may be non-conducting momentarily.

Operating D.C. potential is supplied to the anode 1804 through a peaking coil 1812 which is tapped from a voltage divider comprising resistors 1814 and 1816 serially connected between a source of +90 volts and ground. Resistors 1818 and 1820, connected serially between a source of +90 volts and ground, constitute another voltage divider which supplies D.C. potential through a peaking coil 1822 to anode 13.

A further voltage divider network which constitutes part of the load circuit for anode 1804 includes resistors 1824, and 1826 connected serially between the anode 1804 and a source of −150 volts. The resistor 1828 and a condenser 1830 serve as a decoupling network for decoupling transformers 1832 and 1834, while resistor 1836 and capacitor 1838 function as a decoupling network associated with the control grid 1808. Both decoupling networks function to minimize voltage fluctuations. Control voltage for the grid 1806 of the vacuum tube 1802 is obtained from the junction point of the resistors 1824 and 1826 of the voltage divider network through a parasitic resistor 1840. A condenser 1842, connected in parallel with the resistor 1824, serves as a compensating capacitor which helps to insure that the voltage wave at the anode 1804 of tube 1800 during a change of state is applied with sufficient amplitude and proper shape to the grid 1806 of tube 1802. This condenser serves also as a memory capacitor to insure that the vacuum tube 1802 is rendered conductive whenever both tubes are momentarily rendered non-conductive during a change of state in which vacuum tube 1802 was previously non-conductive.

A voltage divider network which constitutes part of the load circuit for the anode 1806 includes resistors 1844, 1846 and 1836 serially connected between the anode 1806 and a source of −150 volts. The separate voltage source here may be varied to change the potential across the voltage divider network when it is desired to test the stability of the flip-flop 1518. Control voltage for the grid 1808 of the vacuum tube 1800 is obtained from the junction point of the resistors 1844 and 1846 through a parasitic resistor 1848. A condenser 1850, connected in parallel with the resistor 1844, serves as a compensating capacitor which helps to insure that the voltage wave at the anode 1806 during a change of state is applied with sufficient ampljtude and proper shape to the grid 1808. This condenser serves also as a memory capacitor to insure that the vacuum tube 1800 is rendered conductive whenever both tubes are momentarily rendered non-conductive during a change of state where vacuum tube 1800 was previously non-conductive.

Parallel connected resistors 1852 and 1853, connected between −150 volts and the common connection point of the cathodes 1807 and 1809, provide cathode degeneration for the two amplifying tubes 1800 and 1802 respectively. The charge on a by-pass condenser 1854, connected across the resistor 1852, is little affected by a short duration input pulse, and the effect of this condenser is to hold the cathodes 1807 and 1809 at substantially the same potential at all times. Thus a negative pulse applied across the grid-cathode circuit of the conducting tube creates no appreciable change in potential at the cathodes 1807 and 1809.

A positive input pulse to a primary winding 1856 of a transformer 1834 establishes a negative pulse on a secondary winding 1858. The secondary winding 1858 is A.C. coupled through a capacitor 1860, diode 1862 and the resistor 1848 to control grid 1808 of tube 1800. All of this negative pulse is passed by the diode 1862 provided the potential on its anode 1864 is positive relative to the potential at its cathode 1866. When the vacuum tube 1800 is non-conducting, its grid potential is at or below cut off, and a negative pulse, whether passed by diode 1862 or not, does not affect the non-conducting state of this vacuum tube. If the vacuum tube 1800 is conducting, however, its grid bias potential is approximately zero volts or slightly positive which conditions diode 1862 to the threshold of conduction. A negative pulse across the secondary winding 1858 now causes the potential at the cathode 1866 of the diode 1862 to go further negative; whereupon the diode 1866 passes the negative pulse to the grid 1808 and stops conduction in the vacuum tube 1800. A diode 1870, connected across the secondary winding 1804 of transformer 1802, serves to dissipate and limit positive overshoot voltages which occur on the upper side of the secondary winding 1858 as a result of the decay of a positive pulse on the primary winding 1856.

In a like fashion a positive pulse applied to a primary winding 1872 of a transformer 1832 establishes a negative pulse on a secondary winding 1874 which is passed by a capacitor 1876 and a diode 1878 through the parasitic suppressor 1840 to the control grid 1806 whenever the vacuum tube 1802 is conducting. Diode 1880, connected across the transformer secondary winding 1874, serves to dissipate and limit positive overshoot voltages which occur on the upper side of the secondary winding 1874 as a result of the decay of a positive pulse on the primary winding 1872. Resistors 1882 and 1884 complete high impedance paths between the control grids and cathodes of tubes 1800 and 1802 to permit the control grids to become more positive than the associated cathodes and thereby operate in the desired grid current region.

In order to illustrate the operation of the flip-flop 1518, assume a positive pulse is applied to the primary winding 1856 of the transformer 1834 when the vacuum tube 1800 is conducting. The diode 1862, which is at the threshold of conduction because the grid bias of the vacuum tube 1800 is zero or slightly positive, passes the resulting negative pulse produced across the secondary winding 1858 to the control grid 1808 of tube 1800. As the grid 1808 goes negative beyond cutoff, the potential at the anode 1804 of the vacuum tube 1800 rises toward a level of +10 volts. This positive going potential is coupled through the resistor 1824 and the condenser 1842 to the grid 1810 of tube 1802 to initiate conduction in the vacuum tube 1802 as soon as its grid potential rises above the cutoff potential. As current conduction commences in the vacuum tube 1802 the potential at anode 1806 starts decreasing from +10 volts until at full conduction it reaches a level of approximately −30 volts. This decreasing potential at the anode 1806 is coupled through the resistor 1844 and the condenser 1850 to control grid 1808 of tube 1800 to thereby maintain the grid 1812 below the cutoff potential.

If a positive pulse is now applied to the primary winding 1872 of the transformer 1832, the resulting negative pulse produced across the secondary winding 1874 is coupled through capacitor 1876 and diode 1878 and applied through the resistor 1840 to the grid 1810 of triode 1802. As the grid 1810 goes negative beyond cutoff, the potential at the anode 1806 of the vacuum tube 1802 rises toward +10 volts. This positive going potential is coupled through the resistor 1844 and the condenser 1850 to the grid 1808 of vacuum tube 1800 and initiates conduction in the vacuum tube 1800 as soon as its grid potential rises above the cutoff potential. As current conduction commences in the vacuum tube 1800, its anode potential starts decreasing from +10 volts until at full conduction it reaches a level of approximately −30 volts. This decreasing potential at anode 1804 is coupled through the resistor 1824 and the condenser 1842 to the grid 1810 of tube 1802 and maintains the grid 1810 below the cutoff potential. It is noted that in each of the above described cases, pulses are applied to the input transformer of the conducting tube to drive the conducting tube to the non-conducting condition. While flip-flop 1518 has a binary one output and a binary zero output shown as terminals 1884 and 1886 respectively, only the binary zero output is utilized in the Control Element 98 of which flip-flop 1518 comprises one element.

POWER INVERTER

Referring now to FIG. 20, there is illustrated in schematic form a power inverter of the type shown as blocks 1524 and 1534 in FIG. 12. The power inverter circuit which functions to provide a power inverted representation of an input signal, bascially comprises three interconnected stages; a voltage amplifier stage 1902, a cathode follower stage 1904, and a feedback amplifier stage 1906. Voltage amplifier 1902, which provides the required polarity inversion of the input signal, includes an anode 1908, a cathode 1910 and a control grid 1912 is normally conducting. Assuming a negative going pulse varying, for example, between plus 10 and minus 30 volts is applied through capacitor 1913 and parasitic supressor 1914 to control grid 1912, a potential corresponding to the input signal swing is developed across resistor 1916 and the back resistance of parallel connected diode 1918, thereby lowering the potential at control grid 1912 by a corresponding amount. This causes amplifier 1902 to cutoff, thereby enabling capacitor 1920 to charge through parallel connected resistors 1922, 1924 and 1926 toward a level of +250 volts shown on terminal 1928. Anode 1908 of amplifier stage 1902 is connected directly to anode 1930 of feedback amplifier 1906, while resistor 1927 and capacitor 1929 comprise a decoupling network associated with the common anode circuit. When the potential at anode 1908 rises to a particular level, the feedback amplifier 1906 begins to conduct, thereby lowering the potential at anode 1930 and terminating the charge of capactior 1920. After the expiration of the input pulse, which may be a duration, for example, of 2 microseconds, the low forward resistance of diode 1918 permits control grid 1912 to return to its original level rapidly, thereby causing amplifier 1902 to resume conduction. Capacitor 1920 thereupon discharges to the level of anode 1908 and 1930, this discharge being reflected in the rise time of the signal generated by the input amplifier circuit.

From the above description, it is apparent that capacitor 1920 functions to control the rise time of the output signal of the power inverter. Capacitor 1932, connected in parallel with resistor 1934, functions to control the fall time of the output signal. Resistor 1934 controls the input sensitivity and provides cathode degeneration to compensate for parameter variations in amplifier stage 1902. The output at anodes 1908 and 1930 is coupled thorugh capacitor 1936 and parasitic suppressor 1938 to control grid 1940 of cathode follower stage 1904.

Cathode follower 1904 is normally in the non-conducting state with a potential of approximately negative 30 volts maintained on the output conductor 1921. When the inverted 2 microseconds is applied as a positive signal to control grid 1940, cathode follower 1904 begins to conduct and the potential at cathode 1942 continues to rise until a level of approximately +17 volts is reached. Cathode 1942 of cathode follower 1904 is connected through parasitic suppressor 1944 to control grid 1946 of the feedback amplifier stage 1906. When the potential at cathode 1942 reaches a level of 17 volts, the potential coupled back to control grid 1946 of feedback amplifier stage 1906 is sufficient to overcome the bias on the feedback amplifier. Amplifier 1906 thereupon conducts, lowering the potential at the common anode terminal 1947, thereby limiting the level of the input pulse applied to cathode follower stage 1904. Thus the output signal on conductor 1941 is limited to a maximum potential of +17 volts. After the termination of the input pulse. cathode follower stage 1904 reverts to its non-conducting state, causing the output potential to drop to its former level of −30 volts. If the signal dropped below a level of −30 volts, diodes 1950, 1952 and 1954 begin to conduct, thus maintaining the reference level of the output signal at −30 volts.

The potential existing at junction 1956 of cathode resistors 1958 and 1960 in a cathode follower circuit causes capacitor 1936 to charge more slowly when the cathode potential increases, thereby effectively increasing the impedance of the grid circuit. Diodes 1962 and 1964 permit the potential at control grid 1940 of the cathode follower stage to return to the quiescent level rapidly. Resistors 1966, 1968 and 1970 will provide in case of failure of the associated diode.

Before the input pulse is applied to control grid 1912 of amplifier 1902, feedback amplifier 1906 is maintained in the non-conducting state by the negative 30 volt potential applied from terminal 1972 through resistor 1974 and diode resistor combinations of diodes 1950, 1952 and 1954 and resistors 1966, 1968 and 1970 respectively. When the potential cathode 1942 of cathode follower stage 1904 beings to rise, feedback amplifier 1906 begins to conduct, thereby preventing capactior 1920 from charging further. This again effectively clips the upper level of the pulse at the anode of amplifier stage 1902, thus effectively clipping the upper level of the output pulse from cathode 1942 at a level of approximately +17 volts. Resistors 1976, 1978, 1980, 1982 and 1984, interconnected in the cathode circuit of cathode follower 1904, together with resistors 1958 and 1960, comprise the cathode or load impedance of cathode follower stage 1904.

OTHER BASIC CIRCUITS

Each of the following Basic Circuits may be of the type illustrated and described in copending application Serial Number 471,002 (IBM Docket 4592) entitled "Electronic Data Processing Machine" filed by H. D. Ross et al. on November 24, 1954.

| Title | Abbreviation | Page No. | Figure |
|---|---|---|---|
| Gate Circuit Model A | $A^{GT}$ | 142–144 | 46 |
| Cathode Follower Model A | $A^{CF}$ | 146–148 | 49 |
| Cathode Follower Model B | $B^{CF}$ | 146–148 | |
| Logical +OR Circuit | +OR | 148–151 | 50 |
| Logical +AND Circuit | +AND | 151–152 | |
| Delay Unit | DU | 152–153 | 51 |

With reference to the above described logical circuits, it should be noted that a positive OR circuit may also be identified as a negative AND circuit.

With reference to the above described Delay Unit, shorter delays may be obtained by tapping off the delay unit at appropriate terminals.

With reference to the above described cathode followers, the present apparatus also employs model D and parallel connected models H and J cathode followers. The model D and H cathode followers differ from the identified model A and B cathode followers only in the value of the cathode impedance. The model D and H cathode followers have equivalent cathode impedances of 21.2K and 40.1K ohms respectively. The model J cathode follower does not have its own cathode resistor but must be used in parallel with another cathode follower which provides the cathode resistance for both. Where a plurality of cathode followers are employed in parallel, the number is shown as a subscript associated with the model number within the block.

The model C flip-flop employed in the subject apparatus may be of the type illustrated in FIG. 21 and described on pages 61–65 of copending application Serial Number 494,982 (IBM Docket 4490) entitled "Magnetic Data Storage" filed by R. R. Everett et al. March 17, 1955.

Core shift drivers labeled CSD employed in the present apparatus are preferably of the type illustrated and described in copending application Serial Number 502,634 (IBM Docket 4493) entitled "Counter Circuit" filed by H. K. Rising et al., April 20, 1955, pages 23–24.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A system for filtering data comprising display means to produce a viewable display of spaced luminous images representative of said data, a light-sensitive device exposed to said display and responsive to predetermined frequency components only of the light from said images to produce electrical signals representative of said data, and a removable stationary mask over selected areas of said display, said mask being opaque to said predetermined frequency components of light from said images in said areas sufficiently to prevent production by said device of signals corresponding to said masked images and transmitting other frequency components in the visible range of light from said images in masked areas so that light from images in unmasked areas only actuates said device while images in all areas are visible.

2. A data filtering system as claimed in claim 1 wherein said display means is adapted to produce said images successively.

3. A data filtering system as claimed in claim 1 wherein said display means is adapted to produce said display through a translucent surface and said mask is applicable to and removable from said surface to cover and uncover areas of said surface of any desired shape and size.

4. A system for filtering data comprising means to produce first electrical signals representative of said data, a cathode ray tube, means to display said first signals on said cathode ray tube in the form of successive fields of luminous visual images, light sensing means responsive to only predetermined frequency components of the light from said images to produce second electrical signals representative of said data, and a mask between said cathode ray tube and said light sensing means to cover selected portions of said fields, said mask being opaque to said predetermined frequency components of the light from said images in said portions sufficiently to prevent the production by said light sensing means of signals corresponding to said masked images and transmitting other frequency components in the visible range of the light from said images.

5. A system for filtering data comprising means to produce first electrical signals representative of said data, a cathode ray tube, means to display said first signals on said cathode ray tube in the form of successive fields of luminous visual images, a light-sensitive device responsive to predetermined frequency components only of the light of said images to produce second electrical signals bearing a fixed time relation to said first electrical signals, means to produce trains of electrical pulses, the times of occurrence of said pulses serving to represent the coordinates of a fixed sequence of reference locations in said fields, means to count said pulses, means responsive to said second signals to read out counts of said pulses representing the coordinates of reference locations which have correspondence with said images, and a mask between said cathode ray tube and said light-sensitive device to cover selected portions of said fields, said mask being opaque to said predetermined frequency components of the light from said images in said masked portions sufficiently to prevent the production by said light-sensitive device of signals corresponding to said masked images and to thereby prevent read out of pulse counts corresponding to said masked images and transmitting other frequency components in the visible range from said masked images.

6. A filtering system for space related data, said system comprising means to produce a display of spaced luminous plan position indications of said data, a light-sensitive device exposed to said display and responsive to only predetermined frequency components of the light from said indications, said device being adapted to generate electrical signals indicative of said indications, means to provide pulses, the times of occurrence of which represent the polar coordinates of reference locations in said indications, means to count said pulses, means responsive to said electrical signals to read out counts of said pulses representing the coordinates of reference locations which have correspondence with the indicated locations of displayed data indications, and a mask to cover selected portions of said display, said mask being opaque to said predetermined frequency components of the light from said indications to inhibit the production by said light-sensitive device of electrical signals corresponding to data indications in said masked areas and prevent the read out of counts representing the coordinates of reference locations which coincide with said masked indications, and said mask transmitting frequency components in the visible range from said masked indications.

7. A processing system for fields of object location data including means to produce a display of luminous plan position indications of said data fields, means to produce synchronizing pulses for said data fields representative of a predetermined direction in space, means to produce angular orientations of said indications determined by the times of occurrence of said synchronizing pulses, a light-sensitive device exposed to said display and responsive to predetermined frequency components only of the light produced by said indications, said device being adapted to convert said indications into electrical signals, a mask to cover portions of said display, said mask being opaque to said predetermined frequency components to prevent the production by said light-sensitive device of electrical signals corresponding to data indications in said masked areas, and transmitting other frequency components in the visible range from said masked areas, means to provide pulses, the times of occurrence of which represent the polar coordinates of reference locations in said indications, means to count said pulses, and means responsive to said electrical signals to read out counts of said pulses representing the coordinates of reference locations which coincide with data indications in unmasked areas of said display.

References Cited in the file of this patent

UNITED STATES PATENTS

| | | |
|---|---|---|
| 2,403,729 | Loughren | July 9, 1946 |
| 2,412,669 | Bedford | Dec. 17, 1946 |
| 2,534,369 | Ress | Dec. 19, 1950 |
| 2,590,080 | Adams | Mar. 25, 1952 |
| 2,636,166 | Herbst | Apr. 21, 1953 |
| 2,655,836 | Sherwin | Oct. 20, 1953 |
| 2,668,286 | White | Feb. 2, 1954 |
| 2,717,995 | Hall | Sept. 13, 1955 |
| 2,830,113 | Levine | Apr. 8, 1958 |
| 2,898,576 | Bozeman | Aug. 4, 1959 |
| 2,903,690 | Slack | Sept. 8, 1959 |

FOREIGN PATENTS

| | | |
|---|---|---|
| 706,190 | Great Britain | Mar. 24, 1954 |